US011971256B1

(12) United States Patent
Lee et al.

(10) Patent No.: US 11,971,256 B1
(45) Date of Patent: Apr. 30, 2024

(54) GUIDED COLD ATOM INERTIAL SENSORS WITH MEMBRANE INTEGRATED PHOTONICS ON ATOM TRAP INTEGRATED PLATFORMS

(71) Applicant: National Technology & Engineering Solutions of Sandia, LLC, Albuquerque, NM (US)

(72) Inventors: Jongmin Lee, Albuquerque, NM (US); Grant Biedermann, Norman, OK (US); Yuan-Yu Jau, Albuquerque, NM (US); Michael Gehl, Edgewood, NM (US); Christopher Todd DeRose, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 367 days.

(21) Appl. No.: 17/569,578

(22) Filed: Jan. 6, 2022

Related U.S. Application Data

(60) Provisional application No. 63/144,016, filed on Feb. 1, 2021.

(51) Int. Cl.
*G01C 19/58* (2006.01)
*G01P 15/08* (2006.01)
*G01P 15/093* (2006.01)

(52) U.S. Cl.
CPC .......... *G01C 19/58* (2013.01); *G01P 15/0802* (2013.01); *G01P 15/093* (2013.01)

(58) Field of Classification Search
None
See application file for complete search history.

(56) References Cited

U.S. PATENT DOCUMENTS 9,766,071 B2  9/2017  Compton et al.
10,801,840 B1  10/2020  Solmeyer et al.

FOREIGN PATENT DOCUMENTS

EP    2104406 A1    9/2009

OTHER PUBLICATIONS

Beguin, et al., "Advanced apparatus for the integration of nanophotonics and cold atoms", In Optica, vol. 7, Issue 1, Jan. 2020, 2 Pages.
(Continued)

*Primary Examiner* — James Choi
(74) *Attorney, Agent, or Firm* — Mark A. Dodd

(57) ABSTRACT

A guided cold-atom inertial sensor system comprises an atom trap integrated platform, a laser system, a magnetic field system, a control system, and a computing system. The laser system and magnetic field system are adapted to form a magneto-optical trap (MOT) about a suspended waveguide of the atom trap integrated platform made of membrane integrated photonics. After loading cold atoms from a MOT, the photonic atom trap integrated platform generates one-dimensional guided atoms with an evanescent field optical dipole trap (EF-ODT) along the optical waveguide to create guided atomic accelerometers/gyroscopes. Motion of atomic wavepackets in a superposition state is created along the guided atom geometry by way of state-dependent momentum kicks. The light-pulse sequence of guided atom interferometry splits, redirects, and recombines atomic wavepackets, which allows measurement of atom interference fringes sensitive to inertial forces via a probe laser.

20 Claims, 26 Drawing Sheets

(56) References Cited

OTHER PUBLICATIONS

Gehl, et al., "Characterization of Suspended Membrane Waveguides towards a Photonic Atom Trap Integrated Platform", Optics Express, vol. 29, No. 9, Apr. 26, 2021, 12 Pages.

Jaffe, et al., "Efficient Adiabatic-Spin Dependent Kicks in an Atom Interferometer", In Physical Review Letters, vol. 121, 040402, 2018, 6 Pages.

Kovachy, et al., "Adiabatic-rapid-passage multiphoton Bragg atom optics", In Physical Review A, vol. 86, 011606(R), 2012, 5 Pages.

Lee, et al., "Demonstration of a MOT in a Sub-Millimeter Membrane Hole", Nature Portfolio, Scientific Reports, 11:8897, 2021, 8 Pages.

Lee, et al., "Inhomogeneous broadening of optical transitions of 87Rb atoms in an optical nanofiber trap", In Journal of Physics B: Atomic, Molecular and Optical Physics, vol. 48, No. 16, 2015, 7 Pages.

Lee, et al., "Integrated optical dipole trap for cold neutral atoms with an optical waveguide coupler", In New Journal of Physics, vol. 15, Apr. 2013, 15 Pages.

Lee, et al., "Matterwave Sagnac interferometer using nanoscale optical waveguides", Sandia National Laboratories, Jul. 15, 2020, 57 Pages.

Lee, J., "Deployable Cold Atom Interferometry Sensor Platforms Based on Diffractive Optics and Integrated Photonics", Sandia National Laboratories, SAND2020-9489C, 30 Pages.

Mcdonald, et al., "Optically guided linear Mach-Zehnder atom interferometer", In Physical Review A, vol. 87, 013632, Jan. 2013, 5 Pages.

Meng, et al., "A nanowaveguide platform for collective atom-light interaction", In Applied Physics Letters, vol. 107, 091110, Sep. 2, 2015, 6 Pages.

Muller Group, "Atom interferometry Introduction", Retrieved From: http://matterwave.physics.berkeley.edu/atom-interferometry, Retrieved Date: Feb. 2, 2021, 4 Pages.

Orozco, et al., "Coherence of Trapped Atoms in a 1-D Evanescent Field Optical Dipole Trap", In Optics Letters, Feb. 1, 2021, 8 Pages.

Orozco, et al., "Nanofiber testbed for guided atom interferometry", Sandia National Laboratories, 2020, 29 Pages.

West, "Systematic effects in two-dimensional trapped matter-wave interferometers", In Physical Review A, vol. 100, Issue 6, 063622, Dec. 9, 2019, 8 Pages.

West, et al., "Tunable transverse spin-motion coupling for quantum information processing", In Quantum Science and Technology, vol. 6, No. 2, Jan. 20, 2021, 14 Pages.

Xin, et al., "An atom interferometer inside a hollow-core photonic crystal fiber", In Science Advances, vol. 4, e1701723, Jan. 19, 2018, 7 Pages.

FIG. 8B Free-Space / Guided Raman Pulse Sequence
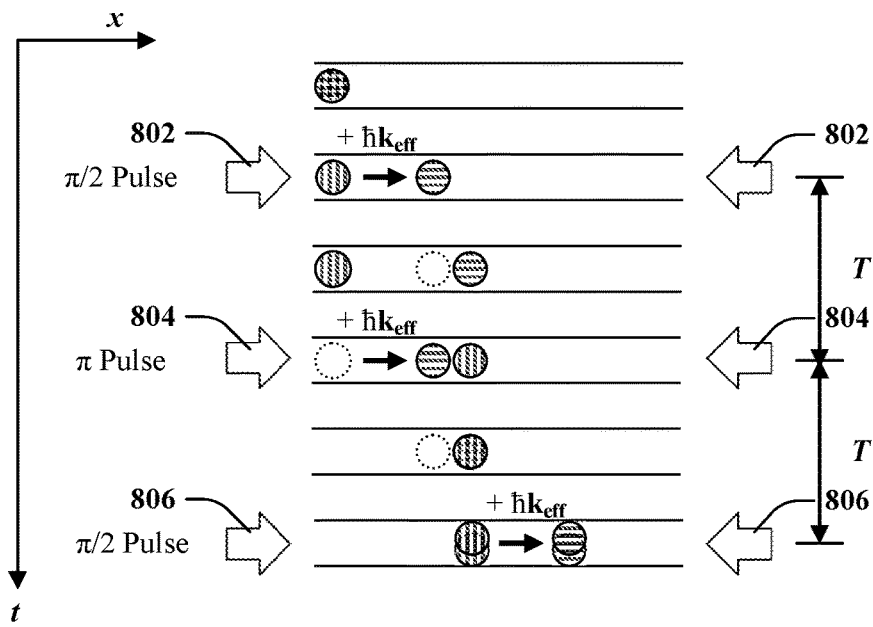
FIG. 8C Free-Space / Guided Bragg Pulse Sequence
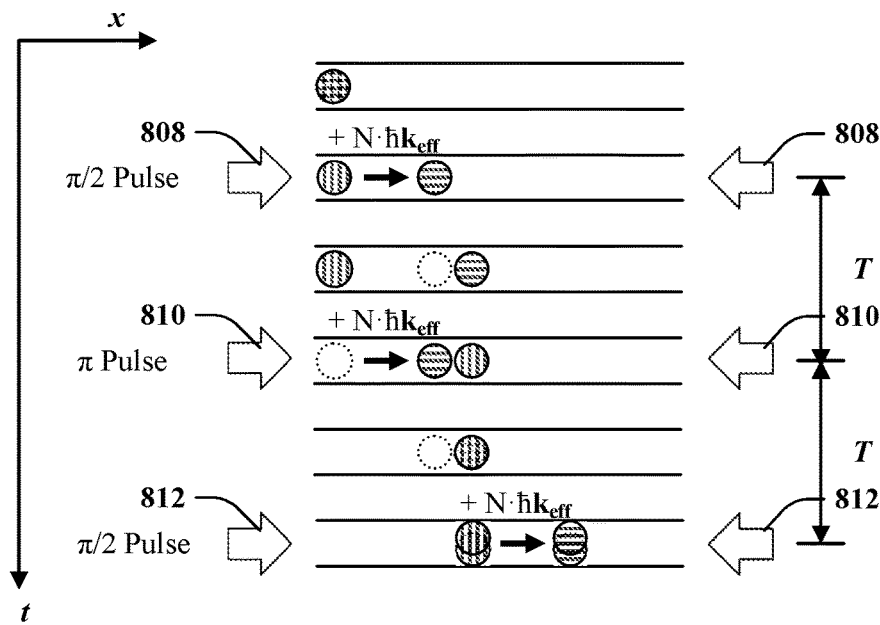

FIG. 8D Free-Space SDK Pulse Sequence
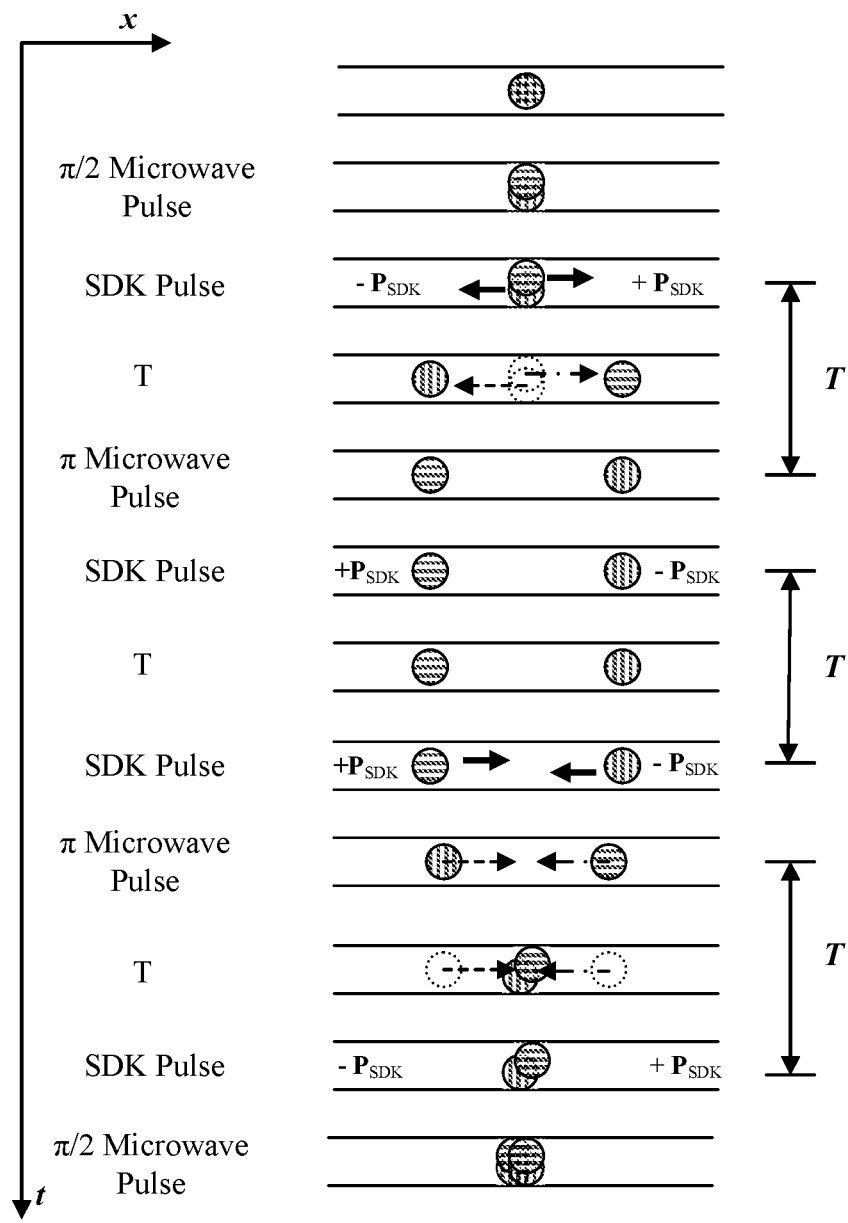

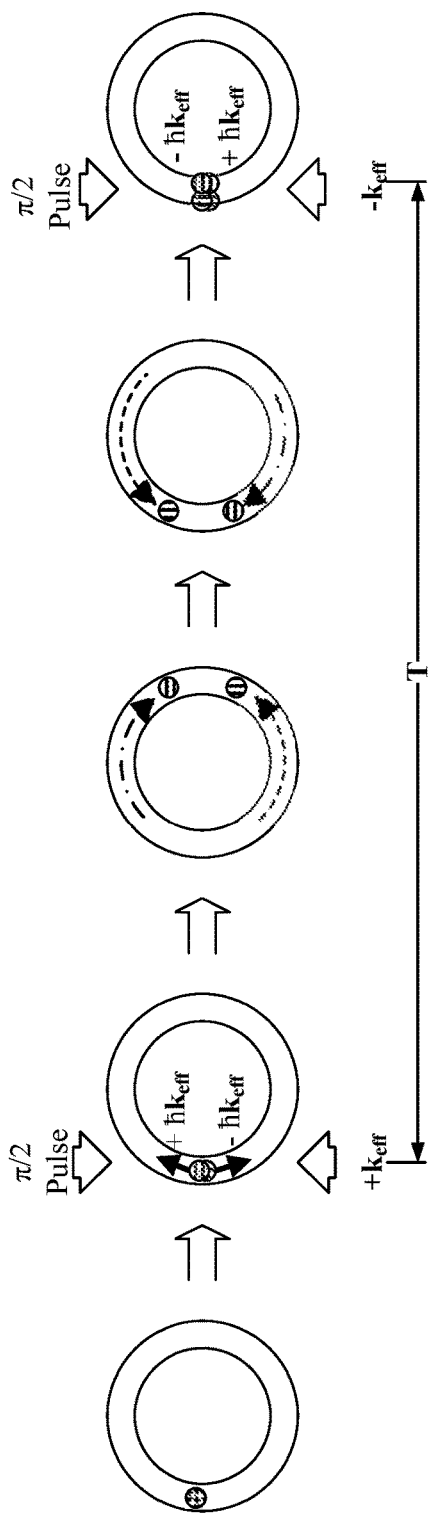
FIG. 10B Free-Space Raman Pulse Sequence
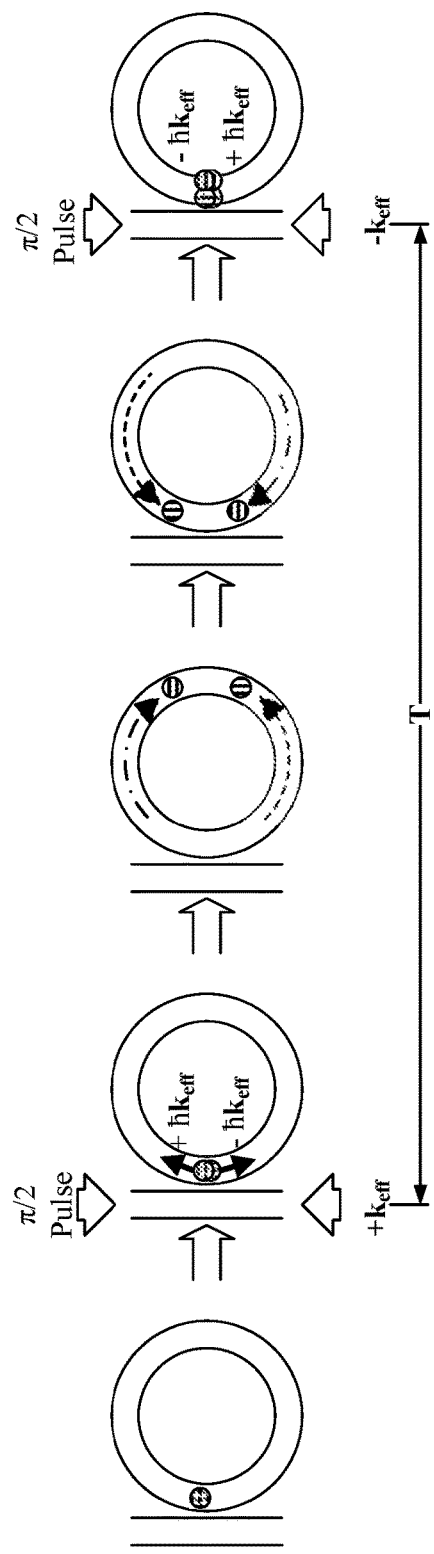
FIG. 10C Guided Raman Pulse Sequence

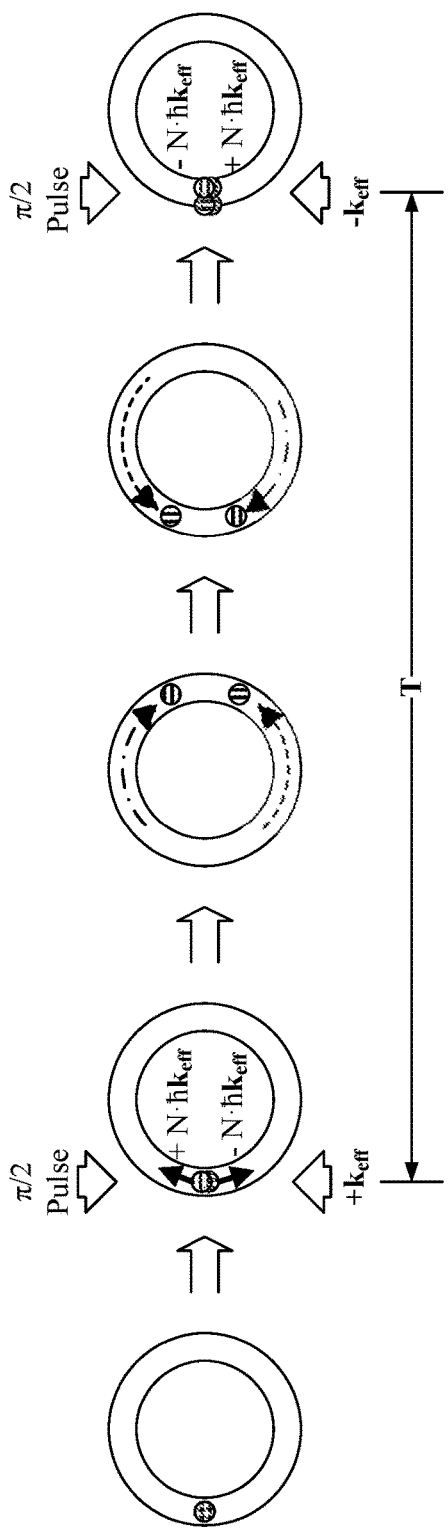
FIG. 10D Free-Space Bragg Pulse Sequence
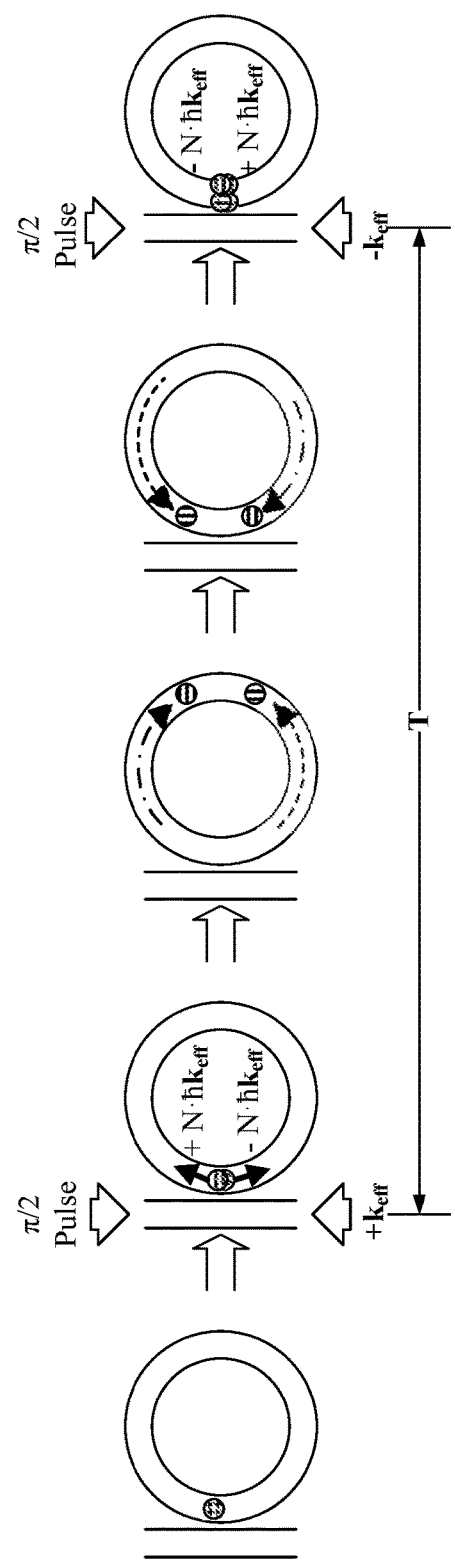
FIG. 10E Guided Bragg Pulse Sequence

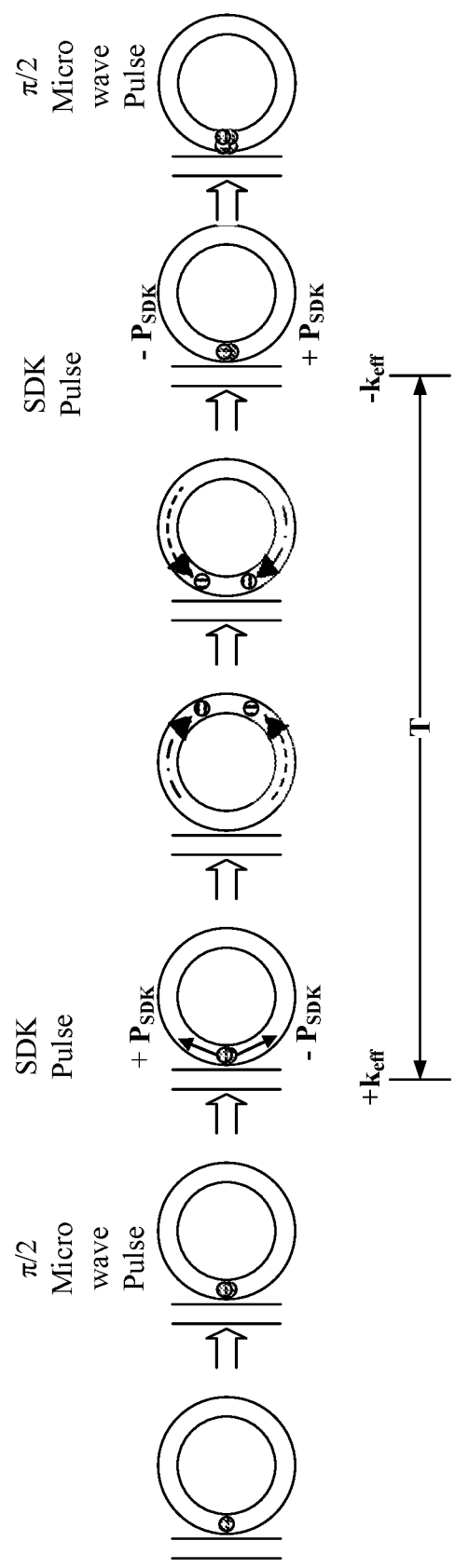
FIG. 10F Free-Space SDK Pulse Sequence

GUIDED COLD ATOM INERTIAL SENSORS WITH MEMBRANE INTEGRATED PHOTONICS ON ATOM TRAP INTEGRATED PLATFORMS

RELATED APPLICATIONS

This application claims priority to U.S. Provisional Application No. 63/144,016, filed on Feb. 1, 2021, and entitled GUIDED COLD ATOM INERTIAL SENSORS WITH MEMBRANE INTEGRATED PHOTONICS ON ATOM TRAP INTEGRATED PLATFORMS, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

BACKGROUND

A microfabricated optical waveguide has been considered for use in connection with guided atom interferometry and/or guided cold atom inertial sensors, such as guided atom accelerometers and gyroscopes, innately operable under a dynamic environment compared to a free-space light-pulse atom interferometer (LPAI).

The one-dimensional (1-D) guided atoms, e.g., transversely trapped atoms, are based on an evanescent-field optical dipole trap (EF-ODT) using the optical waveguide, and atoms are loaded into the EF-ODT from a magneto-optical trap (MOT). Analogous to a tapered optical fiber (TOF), the integrated photonic waveguide can optically guide small evanescent-field modes for strong atom-light interaction and an EF-ODT.

Free-space LPAI accelerometers and gyroscopes have been developed to measure acceleration and angular velocity, respectively, towards high precision measurement and positioning, navigation, and timing (PNT) sensors.

The operation sequence of free-space LPAI inertial sensors starts from a steady-state MOT to collect a large number of laser-cooled atoms. After releasing cold atoms from the MOT and performing a sub-Doppler cooling process, the atoms in the initially prepared atomic state with an optical pumping is subjected to a light-pulse sequence of state-dependent momentum kicks which splits, redirects, and recombines atomic wavepackets for LPAI operation with respect to atomic energy states. The interferometric fringe of LPAIs is measured by the atomic population differences after the light-pulse sequence of the LPAI, and the acceleration and angular velocity can be identified from the shift or variation of the atom interferometric fringe.

The laboratory demonstration of free-space LPAI accelerometers and gyroscopes shows the state-of-the-art performance and sensitivity. However, the free-space LPAI inertial sensor is subject to errors resulting from the relative movement between cold atoms released from a MOT and LPAI light pulses from the sensor platform, where high data-rate LPAI operation can reduce the errors, but the sensitivity is limited by a short interrogation time. In dynamic environments, the relative movement between atoms and the LPAI light pulses can become significant, especially for longer interrogation times, with the relative movement including cross-axis accelerations, cross-axis rotations, and on-axis acceleration of the atoms. The 1-D atomic guide can innately compensate for cross-axis accelerations and cross-axis rotations.

SUMMARY

The following is a brief summary of subject matter that is described in greater detail herein. This summary is not intended to be limiting as to the scope of the claims.

Technologies pertaining to guided cold atom inertial sensors are described herein. Additionally, various technologies pertaining to evanescent field optical dipole traps (EF-ODTs) with integrated membrane waveguide platforms, called photonic atom trap integrated platforms (ATIPs), are described herein, and in references M. Gehl, et. al., "Characterization of suspended membrane waveguides towards a photonic atom trap integrated platform," Optics Express, vol. 29, no. 9, art. no. 13129 (2021); and J. Lee, et. al., "Demonstration of a MOT in a sub-millimeter membrane hole," Scientific Reports, vol. 11, art. no. 8807 (2021), the contents of each of which are incorporated herein by reference. Photonic ATIPs are integrated photonic devices that are adapted to facilitate optical trapping of atoms near a surface of a waveguide by way of an EF-ODT. In an exemplary embodiment, a photonic ATIP includes a substrate that has an opening formed therein, a membrane that extends across the opening of the substrate, and waveguide formed on the membrane such that the waveguide extends across the opening in the substrate. As will be described in greater detail below, the membrane and/or substrate can include various features that are adapted to facilitate formation of an EF-ODT above the waveguide, and dissipation of heat away from the waveguide.

Once the atoms are guided to the EF-ODT with red-detuned and blue-detuned traveling-wave trapping beams, atoms can move freely along the guided geometry, for example, along the path of the waveguide in the ATIP. The atomic state of the guided atoms can be coherently controlled with microwave fields, free-space beams, or waveguide-coupled evanescent fields. Some configurations of light pulses can also provide the momentum kicks, i.e., photon recoils, that induce the guided motion of the guided atoms in the EF-ODT along the path of the waveguide toward a cold atom inertial sensor system.

First, the waveguide can be adapted to serve as guided atom accelerometers by guiding atoms along the straight region of the waveguide and performing atom interferometry sequence to measure the interferometric phase shift from linear acceleration. By way of example, not limitation, the waveguide configuration can be multi-axis or arrayed guided atom accelerometers for full x, y, z-axis accelerometers or common-mode noise rejection, respectively.

Second, the waveguide can be adapted to serve as guided atom gyroscopes by guiding atoms along a closed path of the waveguide and creating Sagnac area to measure the interferometric phase shift from rotation. By way of example, and not limitation, the waveguide can be a ring resonator or a $\Omega$-shaped waveguide that is adapted to facilitate trapping atoms near the surface of the waveguide and guiding atoms along a path of the waveguide.

Various integrated photonics and electronics can be integrated into the ATIP through the substrate (e.g., composed of silicon, silicon dioxide, fused-silica, or quartz), including optical resonators, Mach Zehnder interferometric waveguides, heterogeneously integrated photonics with silicon, III-V, or nonlinear-optic based elements, piezoelectric material on waveguides, polymer waveguides, microwave/RF transmission lines and antennas, DC voltage electrodes, current driving lines, etc.

The ATIP can be used in a guided cold atom inertial sensor system, such as a guided atomic accelerometer or a guided atomic gyroscope, that includes a control system, a laser system, a magnetic field system, and a vacuum chamber. The ATIP can be disposed within the vacuum chamber. The magnetic field system can be adapted to establish a magnetic field in a region about the waveguide of the ATIP. The laser system can be controlled to emit a plurality of cooling beams to a point of intersection that is within the region in which the magnetic field is established. For example, the plurality of cooling beams can be emitted so as to define a region of intersection that overlaps with the waveguide of the ATIP. At least one of the cooling beams can be emitted through the opening in the substrate.

To facilitate transmission of the cooling beams to the point of intersection, cold dense atoms can be generated at the opening of the membrane or at the suspended membrane waveguide that extends across the opening. The material and geometry of the membrane and suspended waveguide can be chosen and designed for substantial transparency at the wavelength of the cooling beams and sufficient dissipation of the heat generated from optical absorption at the suspended waveguide in vacuum (e.g., sufficient to prevent mechanical failure of the waveguide). Further, to facilitate migration of atoms about the membrane into the MOT, the membrane that extends over the opening in the substrate can have one or more apertures formed therein. Thus, the substrate has an opening over which the membrane extends, and the membrane has a distinct aperture, or opening, formed therein.

Doppler-cooled atoms are collected to form an atomic cloud at the interaction region of six circularly-polarized cooling beams and a quadrupole magnetic field, where the magnetic field is locally zero at the center of the MOT. When atoms move away from the field zero at the center of the MOT, the magnetic field gradient leads to the spatially-varying Zeeman level shift of atoms. Thus, the atomic transition becomes on-resonant with the red-detuned cooling beams due to Doppler effect and atoms receive momentum kicks by photon scattering in the opposite direction of the motion, which cool down the atoms in repeated cycles. The laser system may have four laser and optical components for (1) the MOT, (2) the EF-ODT, (3) the coherent atomic control, and (4) atomic population measurement. The laser system is controlled by a control system electronics which communicates with a user interface and can control the timing sequence of operation. For Doppler cooling and sub-Doppler cooling procedures with the MOT, the intensity, detuning, and pulse timing of cooling beams and a repump beam are controlled together with a quadrupole magnetic field and three-axis bias fields.

In connection with establishing an EF-ODT above the waveguide of the ATIP, two-color evanescent field trapping beams are coupled into the waveguide. The trapping beams include a red-detuned beam and a blue-detuned beam, the intensity, detuning, and pulse timing of which are controlled. The red-detuned beam is red-detuned with respect to the resonant optical transition of the atoms of an atomic ensemble that are present in the vacuum chamber and trapped in the MOT. The blue-detuned beam is blue-detuned with respect to the same resonant optical transition of the atomic ensemble. The red-detuned and blue-detuned beams establish, respectively, attractive and repulsive evanescent fields that result in trap potentials about the waveguide. In particular, repulsive evanescent fields need to compensate near-surface attractive potential, such as van der Waals. The interaction of these fields establishes an EF-ODT about the waveguide at a distance, e.g., of less than or equal to about 200 nanometers from the waveguide, which distance is less than a distance from the center of the MOT to the waveguide. The EF-ODT and the MOT can be overlapping in a region about the waveguide, such that some of the atoms in the MOT are loaded into the EF-ODT. The guided atoms in the EF-ODT can be addressed with the evanescent-field waveguide modes for coherent atom control or atom state measurement.

Once the atoms are guided to an EF-ODT with red-detuned and blue-detuned traveling-wave trapping beams, atoms can move freely along the one-dimensional (1D) guided geometry, for example, the path of the waveguide in the ATIP. Further, the atomic state can be coherently controlled with the free-space or guided (waveguide-coupled evanescent field) coherent atomic control beams. For guided atom interferometry, some configuration of light pulses provides the momentum kicks that induce the motion of the guided atoms in the EF-ODT along the path of the waveguide toward a cold atom inertial sensor system. The light-pulse sequences are based on (1) the free-space or guided Raman beams using a stimulated Raman transition, (2) the free-space or guided Bragg beams using a Bragg transition, or (3) the free-space focused beam of the State-Dependent Kick (SDK) transition, where the guided beam means the waveguide-coupled evanescent field. For example, Raman beams or Bragg pulses can establish evanescent fields about the waveguide or can drive free-space light about the guided atoms along the waveguide, which fields cause momentum kicks that induce motion in the guided atoms in the EF-ODT along a path of the waveguide. The Raman beams or Bragg pulses cause an atomic wavepacket to be split, redirected, and recombined for the purpose of atom interferometry. For closed-loop guided atom gyroscopes, the redirected pulse in atom interferometry can be neglected if the waveguide guides the split atomic wavepackets to the original position. For example, an SDK pulse scheme based on a dipole force from gradient of an optical potential can transfer an SDK momentum, $P_{SDK}$, on the guided atoms following a prepared atomic state by microwave pulses, which cause an atomic wavepacket to be split, redirected, and recombined for the purpose of atom interferometry.

An atom interferometric phase shift, resulting from acceleration of a guided atom accelerometer system or rotation of a guided atom gyroscope system, can be identified based upon (1) the internal-state-dependent atom detection or (2) the spatially-separated momentum-state-dependent atom detection. Raman beams and SDK pulse schemes use the internal-state-dependent atom detection because they use two hyperfine ground states for atom interferometry. Bragg pulses use the spatially-separated momentum-state-dependent atom detection because multiple momentum states of atomic wavepackets are based on the same hyperfine ground state for Bragg-pulse atom interferometry. First, the internal-state-dependent atom detection can be the evanescent-field light of an absorption probe or a phase-shift probe. Second, the spatially-separated momentum-state-dependent atom detection uses an imaging system, such as a CCD camera, which can measure the spatially-separated momentum states through an imaging system together with the evanescent-field or free-space light of an absorption or fluorescence probe. For both atom detections, the light is indicative of a probability of an atom being in one of two hyperfine ground states (Raman pulses or SDK pulse scheme) or one of multiple momentum states (Bragg pulses), which probability is in turn indicative of the atom interferometric phase shift. An acceleration of the guided atom accelerometer or a rate of rotation of the guided atom gyroscope system can be determined from the phase shift.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 8A-1 is a schematic diagram illustrating an exemplary free-space Raman pulse sequence for a free-space atom accelerometer.

FIG. 8A-2 is a schematic diagram illustrating an exemplary free-space Bragg pulse sequence for a free-space atom accelerometer.

FIG. 8A-3 is a schematic diagram illustrating an exemplary free-space SDK pulse sequence for a free-space atom accelerometer.

FIG. 8B is another schematic diagram illustrating an exemplary free-space/guided Raman pulse sequence for a guided atom accelerometer.

FIG. 8C is another schematic diagram illustrating an exemplary free-space/guided Bragg pulse sequence for a guided atom accelerometer.

FIG. 8D is another schematic diagram illustrating an exemplary free-space SDK pulse sequence for a guided atom accelerometer.

FIG. 10A-1 is a schematic diagram illustrating an exemplary free-space Raman pulse sequence for a free-space atom gyroscope.

FIG. 10A-2 is a schematic diagram illustrating an exemplary free-space Bragg pulse sequence for a free-space atom gyroscope.

FIG. 10A-3 is a schematic diagram illustrating an exemplary free-space SDK pulse sequence for a free-space atom gyroscope.

FIG. 10B is a schematic diagram illustrating an exemplary free-space Raman pulse sequence for a guided atom gyroscope.

FIG. 10C is a schematic diagram illustrating an exemplary guided Raman pulse sequence for a guided atom gyroscope.

FIG. 10D is a schematic diagram illustrating an exemplary free-space Bragg pulse sequence for a guided atom gyroscope.

FIG. 10E is a schematic diagram illustrating an exemplary guided Bragg pulse sequence for a guided atom gyroscope.

FIG. 10F is a schematic diagram illustrating an exemplary free-space SDK pulse sequence for a guided atom gyroscope.

DETAILED DESCRIPTION

Figure 1:
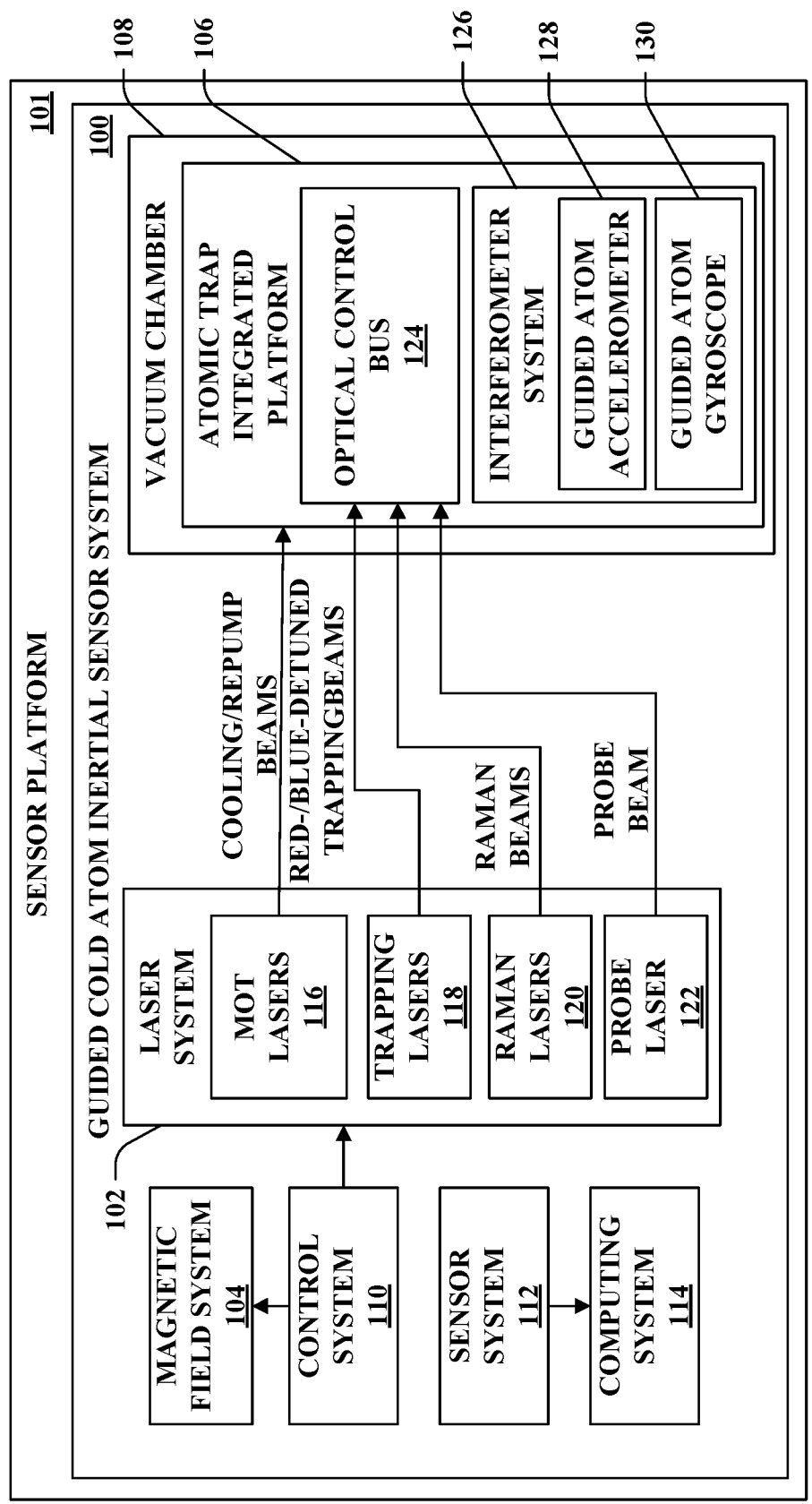
FIG. 1 is a functional block diagram of an exemplary guided cold atom inertial sensor system.

Various technologies pertaining to guided cold atom inertial sensors are now described with reference to the drawings, wherein like reference numerals are used to refer to like elements throughout. With greater specificity, technologies pertaining to atom interferometer accelerometers and gyroscopes implemented with membrane integrated photonics on photonic ATIPs are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be adapted to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Still further, as used herein, the terms "optical coupling," "direct coupling," "optically coupled," or "directly coupled" are intended to refer to direct propagation of light. Stated differently, as used herein the phrase "A is optically coupled to B" means that light is able to propagate from A to B by means other than an evanescent field. The term "evanescent coupling" or "evanescently coupled" is intended to refer to exchange of information or energy by way of an evanescent field. Stated differently, the phrase "A is evanescently coupled to B" means that an evanescent field emanates from object or location A and causes an effect on or in object or location B.

With reference to FIG. 1, an exemplary guided cold atom inertial sensor system 100 that facilitates determining accelerations and angular velocities of a sensor platform 101 based upon the atom interference of guided atoms in the EF-ODT along the path of the waveguide is illustrated. The system 100 is adapted to trap and cool neutral atoms in a MOT formed near the surface of a waveguide and to further load the atoms into an EF-ODT that is formed directly above the waveguide. Once the atoms are trapped in the EF-ODT, the system 100 can impart momentum to the atoms using light-pulse sequences for atom interferometry operation. The system 100 then detects atomic populations to measure the atom interference fringe and thereby determines accelerations and angular velocities of the sensor platform 101, as will be described in greater detail below.

The system 100 can be included on the platform 101. The platform 101 can be, for example, an aircraft, a spacecraft, a ship, a submarine, a missile, or other vehicle. The system 100 includes a laser system 102, a magnetic field system 104, an ATIP 106, and a vacuum chamber 108 within which the ATIP 106 is disposed. In the vacuum chamber 108, an atom source, for example, an alkali metal dispenser, generates a population of neutral atoms suitable for a MOT. The system 100 can further include a control system 110 that is adapted to control operations of the laser system 102 and the magnetic field system 104 (e.g., by way of control signals output by the control system 110 to the laser system and the magnetic field system 104). Still further, the system 100 can include a sensor system 112 and a computing system 114. Some of the sensor systems 112 can output sensor data indicative of a quantity of interest, such as atomic fluorescence light related to cold atoms in a MOT or waveguide-coupled absorption probe light related to guided atoms in the EF-ODT in the vacuum chamber 108, as described in greater detail below. The computing system 114 can be adapted to receive the sensor data from the sensor system 112. The computing system 114 can be adapted to compute, based upon the sensor data, an acceleration or an angular velocity of the platform 101 along or about one or more axes. In some embodiments, the sensor systems 112 may include, for example, a conventional inertial measurement unit (IMU), that provides information about the motion of the sensor platform 101 to a computing system 114. The computing system 114 then uses this information for the feedforward control processing to operate guided atom accelerometers and gyroscopes under dynamic environments.

As will be described in greater detail below, the laser system 102 and magnetic field system 104 are adapted to create a MOT in a vicinity of the ATIP 106 (e.g., intersecting with the ATIP 106). The laser system can further establish an evanescent-field mode guided through a suspended waveguide of a guided atom accelerometer 128 or a guided atom gyroscope 130 that is a part of the ATIP 106. The red-detuned and blue-detuned evanescent-field modes guided through the waveguide establish an EF-ODT. After loading cold atoms from a MOT to the waveguide, the EF-ODT can trap atoms nearby the surface of the waveguide. Once atoms are loaded into the EF-ODT and trapped proximally to the ATIP 106 (e.g., closer to the ATIP 106 than atoms initially trapped in the MOT), the laser system 102 can be further adapted to coherently control the atomic states, provide momentum to guided atoms for atom interference, probe the atomic population from atomic absorption or atomic fluorescence, and attain the information about accelerations and angular velocities from atom interferometric fringes.

The laser system 102 comprises MOT lasers (cooling/repump) 116, trapping lasers 118, Raman lasers 120, and a probe laser 122. The ATIP 106 comprises an optical control bus 124 and an interferometer system 126, which comprises a guided atom accelerometer 128 and a guided atom gyroscope 130. The optical control bus 124 is adapted to selectively couple various optical signals into various components of the interferometer system 126 (e.g., the guided atom accelerometer 128 and the guided atom gyroscope 130). While the interferometer system 126 is shown as including a single guided atom accelerometer 128 and guided atom gyroscope 130, it is to be understood that the interferometer system 126 can include multiple accelerometers and gyroscopes in order to detect motion of the platform 101 along and/or about multiple spatial axes. For example, the interferometer system 126 can include three accelerometers, each adapted to sense motion of the platform 101 along one of three orthogonal axes (x, y, and z spatial dimensions). In further exemplary embodiments, the interferometer system 126 can include three gyroscopes, each adapted to sense rotation of the platform 101 about one of the three orthogonal axes.

The ATIP 106 is an integrated photonics device that is adapted to facilitate trapping atoms by an evanescent field in close proximity to a surface of suspended waveguides included in the accelerometer 128 and the gyroscope 130 (e.g., within 200 nanometers of the surface of the suspended waveguides). The ATIP 106 can be further adapted to facilitate guided atoms in the EF-ODT based upon optical signals coupled into the suspended waveguides of the accelerometer 128 and gyroscope 130. As will be described in greater detail below, the suspended waveguides of the accelerometer 128 and gyroscope 130 are suspended over a region of empty space within the vacuum chamber 108 to facilitate loading of atoms into an EF-ODT in the vicinity of the surfaces of the waveguides.

The MOT lasers 116 are adapted to emit cooling beams, repump beam, and a depump beam (e.g., an optical pumping beam for initial atomic state preparation) into the vacuum chamber 108 to illuminate the ATIP 106 or a region of space that is proximal to the ATIP 106 within the vacuum chamber 108. A magnetic field system 104 with an anti-Helmholtz coil establishes a quadrupole magnetic field (not shown). Collectively, the cooling beams emitted by the MOT lasers 116 and the magnetic field gradient established by the magnetic field system 104 establish a MOT that locates laser-cooled atoms at the magnetic field zero point in a region that is proximal to the ATIP 106 within the vacuum chamber 108. The MOT lasers 116 are configured such that the cooling beams intersect within the regional proximal to the ATIP 106 and nearby a surface of the ATIP 106 (e.g., within a distance of 500 micrometers, 250 micrometers, or 100 micrometers of a surface of the ATIP 106). Intersection of the cooling beams within the magnetic field gradient established by the magnetic field system 104 establishes the MOT with an additional repump beam (e.g., emitted by a laser among the MOT lasers 116). The MOT is centered about an intersection of the cooling beams and confines a population of atoms within a region that is proximal to the ATIP 106 (e.g., within the region within which the magnetic field gradient is established). The magnetic field gradient established by the magnetic field system 104 and an intersection region of the cooling beams can both be overlapping with one or more waveguides included in the ATIP 106, such that the MOT intersects or overlaps with the one or more waveguides. In other words, the MOT causes a dense population of cooled atoms to be distributed about a waveguide.

Figure 2A:
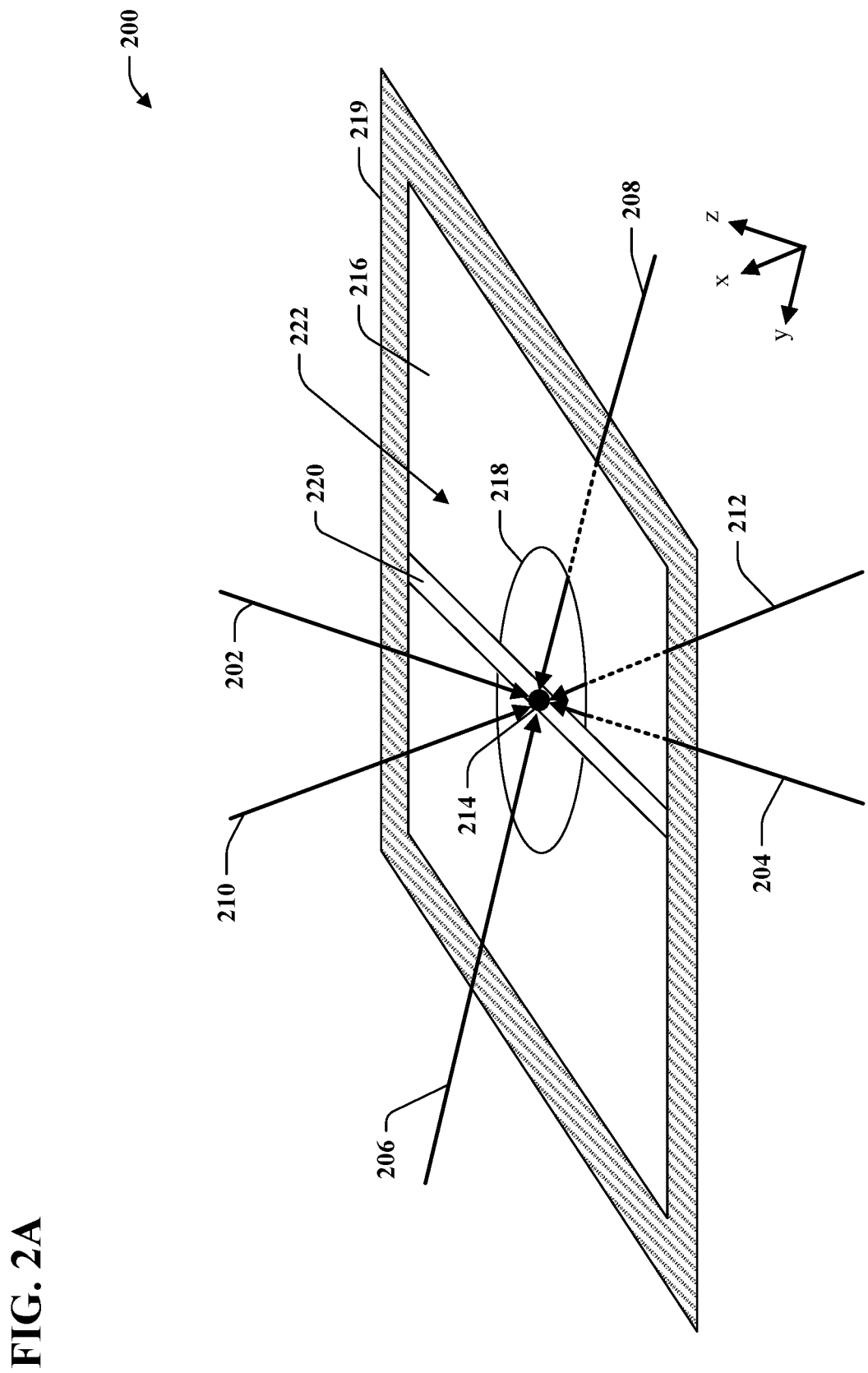
FIG. 2A is a perspective view of an exemplary ATIP that incorporates a suspended waveguide.
Figure 2B:
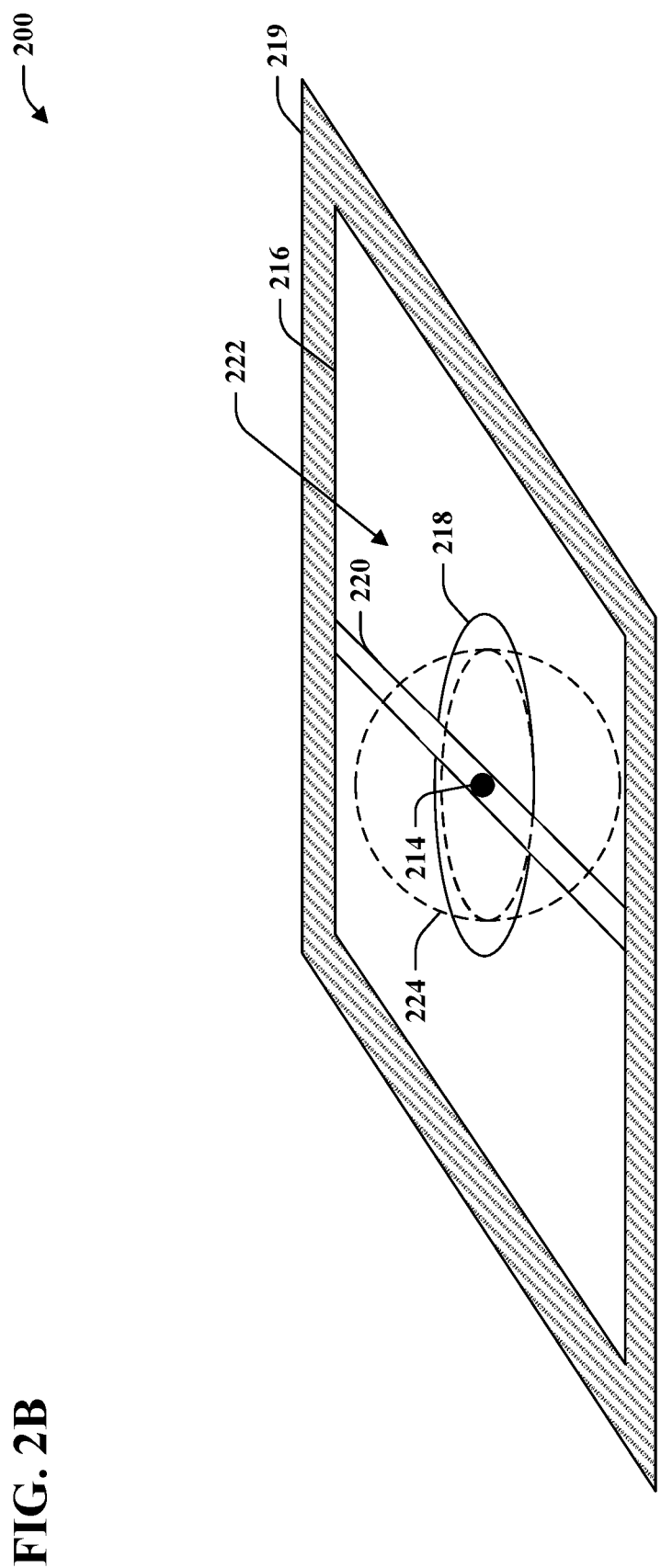
FIG. 2B is a perspective view of the exemplary ATIP of FIG. 2A that illustrates a MOT formed proximally to the ATIP.

By way of example, and with reference now to FIGS. 2A and 2B, an exemplary ATIP 200 is shown. FIG. 2A depicts the ATIP 200 and a plurality of six cooling beams 202-212 that intersect in a region 214 that is proximal to a surface of the ATIP 200. The exemplary ATIP 200 includes a membrane 216 having an aperture 218 formed therein, and a substrate 219 that supports the membrane 216. The ATIP 200 further includes a waveguide 220 that is disposed on the membrane 216 and across the aperture 218, such that the waveguide 220 is suspended over the aperture 218. The substrate 219 supports the membrane 216 around a periphery of the membrane 216, such that the ATIP 200 includes an interior portion 222 in which the substrate 219 is not present underneath the membrane 216. In other words, the substrate 219 has an opening formed therein over which the membrane 216 extends, and the membrane 216 has the aperture 218 formed therein, over which the waveguide 220 extends. As will be described in greater detail below, however, in at least some embodiments, a waveguide can extend proximally to one or more apertures, or between two apertures in a membrane. The aperture 218 can be a substantially circular aperture, with the waveguide 220 extending across the aperture 218 and bisecting the aperture 218. In various embodiments, and as described in greater detail below, the aperture 218 can be formed by etching of the membrane 216, backside etching of the substrate 219, and releasing the membrane 216 from the substrate 219. Thus, since the waveguide 220 is formed on the membrane 216, the aperture 218, when viewed from underneath, can be seen as two opposing circular segments, with a layer of membrane material extending along the length of the waveguide 220 and contiguous with the remainder of the membrane 216.

The region 214 of intersection of the cooling beams 202-212 is disposed within or above the aperture 218. The cooling beams 202-212 are arranged in three orthogonal pairs of counter-propagating beams. Stated differently, the beams 202, 204 form a first pair of beams that propagate in opposite directions, which directions are orthogonal to the directions of propagation of the remaining beams 206-212. Similarly, beams 206, 208 are a second pair of beams propagating in opposite directions, which directions are orthogonal to the directions of propagation of beams 202, 204, 210, 212. Finally, beams 210, 212 are a third pair of beams propagating in opposite directions, which directions are orthogonal to the directions of propagation of beams 202-208. Each of the pairs of beams can propagate along one of an x-, y-, or z-axis shown in FIG. 2A.

Thermal management within the ATIP 106 is important due to high optical loss and absorption in waveguides as compared with optical nanofibers, and the inability to conduct heat away from the ATIP 106 by convection due to the need for ultra-high vacuum conditions to form the MOT. In various embodiments, and referring once again to FIG. 2A, the substrate 219 is formed from silicon. Silicon has improved thermal conductivity as compared to, for example, silicon dioxide, and facilitates the transfer of heat away from the waveguide 220.

When composed of silicon, the substrate 219 is substantially opaque with respect to wavelengths of the cooling beams 202-212. The membrane 216 is adapted to be substantially transparent to the cooling beams 202-212. For example, the membrane 216 can be thin (e.g., less than or equal to 75 nanometers thick, less than or equal to 50 nanometers thick, or less than or equal to 25 nanometers thick) and composed of a material that is substantially transparent to wavelengths of the cooling beams 202-212 for certain atomic species. In exemplary embodiments, the membrane 216 can be composed of any transparent materials, such as aluminum oxide ($Al_2O_3$), silicon nitride ($Si_3N_4$), aluminum nitride (AlN), or etc. The membrane 216 can be constructed so that the membrane 216 has a transmittance of greater than 90%, greater than 95%, or greater than 99% with respect to wavelengths of the cooling beams 202-212. The transmittance also depends on the light polarization (e.g., s- or p-polarized light) and incident angle.

Figure 3A:
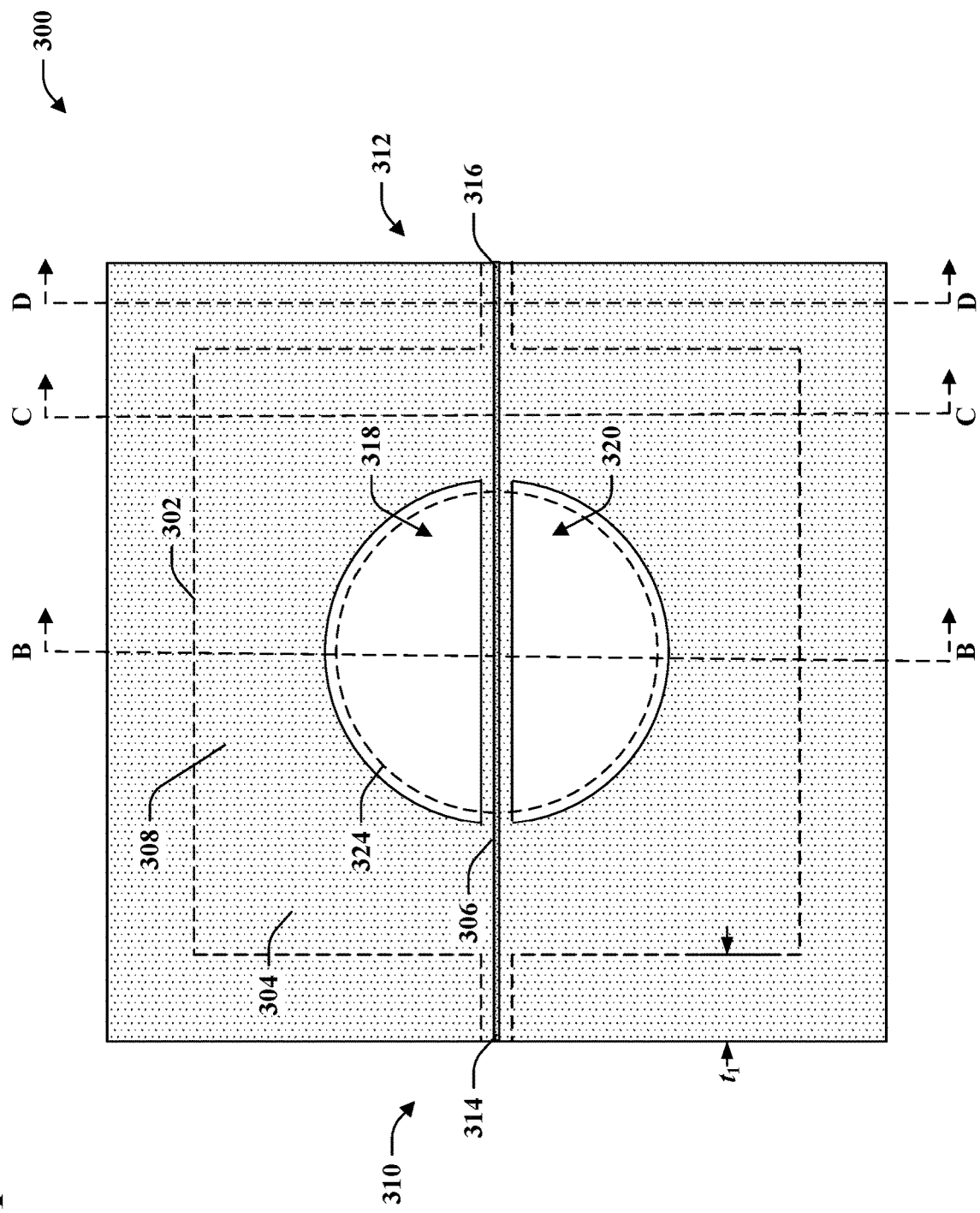
FIG. 3A is a top-down view of another exemplary ATIP.
Figure 3B:
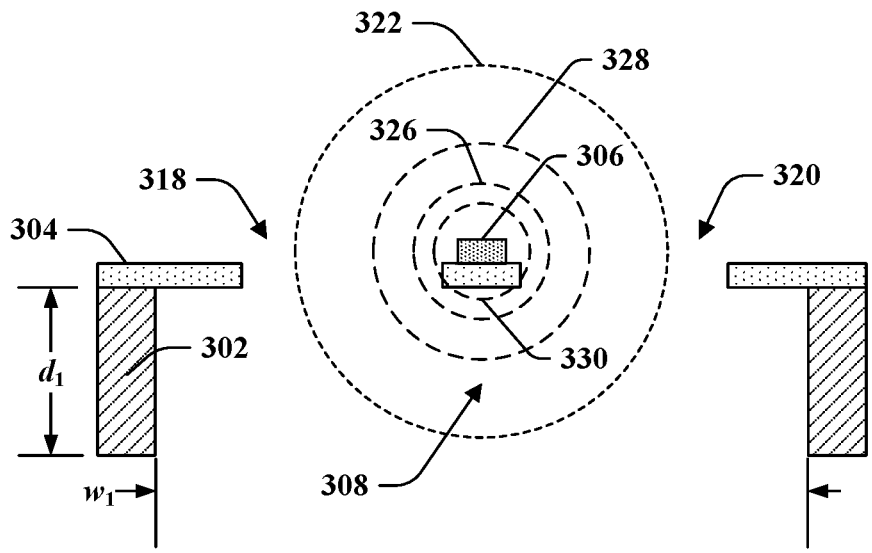
FIGS. 3B-3D are cross-sectional thin slices of the exemplary ATIP of FIG. 3A.
Figure 3C:
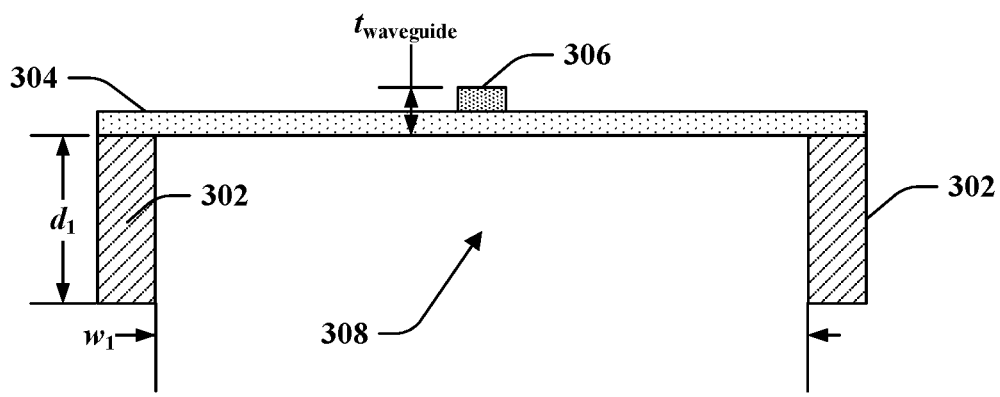

In exemplary embodiments, the height (or thickness) of the waveguide 220, (see, e.g., the thickness $t_{waveguide}$ of waveguide 306 shown in FIG. 3C), which can be, for example, a membrane ridge waveguide, can be less than or equal to 75 nanometers, less than or equal to 100 nanometers, less than or equal to 125 nanometers, or less than or equal to 150 nanometers, which is designed for optimal EF-ODTs with red-detuned and blue-detuned trapping beams and is independent of the optimal membrane thickness for high transmittance. This thin waveguide 220 results in an optical mode that is weakly confined to the material of the waveguide 220. This provides lower optical absorption relative to some other waveguide geometries, reducing the heat generated within the waveguide 220.

In some embodiments, a high refractive index waveguide core, e.g., silicon nitride (n=2.05), may be deposited and patterned as a waveguide above a low refractive index membrane, e.g., aluminum oxide (n=1.76). We can use this as the suspended waveguide of an ATIP. In various embodiments, another low refractive index membrane, e.g., aluminum oxide (n=1.76), covers the high refractive-index waveguide core to protect the high refractive-index waveguide core from degradation by alkali atoms. In some embodiments, a high refractive index waveguide core, e.g., silicon nitride (n=2.05), above a low refractive index membrane, e.g., aluminum oxide (n=1.76), is surrounded by the top and bottom, sandwiched low refractive-index cladding layers, e.g., silicon dioxide (n=1.47), at input and output light coupling regions, rather than the waveguide with the top open space and the bottom void in the substrate, which allows reliable optical packaging by way of fiber-to-waveguide butt coupling techniques. The thickness of a top or bottom cladding layer can be three to five micrometers according to the mode area of the coupling light.

When a suitable magnetic field is established within the region 214 at the same time that the cooling beams 202-212 intersect in the region 214, the interaction of the magnetic field and the cooling beams 202-212 create a MOT. The MOT is a region of space within which atoms (e.g., atoms that are present in the space about the ATIP 200) are trapped and cooled. Referring now to FIG. 2B, the ATIP 200 is shown with the MOT depicted as a sphere 224 centered about the region of intersection 214 of the cooling beams 202-212. It is to be understood that while depicted as a sphere 224 for simplicity, atoms in the MOT 224 can be present in a region that has a different shape or an irregular shape. Furthermore, atoms in the MOT 224 remain in motion and are distributed in a cloud within the MOT 224. Thus, a shape of the cloud of atoms in the MOT 224 changes over time. Further, a position of the MOT 224 can refer to a time-averaged position of a center of mass of the atoms trapped in the MOT 224.

Referring once again to FIG. 1, the near-surface formation of cold atoms with a MOT can be established by the MOT lasers 116, but the near-surface formation of cold atoms is limited within a distance of about 100 micrometers from the surface of the ATIP 106 (e.g., a surface of the membrane 216). A signal-to-noise ratio of a sensor (e.g., the guided cold atom inertial sensor system 100) based upon measurement of neutral atoms trapped by the ATIP 106 can be improved by increasing a number of atoms that can be trapped and guided by the ATIP 106. As noted above, however, the number of atoms trapped by a coarse free-space MOT generally decreases as a diameter of the cooling beams used to form the MOT is decreased. Accordingly, a device based solely on a coarse free-space MOT can have size, weight, and power (SWaP) that are limited by the diameter of cooling beams required to achieve a desired number of trapped atoms.

Referring once again to FIG. 1, the trapping lasers 118 are adapted to control the ATIP 106 (e.g., the guided atom accelerometer 128 or the guided atom gyroscope 130) such that an EF-ODT is formed within a distance of about 200 nanometers of a waveguide surface of the ATIP 106. The EF-ODT is formed by two red-detuned and blue-detuned evanescent fields (e.g., one red-detuned, one blue-detuned) propagating along the suspended waveguide of the guided atom accelerometer 128 or the guided atom gyroscope 130. The trapping lasers 118 are optically coupled to the waveguide such that light emitted by at least some of the trapping lasers 118 propagates through the waveguide. The trapping lasers 118 can be optically coupled to the waveguide by way of any of various optical and integrated photonics components. By way of example, and not limitation, the trapping lasers 118 can be optically coupled to the waveguide by any or a combination of reflectors, beam splitters, optical couplers, optical fibers, optical waveguides, etc. (e.g., included in the optical control bus 124).

The trapping lasers 118 are adapted to emit beams that are red-detuned and blue-detuned with respect to an optical resonant transition frequency of atoms that are desirably loaded into the EF-ODT formed at the ATIP 106. By way of example, and not limitation, for embodiments wherein the ATIP 106 is adapted to trap cesium atoms, the red-detuned beam can have a wavelength of about 937 nanometers (e.g., 937 nanometers±5 nanometers, ±3 nanometers, or ±1 nanometers), and the blue-detuned beam can have a wavelength of about 793 nanometers (e.g., 793 nanometers±5 nanometers, ±3 nanometers, or ±1 nanometers). The red-detuned and blue-detuned beams are coupled to a waveguide such that the beams travel through the waveguide.

As it travels through the waveguide, the red-detuned beam establishes an attractive evanescent field potential about the waveguide. The attractive evanescent field potential can extend into a region of space that includes the MOT. The attractive evanescent field potential causes atoms trapped in the MOT to be drawn closer to a surface of the waveguide. Simultaneously, as the blue-detuned beam travels through the waveguide, the blue-detuned beam establishes a repulsive evanescent field potential about the waveguide. The repulsive evanescent field tends to repel atoms from the surface of the waveguide 10 for compensating near-surface attractive potential, such as van der Waals.

The interaction of the attractive and repulsive evanescent fields about the waveguide tends to create a potential minimum in the vicinity of a surface of the waveguide. The interaction of an atom with the evanescent electric fields induces a spatially varying light shift, $\Delta E \sim \hbar\Omega^2(r)/4\Delta$, where $\hbar$ is the reduced Planck's constant, $\Delta$ is the detuning from resonance, and $\Omega(r)$ is the position dependent Rabi frequency. The resulting dipole force acting on the atoms is the derivative of this potential, $F_{dip}=-\partial(\Delta E)/\partial r$ and can be used to trap the atoms. Here, r is the distance from the surface of the waveguide. If the wavelength is tuned 'red' from the atomic resonance ($\Delta<0$), this force is attractive and if tuned 'blue' from resonance ($\Delta>0$), the force is repulsive. In both cases the force is strongest in regions of high intensity gradient of the evanescent fields. Hence, combining with van der Waals potential, propagation of the red-detuned beam and the blue-detuned beam through the waveguide creates a potential well with a minimum several hundred nanometers from the waveguide surface. Atoms in the MOT are attracted to the waveguide by the attractive evanescent field potential but are prevented from striking the waveguide by the repulsive evanescent field potential. The interaction of the attractive and repulsive evanescent field potentials about the waveguide causes an EF-ODT to be established proximal to a surface of the waveguide. For example, the EF-ODT can be established within a distance of 100 nanometers, a distance of 75 nanometers, or a distance of 50 nanometers of a surface of the waveguide.

The EF-ODT established by the red-detuned and blue-detuned beams traveling through the waveguide allows neutral atoms to be guided along the EF-ODT in closer proximity to a surface of the waveguide. For sufficient atom loading into the EF-ODT, it is necessary to realize near-surface formation of cold atoms, which is limited within a distance of about 100 micrometers from the surface of the ATIP 106 (e.g., the surface of the membrane 216). For instance, while atoms in the MOT can be held in a cloud that is, on average, centered in proximity to the waveguide, the number of atoms in the steady-state MOT decreases due to atomic collisions with the waveguide or membrane surface or atomic adsorption to the waveguide or membrane surface. Furthermore, the initial number of atoms in the steady-state MOT depends on the beam diameter and intensity of the cooling beams. Thus, when the cooling beams are shadowed by a needle structure (described below with reference to FIG. 5) or a partially-opaque membrane surface, the number of atoms in the MOT may be limited.

By holding atoms in close proximity to the waveguide, the EF-ODT with red-detuned and blue-detuned traveling-wave trapping beams allows the ATIP 106 to be used for cold atom position, navigation, and timing (PNT) sensors (e.g., the sensor system 100). Using the ATIP, guided atom interferometer accelerometers and gyroscopes can be demonstrated, which require fine control of internal atomic state, momentum kicks to construct atom interferometry, and measurement of atom interference fringes. For example, Raman beams (e.g., emitted by the Raman lasers 120) control internal atomic state and provide momentum kicks to perform atom interferometry, which is coupled into the waveguide or is driven to the guided atoms through free space. The probing beam that is emitted by the probe laser 122 and coupled into the waveguide can be used to measure atom interference fringes from guided atoms in the EF-ODT.

Doppler-sensitive Raman beams are composed of two counter-propagating beams with a proper configuration of light polarizations (σ⁺σ⁺, σ⁻σ⁻, Lin-Perp-Lin), which is based on a stimulated Raman transition that causes the atoms to absorb a photon from one beam and emit a photon into another beam moving in the opposite direction. The quantization axis is aligned along the Raman beams. Therefore, the net momentum kicks of two photons, i.e., the photon recoils, are delivered to the atoms in the light-pulse sequence of atom interferometry, and the atom changes both its kinetic energy and internal state. The three light pulses ($\pi/2 \to \pi \to \pi/2$) coupled to the waveguide can create the state-dependent momentum kicks on two hyperfine ground states of atoms to split, redirect, and recombine atomic wavepackets along the waveguide over light-pulse sequences, which can be used to construct guided cold atom inertial sensor systems 100 such as guided atom accelerometers (e.g., the accelerometer 128) and gyroscopes (e.g., the gyroscope 130). In other embodiments, the atom interferometry may be performed using Bragg pulses. For example, Bragg pulses can establish evanescent fields about the waveguide or can be driven to the atoms on the same hyperfine ground state through free space, which fields cause a large momentum transfer (LMT), e.g., $\pm N \cdot \hbar k_{\mathit{eff}}$, to the atoms and that induce motion in the guided atoms in the EF-ODT along a path of the waveguide. The Bragg pulses cause an atomic wavepacket to be split, redirected, and recombined for the purpose of atom interferometry.

In other embodiments, the atom interferometry may be performed using a focused beam and SDK pulse schemes, with a dipole force induced by a gradient of an optical potential. SDK pulse schemes can transfer an SDK momentum, $P_{SDK}$, on the guided atoms following a prepared atomic state by microwave pulses. The SDK pulse schemes cause an atomic wavepacket to be split, redirected, and recombined for the purpose of atom interferometry.

In other exemplary embodiments, the ATIP 106 can be used in a device that is adapted to trap and position atoms for atomic spin control, atomic spin readout, and interfacing of atomic spins with photonic and electronic devices.

The ATIP 106 can be constructed with micro/nano fabrication techniques, and the photonic and electronic components can be fabricated by way of integrated photonics manufacturing techniques and electronic integrated circuits manufacturing techniques. Thus, the guided cold atom inertial sensor system 100 can be made to have improved SWaP characteristics relative to a free-space cold atom inertial sensor system. Furthermore, the guided cold atom inertial sensor system 100 can be easier to manufacture to various shapes and configurations of sensors (e.g., arrayed sensors, linearly guided atom accelerometers, or ring-/M-shaped guided atom gyroscopes) as compared to a device that incorporates TOFs that are generally manufactured as a linear shape by high precision fiber-pulling techniques and are not flexible for various shapes and configurations.

As noted above, due to optical absorption loss in a waveguide, thermal dissipation can be a limiting factor to performance of the ATIP 106. For instance, a number of atoms that can be trapped by way of the EF-ODT can increase as the intensity of the attractive and repulsive evanescent fields emanating from the waveguide increases. The intensity of these fields, and in turn the trap depth, is a function of the powers of the red-detuned and blue-detuned beams propagating in the waveguide. However, as the powers of the red-detuned and blue-detuned beams are increased, the optical absorption from the suspended waveguide results in more heat generation that may reach the thermal threshold easily and break the suspended waveguide in vacuum. The vacuum conditions within which the MOT is established (i.e., within the vacuum chamber 108) limits heat dissipation to radiative and conductive means.

With reference now to FIGS. 3A-D, 4A-D, and 5A-D, exemplary ATIPs 300, 400, 500 are shown that are adapted to facilitate establishing an EF-ODT while dissipating heat generated from a waveguide that is suspended over an opening in a supporting substrate. The heat generated from a waveguide that is disposed on a membrane that is itself deposited on a supporting substrate that has no opening formed therein can be efficiently dissipated in a vacuum. These ATIPs 300, 400, 500 are adapted to support high optical power delivery through suspended membrane waveguides (e.g., greater than 14 mW, greater than 20 mW, or greater than 30 mW) without causing mechanical failure of the suspended waveguide in the ATIPs 300, 400, 500. Various embodiments of the ATIPs 300, 400, 500 have been shown to be capable of producing EF-ODTs with a trap depth of between about 300 μK or about 1 mK within a distance of about 200 nanometers of a surface of a waveguide. In various embodiments, the ATIP 106 of the guided cold atom inertial sensor system 100 can be or include the ATIPs 300, 400, 500.

Figure 3D:
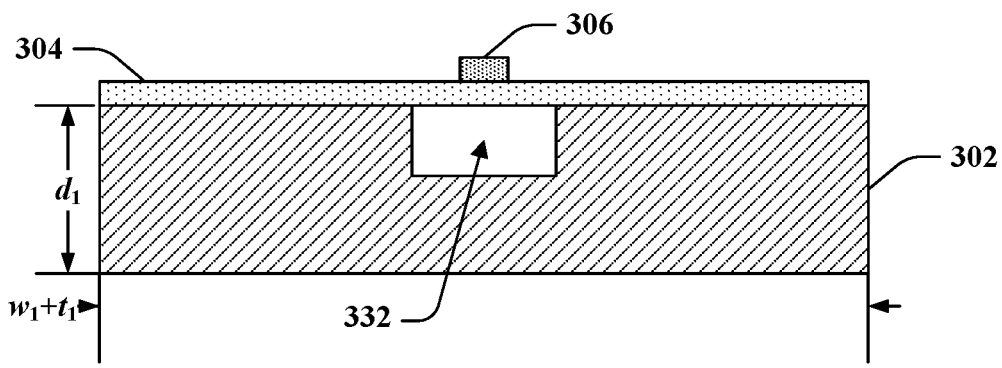

Referring now solely to FIGS. 3A-3D, the exemplary ATIP 300 is shown. FIG. 3A depicts a top-down view of the ATIP 300, FIG. 3B is a thin cross-sectional slice of the ATIP 300 taken along line B-B shown in FIG. 3A, FIG. 3C is a thin cross-sectional slice of the ATIP 300 taken along line C-C, and FIG. 3D is a thin cross-sectional slice of the ATIP 300 taken along line D-D. The ATIP 300 comprises a supporting substrate 302 (shown in FIG. 3A as a dashed line), a membrane 304 supported by the substrate 302, and a waveguide 306 that is disposed on and supported by the membrane 304. The substrate 302 can be formed from, for example, silicon, silicon dioxide, fused-silica, quartz, or other material that is suitable for forming structures using integrated photonics and electronics manufacturing techniques. In exemplary embodiments, the membrane 304 and/or waveguide 306 can be formed from aluminum oxide (alumina), silicon nitride, or aluminum nitride such that the membrane 304 is substantially transparent to cooling beams used to form a MOT for certain atomic species.

The substrate 302 has an opening 308, alternately referred to herein as the substrate opening, formed therein for cooling beams, and the membrane 304 has openings 318, 320, alternately referred to herein as the membrane openings, for MOT atoms. The substrate opening 308 allows cooling/repump beams that are emitted from a position below the substrate 302 to reach the membrane 304 and the waveguide 306. The membrane openings 318, 320 allow MOT atoms to migrate about the waveguide 306 without striking the membrane 304.

The waveguide 306 extends across the substrate opening 308 from a first side 310 of the substrate 302 to a second side 312 of the substrate 302, forming an input 314 and an output 316 of the waveguide 306, respectively. The waveguide 306 is supported by the membrane 304, which also extends across at least a portion of the substrate opening 308. The waveguide 306 is formed on the membrane 304 as a ridge waveguide such that light propagates in the membrane 304 and waveguide 306 confined along the path of the waveguide 306. The waveguide 306 is supported by the membrane 304 throughout the length of the waveguide 306 in the ATIP 300. The membrane 304 and the waveguide 306 are each suspended over the substrate opening 308. In other words, within the substrate opening 308 there is no substrate material supporting the membrane 304 and/or the waveguide 306.

The membrane 304 has the openings 318, 320 formed therein. In exemplary embodiments, the membrane 304 can extend across an entirety of the substrate opening 308 in the substrate 302 with the exception of the membrane openings 318, 320. The membrane openings 318, 320 facilitate migration of atoms from below the membrane 304 to a MOT 322 formed above the waveguide 306, as shown in FIG. 3B. The membrane openings 318, 320 therefore define a loading region 324 for the MOT 322 and an EF-ODT 326. The EF-ODT 326 can be formed by propagating red-detuned and blue-detuned trapping beams through the waveguide 306. The red-detuned trapping beam establishes an attractive evanescent field 328. The blue-detuned trapping beam establishes a repulsive evanescent field 330. The interaction of the fields 328, 330 and the near-surface attractive potential, which are disposed to at least partially overlap with the MOT 322, establish the EF-ODT 326. As indicated in FIG. 3C, the membrane 304 can extend across the width wi of the substrate opening 308 outside of the MOT/EF-ODT loading region 324 (e.g., along line B-B). Collectively, the membrane openings 318, 320 form a substantially circular aperture in the membrane 304. For example, the membrane openings 318, 320 can be circular segments positioned on either side of the waveguide 306 within the loading region 324.

Referring now specifically to FIGS. 3A and 3D, outside of the substrate opening 308 a void 332 can be formed in the substrate 302 such that the waveguide 306 is suspended (on the membrane 304) along the entire length of the waveguide 306 in the ATIP 300. Suspension of the waveguide 306 facilitates confinement of light along the path of the waveguide 306.

Figure 4A:
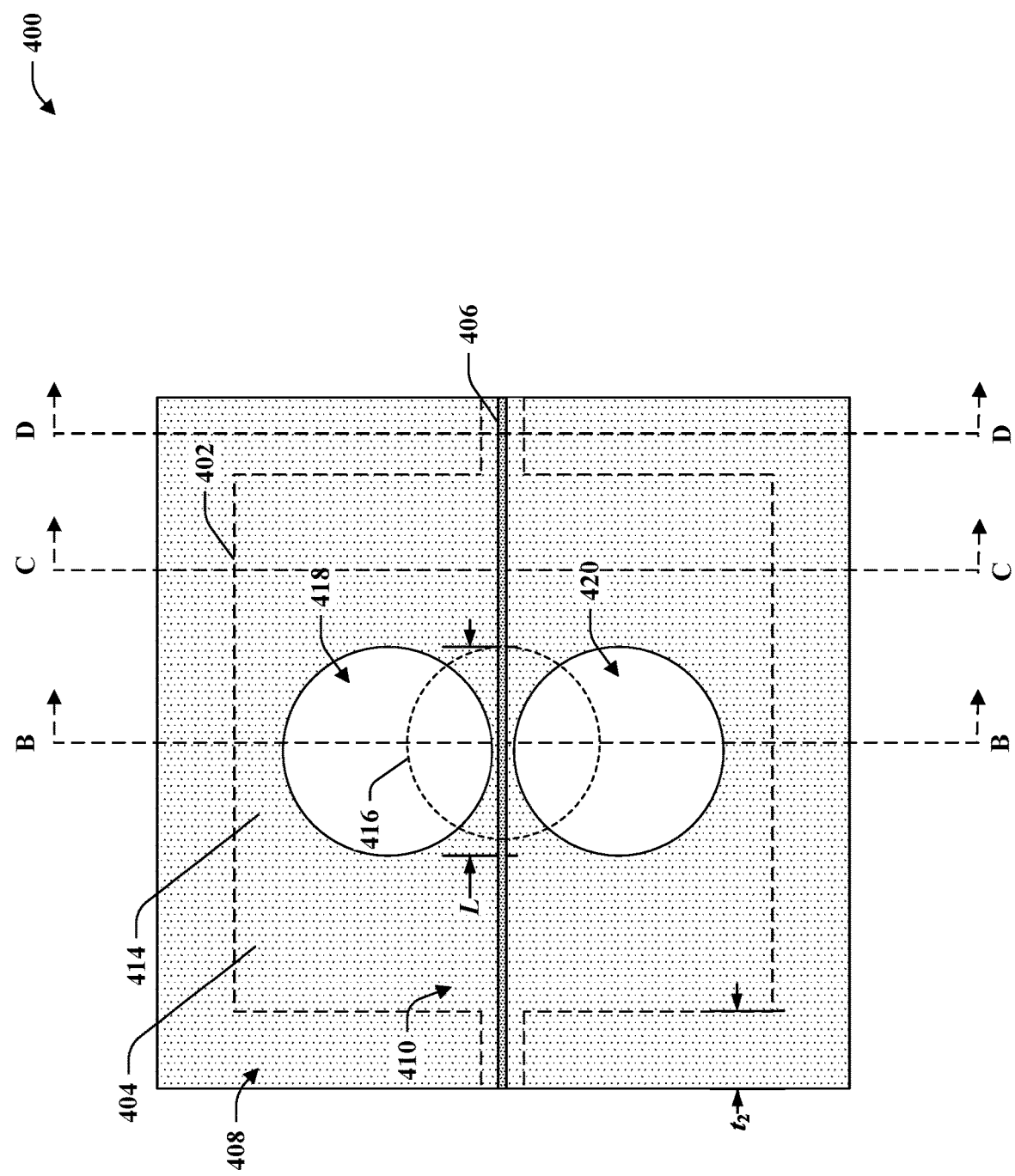
FIG. 4A is a top-down view of still another exemplary ATIP.
Figure 4B:
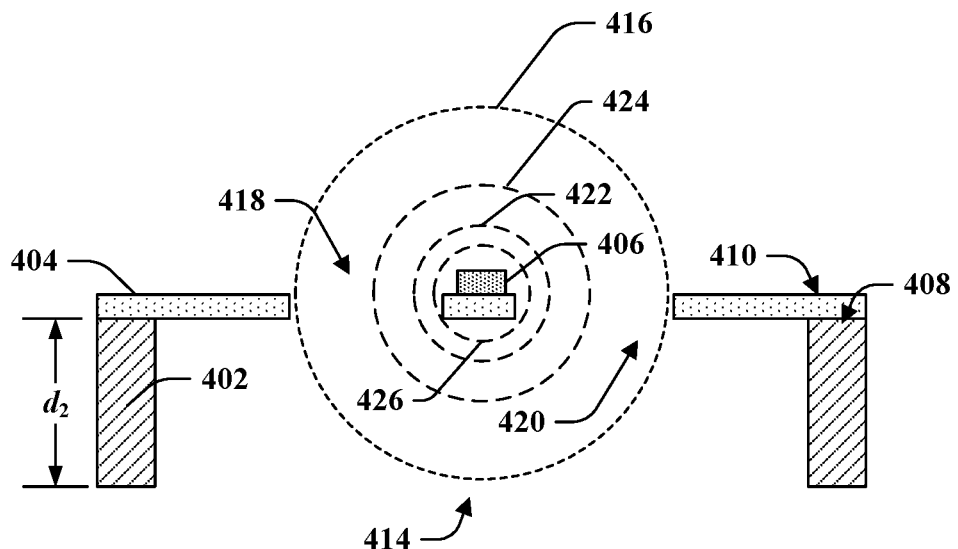
FIGS. 4B-4D are cross-sectional thin slices of the exemplary ATIP of FIG. 4A.
Figure 4C:
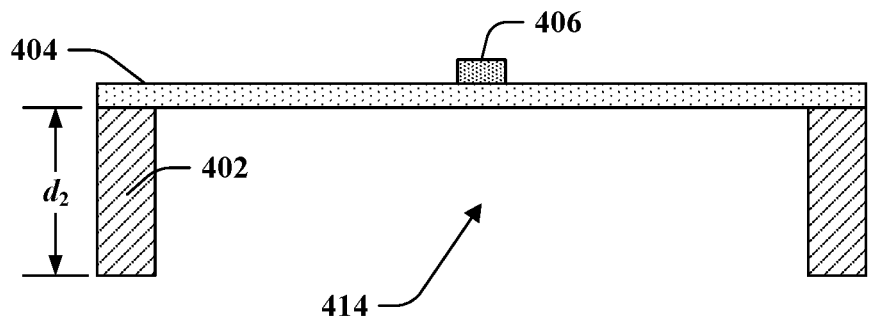
Figure 4D:
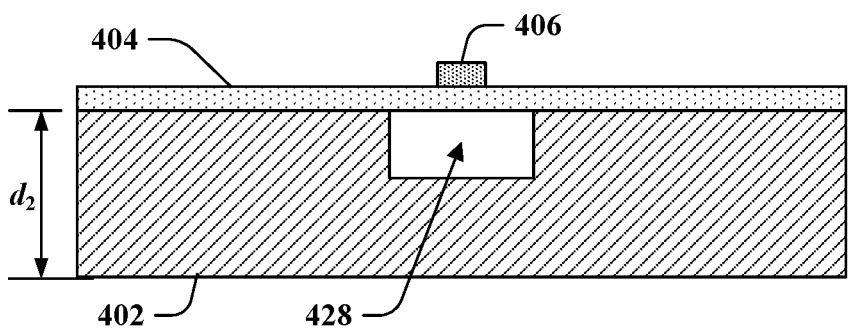

Referring now to FIGS. 4A-4D, the exemplary ATIP 400 is shown. The ATIP 400 can be referred to as an "infinity" configuration. FIG. 4A depicts a top-down view of the ATIP 400, while FIG. 4B is a cross-sectional thin slice of the ATIP 400 cut along line B-B shown in FIG. 4A, FIG. 4C is a cross-sectional thin slice of the ATIP 400 cut along line C-C, and FIG. 4D is a cross-sectional thin slice of the ATIP 400 cut along line D-D. The ATIP 400 comprises a supporting substrate 402 (shown in FIG. 4A as a dashed line), a membrane 404 supported by the substrate 402, and a waveguide 406 that is disposed on and supported by the membrane 404. The substrate 402 can be formed from silicon, silicon dioxide, fused-silica, quartz, or other material with which structures can be formed using integrated electronics and integrated photonics manufacturing techniques. The membrane 404 is supported by the substrate 402. As with the membrane 304, the membrane 404 can, in exemplary embodiments, be formed of aluminum oxide, silicon nitride, or aluminum nitride (or any other transparent membrane materials for the light wavelength of cooling beams used to form a MOT for atoms desirably trapped above the waveguide 406). The membrane 404 can be deposited on a surface 408 of the substrate 402 such that a surface 410 of the membrane 404 is positioned above the surface 408 of the substrate 402.

The substrate 402 has an opening 414 formed therein. The membrane 404 is suspended over the substrate opening 414 formed in the substrate 402. The membrane 404 can be substantially transparent to the cooling beams emitted by the MOT lasers 116. Thus, at least some of the cooling beams can be emitted through the substrate opening 414 in the substrate 402 and through the membrane 404 to intersect in a region proximal to or intersecting with the waveguide 406, forming a MOT 416 (e.g., a cloud of atoms having an extent shown in FIG. 4B). Atoms disposed about the ATIP 400 can be drawn into the MOT 416. The membrane 404 can have two apertures 418, 420 formed therein, allowing atoms that are disposed below the membrane 404 (e.g., on an opposite side of the membrane 404 as the waveguide 406) prior to formation of the MOT 416 to be loaded into the MOT 416.

It is to be understood that the region of space encompassed by the cloud of atoms trapped in the MOT 416 formed above the waveguide 406 can at least partially intersect with the waveguide 406 and/or the membrane 404. However, the center of mass of the MOT can be positioned offset from the waveguide 406 or within the waveguide 406.

The waveguide 406 is supported by the membrane 404 and extends across the opening 414 in the substrate 402. The apertures 418, 420 can be formed in the membrane 404 on opposite sides of the waveguide 406, such that the waveguide 406 extends along the membrane 404 between the apertures 418, 420. The apertures 418, 420 yield a tapering of the membrane 404 material near a center of the opening 414 in the substrate 402. In various embodiments, a portion of the waveguide 406 that is disposed above the opening 414 in the substrate 402 can rest solely on the membrane 404 across the substrate opening 414. In exemplary embodiments, the apertures 418, 420 are substantially circular apertures. However, other aperture geometries are contemplated as being within the scope of the present disclosure.

The red-detuned and blue-detuned beams generated by the trapping lasers 118 can be coupled to the waveguide 406. As described above, propagation of the red-detuned and blue-detuned beams through the waveguide 406 causes an EF-ODT 422 to be established above the waveguide 406 and proximal to the waveguide 406. The red-detuned beam causes an attractive evanescent field 424 to be established about the waveguide 406, and the blue-detuned beam causes a repulsive evanescent field 426 to be established about the waveguide 406. The interaction of these fields 424, 426 and the attractive near-surface potential establishes the EF-ODT 422. The EF-ODT 422 can be positioned closer to the waveguide 406 than the center of the MOT 416. While a center of mass of the MOT 416 and the EF-ODT 422 may be positioned within approximately similar distance to the waveguide 406, or at an approximately same position, it is to be understood that guided atoms in the EF-ODT 422 will be distributed in closer proximity to the waveguide 406 than a cloud of atoms trapped in the MOT 416.

The configuration of the membrane 404 supports dissipation of heat generated from the waveguide 406 while facilitating formation of the MOT 416 such that a cloud of atoms trapped by the MOT 416 overlaps with the suspended waveguide 406. The apertures 418, 420 in the membrane 404 allow atoms to move from one side of the membrane 404 to another (e.g., from a side of the membrane 404 that is opposite the waveguide 406 to a same side of the membrane 404 as the waveguide 406). Since the waveguide 406 is deposited on the membrane 404, the membrane 404 itself conducts heat away from the waveguide 406 throughout the length of the waveguide 406. The taper of the membrane 404 toward the center of the opening 414 in the substrate 402 allows atoms to readily move from one side of the membrane 404 to another in the region in which the MOT 416 is formed. The configuration of the membrane 404 also facilitates greater dissipation of heat dissipated by the waveguide 406 than a configuration in which the membrane 404 is strictly conformal to the waveguide 406. As the red-detuned and blue-detuned beams propagate through the waveguide 406, optical absorption in the waveguide 406 causes heat to be dissipated into and through the waveguide 406. The greater area of the membrane 404 compared to a waveguide-conformal membrane facilitates conduction of heat away from the waveguide 406 and provides greater heatsinking ability.

In one embodiment, experimental results have indicated the waveguide 406 can accommodate an optical signal of at least 30 mW. In this embodiment, a length L of a loading region of the waveguide 406, taken to be equivalent to a diameter of the apertures 418, 420 in the infinity design, was about 125 micrometers. In this embodiment, the membrane 404 and the opening 414 in the substrate 402 were squares of approximately 5 millimeters by 5 millimeters.

The exemplary substrate 402 and membrane 404 shown in FIGS. 4A-4D have substantially square or rectangular shapes. For instance, the substrate 402 has a cubic shape with at least partially open top and bottom faces. The exemplary membrane 404 depicted in FIGS. 4A-4D has a square slab shape with the apertures 418, 420 formed therein. However, it is to be understood that in other embodiments, the substrate 402 and membrane 404 can have other shapes. For example, the substrate 402 can have the shape of a cylinder with a partially open top and partial open bottom. In such embodiments, the membrane 404 can have the shape of a circular slab with the apertures 418, 420 formed therein. It is to be understood that the configuration of the substrate 402 can be adapted to accommodate a selected design of the membrane 404 and/or the waveguide 406.

In exemplary embodiments, the substrate 402 has a void 428 formed therein. The void 428 can be positioned below the waveguide 406 and membrane 404, such that the waveguide 406 is suspended throughout its length in the ATIP 400.

Figure 5A:
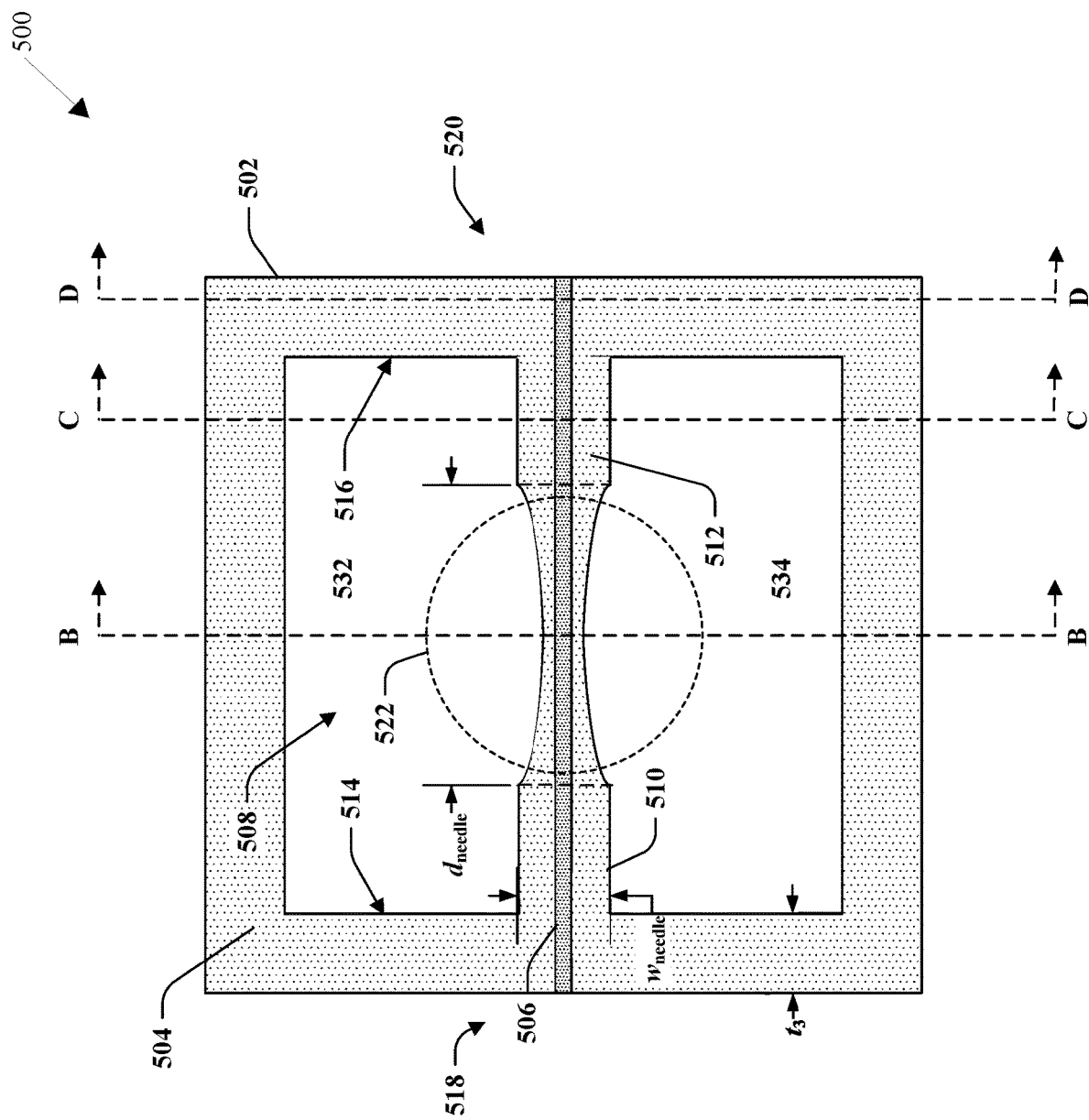
FIG. 5A is a top-down view of yet another exemplary ATIP.
Figure 5B:
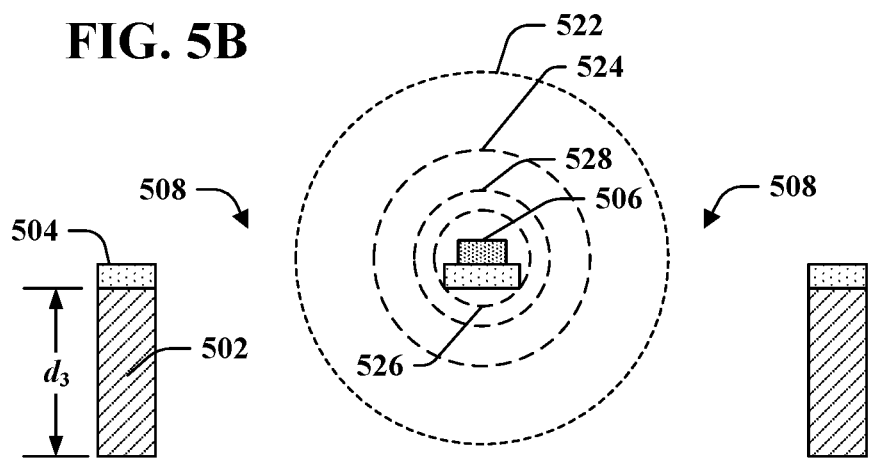
FIGS. 5B-5D are cross-sectional thin slices of the exemplary ATIP of FIG. 5A.
Figure 5C:
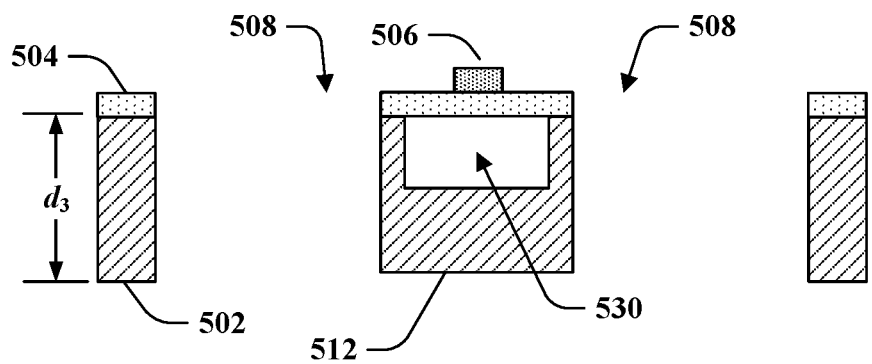
Figure 5D:
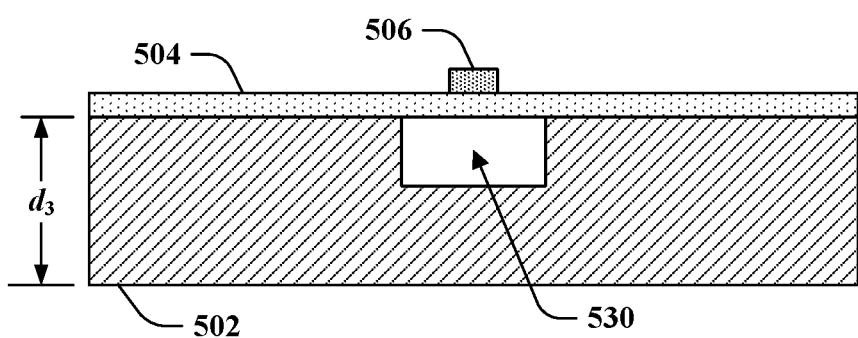

Referring now to FIGS. 5A-5D, the exemplary ATIP 500 is shown. FIG. 5A depicts a top-down view of the exemplary ATIP 500. FIG. 5B depicts a cross-sectional thin slice of the ATIP 500 cut along line B-B shown in FIG. 5A. FIG. 5C depicts a cross-sectional thin slice of the ATIP 500 cut along line C-C shown in FIG. 5A. FIG. 5D depicts a cross-sectional thin slice of the ATIP 500 cut along line D-D. The ATIP 500 includes a substrate 502, a membrane 504, and a waveguide 506 that is disposed on the membrane. The substrate 502 has an opening 508 formed therein. The substrate 502 includes a first needle structure 510 and a second needle structure 512 that extend into the opening 508 in the substrate 502 from opposite sides of the opening 508. For example, the ATIP 500 shown in FIGS. 5A-5D depicts a square opening, and the first needle structure 510 extends outward into the opening 508 from a first interior wall 514 of the substrate 502. The second needle structure 512 extends outward into the opening 508 from a second interior wall 516 of the substrate 502, the first interior wall 514 being opposite the second interior wall 516. The needle structures 510, 512 can be formed from a same material as the substrate 502 (e.g., silicon, silicon dioxide, fused-silica, quartz, or the like) and can further be monolithically integrated with the substrate 502 (e.g., formed by etching material from the substrate 502).

In the exemplary ATIP 500, the membrane 504 extends across the opening 508 in the substrate 502 between the first needle structure 510 and the second needle structure 512. The waveguide 506 extends across the membrane 504 and extends further across the needle support structures 510, 512 to opposite ends 518, 520 of the substrate 502. The membrane 504 has a taper toward a center of the waveguide 506 within the opening 508 in the substrate 502. In the exemplary ATIP 500 shown, a portion of the membrane 504 that extends between the needle structures 510, 512 has a width that is less than or equal to a width $w_{needle}$ of the needle structures 510, 512.

In the exemplary ATIP 500, the membrane 504 extends only between the two needle structures 510, 512. The configuration of the membrane 504 allows cooling beams to readily pass through the opening 508 in the substrate 502 to form a MOT 522 about the waveguide 506. Due to the limited extent of the membrane 504, atoms are also able to readily migrate toward the MOT 522 without interference from the membrane 504 due to the presence of much larger apertures 532, 534. It is to be understood, however, that the membrane 504 can instead be adapted to extend across substantially the entirety of the opening 508 in the substrate 502, excepting much smaller apertures to allow atom migration, in similar fashion to the apertures 418, 420 in the membrane 404.

As described above with respect to the ATIPs 300, 400, red-detuned and blue-detuned beams can be coupled into the waveguide 506. The red-detuned beam establishes an attractive evanescent field 524 about the waveguide 506. The blue-detuned beam establishes a repulsive evanescent field 526 about the waveguide 506. The interaction of these fields 524, 526 and the attractive near-surface potential with atoms trapped in the MOT 522 establishes an EF-ODT 528 about the waveguide 506.

While the needle structures 510, 512 can interfere with transmission of the cooling beams through the opening 508, or the migration of atoms through the opening 508, the needle structures 510, 512 facilitate conduction of generated heat away from the waveguide 506 and into the bulk of the substrate 502. Experimental results have indicated that one embodiment of the ATIP 500 can support an optical power of 20 mW through the waveguide 506 when the length of the waveguide 506 that extends between the needle structures 510, 512 is about 250 micrometers.

As shown in FIGS. 5C and 5D, the needle structure 512 has a void 530 formed therein, such that the waveguide 506 and membrane 504 are suspended over the needle structure 512 throughout the length of the needle structure 512. The void 530 can further extend into the remainder of the substrate 502 such that the waveguide 506 is suspended along its entire extent in the ATIP 500.

In various embodiments, the waveguides 306, 406, 506 of the ATIPs 300, 400, 500 can have a thickness (e.g., the thickness $t_{waveguide}$ shown in FIG. 3C) of less than or equal to 150 nanometers, less than or equal to 125 nanometers, less than or equal to 100 nanometers, or less than or equal to 75 nanometers. In some embodiments, the membranes 304, 404, 504 can be selected to have a thickness that is less than the thickness of the waveguides 306, 406, 506, such that the waveguides 306, 406, 506 are ridge waveguides. In such embodiments, the membrane 504 can have a thickness of less than or equal to 75 nanometers, less than or equal to 50 nanometers, or less than or equal to 25 nanometers. In other embodiments, the membranes 304, 404, 504 can be selected to have a thickness that yields an anti-reflection effect with respect to the cooling beams used to form the MOT 416. For example, an aluminum oxide (alumina) membrane 404 can be selected to have a thickness of about 260 nanometers, which has been shown to result in an anti-reflection effect that yields a transmission of greater than 95% with respect to an 852 nanometer cooling beam that is adapted to cool cesium atoms.

In exemplary embodiments, a distance $d_{needle}$ between the needle structures 510, 512 can be less than or equal to approximately 750 micrometers, less than or equal to approximately 600 nanometers, or less than or equal to approximately 500 nanometers. In these and other embodiments, the width $w_{needle}$ of the needle support structures 510, 512 can be less than or equal to approximately 500 micrometers, less than or equal to approximately 400 micrometers, or less than or equal to approximately 250 micrometers.

Furthermore, the substrates 302, 402, 502 can be configured with features that facilitate sinking heat from the waveguides 306, 406, 506 and/or radiating generated heat. By way of example, substrate depths $d_1$, $d_2$, or $d_3$ or thicknesses $t_1$, $t_2$, or $t_3$ of the substrates 302, 402, 502, respectively, can be selected to improve a thermal threshold (e.g., a failure threshold of the waveguides 306, 406, 506) or yield a desired thermal equilibrium of the waveguides 306, 406, 506 at an operating point of the waveguides 306, 406, 506 (e.g., a given optical input power to establish an EF-ODT). In still further embodiments, the substrates 302, 402 502 can include features that are intended to radiate heat away from the waveguides 306, 406, 506 and/or the MOT and EF-ODT. For example, the substrates 302, 402, 502 can include fins, ridges, bumps, or other features (not shown) that facilitate radiation of heat.

Figure 6:
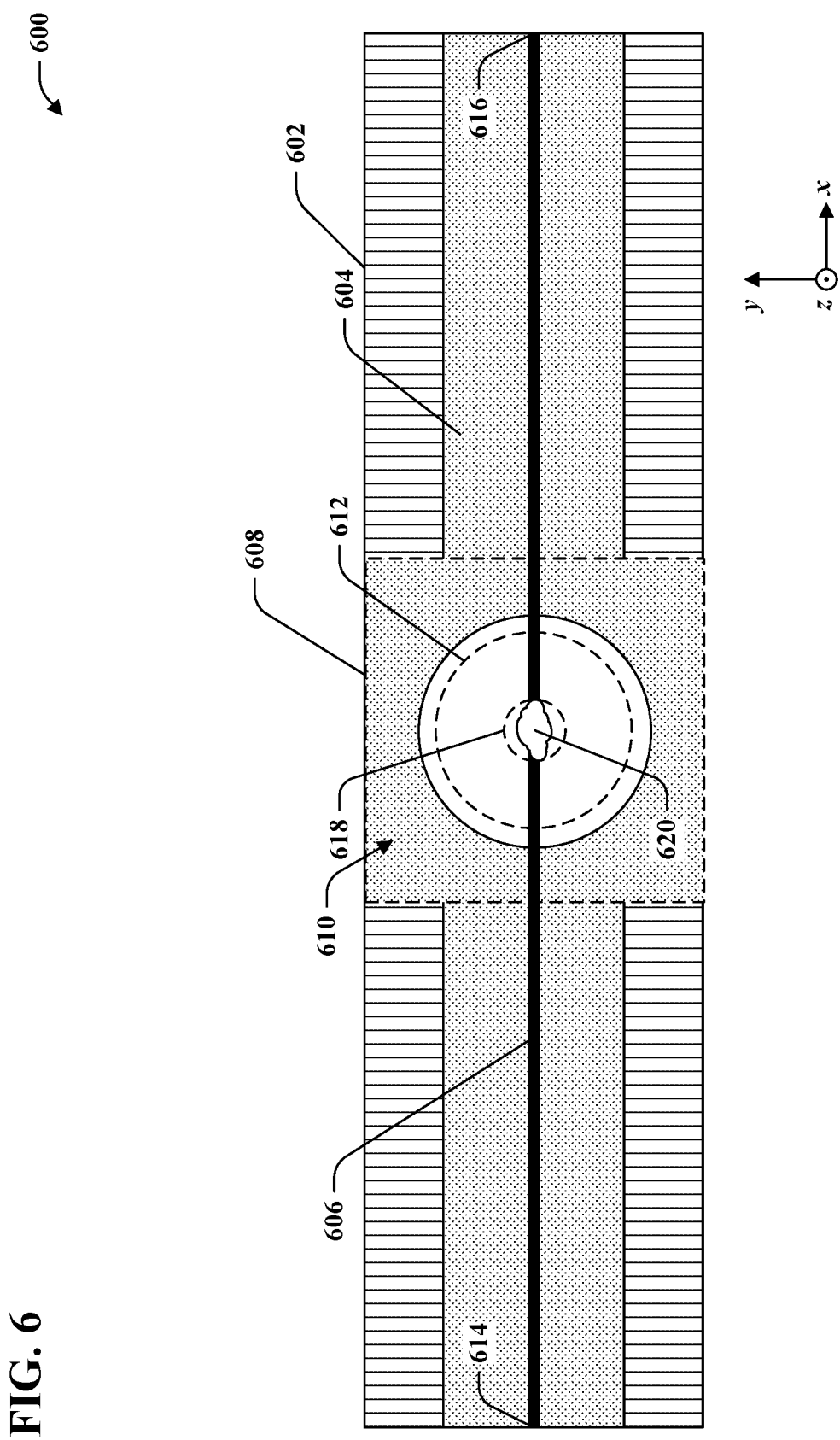
FIG. 6 is a top-down view of an exemplary guided atom interferometer accelerometer.

Referring now to FIG. 6, a top-down view of an exemplary guided atom accelerometer 600 is shown. In exemplary embodiments, the accelerometer 600 can be or be included in the guided atom accelerometer 128. The accelerometer 600 comprises a substrate 602, a membrane 604 disposed on the substrate 602, and a waveguide 606 disposed on the membrane 604. The accelerometer 600 includes a MOT/EF-ODT loading region 608. Within the loading region 608, the membrane 604 can be suspended across a substrate opening 610 that is formed in the substrate 602. The waveguide 606 can be suspended along its length (e.g., as described above with respect to the structures 300, 400, 500) to facilitate confinement of light in the membrane 604 and waveguide 606. In exemplary embodiments, the loading region 608 can be configured according to any of the suspended waveguide structures 300, 400, 500.

A MOT 612 can be formed within the loading region 608. The MOT 612 traps a population of atoms about the waveguide 606 within the loading region 608. The waveguide 606 can include a first input/output (I/O) port 614 and a second I/O port 616. The I/O ports 614, 616 can be coupled to the optical control bus 124 by any of various types of optical coupling mechanisms, such that optical signals can be output by the laser system 102 and coupled into the waveguide 606. Red-detuned and blue-detuned trapping beams (e.g., emitted by the trapping lasers 118) can be coupled into the I/O ports 614, 616. Attractive and repulsive evanescent fields formed about the waveguide 606 by propagation of the red- and blue-detuned trapping beams draw atoms trapped in the MOT 612 into an EF-ODT 618 that is formed about the waveguide 606.

Once a population of atoms 620 is trapped in the EF-ODT 618, the MOT 612 can be released (e.g., by turning off cooling/repump beams used to form and maintain the MOT 612). The population of atoms 620 can be held in position above/about the waveguide 606 by the EF-ODT 618. For example, the atoms 620 can be trapped by the EF-ODT 618 with red-detuned and blue-detuned traveling-wave trapping beams, such that the atoms 620 are able to move freely along the length of the waveguide 606, the sensing axis or on-axis direction, but are inhibited from moving in cross-axis directions (e.g., along the y- or z-axes in FIG. 6). Accordingly, it is to be understood that while the EF-ODT 618 is depicted as being positioned within the loading region 608, atoms that are trapped in the EF-ODT 618 can migrate along the length of the waveguide 606 while remaining trapped in the EF-ODT 618.

Figure 7A:
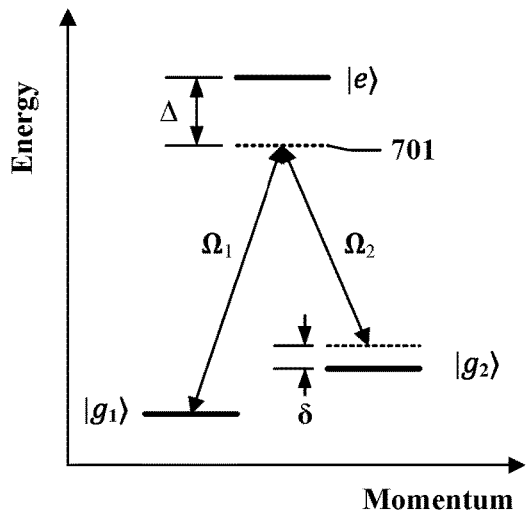
FIG. 7A is an energy state diagram of atoms in a guided atom inertial sensor system having a Raman configuration.

Doppler-sensitive Raman beams are emitted by the Raman lasers 120, which use a stimulated Raman transition and provide the state-dependent momentum kicks to atoms (see FIG. 7A). An exemplary free-space Raman pulse sequence can be applied to free-space atoms for a free-space atom accelerometer (see FIG. 8A-1). An exemplary free-space/guided Raman pulse sequence coupled into the waveguide 606 can be applied to guided atoms 620 in the EF-ODT for a guided atom accelerometer (see FIG. 8B). The stimulated Raman transition is based on three-level Λ-type atomic energy levels of the atoms 620. As will be described in greater detail below, acceleration of the atoms 620 along the sensing axis, i.e., the longitudinal direction of the waveguide 606, can be detected based upon atom interference fringes. As will be further described below, in some embodiments, Bragg beams are emitted by Bragg lasers, which use a Bragg transition and provide an LMT to atoms via Bragg diffraction (see FIG. 7B). An exemplary free-space Bragg pulse sequence can be applied to free-space atoms for a free-space atom accelerometer (see FIG. 8A-2). An exemplary free-space/guided Bragg pulse sequence coupled into the waveguide can be applied to guided atoms 620 in the EF-ODT for a guided atom accelerometer (see FIG. 8C). The Bragg pulses can be configured with two counter-propagating beams that are detuned to a small resonant frequency (e.g., about 10 kHz to about 750 kHz) for transferring a specific number of photon momenta. The Bragg pulses create multiple momentum states from the same hyperfine ground state with an LMT. The two momentum states can be selected by the optimal Rabi frequency of Bragg pulses.

Figure 7B:
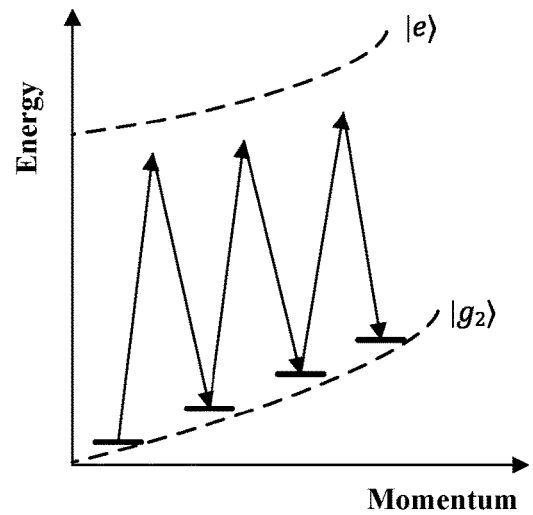
FIG. 7B is an energy state diagram of atoms in a guided atom inertial sensor system having a Bragg configuration.
Figure 7C:
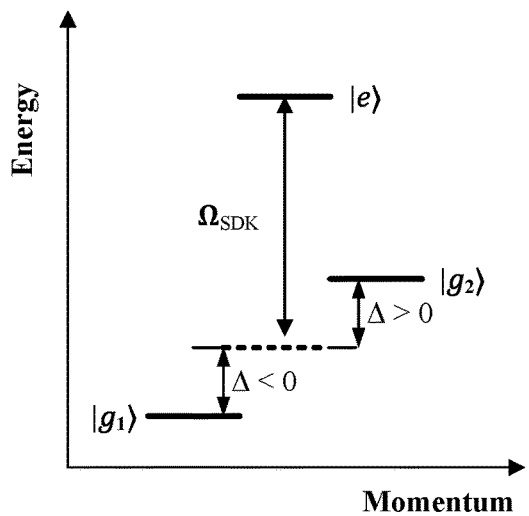
FIG. 7C is an energy state diagram of atoms in a guided atom inertial sensor system having an SDK configuration.

In some embodiments, SDK beams are generated from a tightly focused beam, which uses an SDK transition through microwave pulses for the state preparation and focused beams that drive a dipole force according to the sign of detuning (see FIG. 7C). An exemplary free-space SDK pulse sequence can be applied to free-space atoms for a free-space atom accelerometer (see FIG. 8A-3). An exemplary free-space SDK pulse sequence can be applied to guided atoms 620 in the EF-ODT for a guided atom accelerometer (see FIG. 8D). SDK pulse schemes are based on a dipole force from the spatial-gradient of an optical potential. The optical potential relates to the light shift on the atomic transition, $\Omega^2(r)/4\Delta$, where $\Delta$ is a detuning from the optical transition of atomic resonance and $\Omega(r)$ is a Rabi frequency of a potential light. The dipole force, $\partial/\partial r(\Omega^2(r)/4\Delta)$, drives SDKs along the transverse direction of the light propagation of a tightly-focused beam. Thus, a tightly-focused free-space beam can drive SDKs efficiently by using the steepest slope of the beam profile, and the direction of a force also depends on the sign of the detuning. The tightly-focused beam is detuned around the middle of the frequency difference between two hyperfine ground states of the guided atoms in the EF-ODT. Since one of two ground states experiences a blue-detuned beam and another state of two ground states experiences a red-detuned beam light, the dipole force drives $+P_{SDK}$ or $-P_{SDK}$ to each ground state of atoms to move in opposite direction along a path of the waveguide, i.e., the sensing axis or the on-axis direction, because of the opposite sign of the detuning. The free-space SDK pulse sequences for free-space and guided atom accelerometers are the same as follows: "π/2 (microwave)→SDK→π (microwave)→SDK (×2)→π(microwave)→SDK→π/2 (microwave)"process" (see FIG. 8A-3 and FIG. 8D). A first π/2 microwave pulse creates a superposition state of two ground states, a first SDK pulse (e.g., a pulse of a tightly focused free-space beam) moves each ground state in opposite direction, a first interrogation time T passes, a first π microwave pulse flip two internal states, during a second interrogation time T, second and third SDK pulses move each ground state to get back to the original position of the atoms, a second π microwave pulse flips two internal states (e.g., atoms of a first ground state are flipped to a second ground state, while atoms of the second ground state are flipped to the first ground state), a third interrogation time T passes, fourth SDK pulses slow down each ground state, and a second π/2 microwave pulse constructs atom interference fringes.

FIG. 7A illustrates the energy levels of free-space atoms or guided atoms in an EF-ODT (e.g., the EF-ODT 618) for a stimulated Raman transition (e.g., caused by the Raman beams) in accordance with some embodiments. From two counter-propagating Raman beams, the atom absorbs a photon from one beam and emits a photon into a beam moving the opposite direction, which provides a net kick of two photon momenta. In the stimulated Raman transition, the atom changes both its kinetic energy and its internal state. In some embodiments, the atom has two ground states $|g_1\rangle$ and $|g_2\rangle$, and an excited state $|e\rangle$. Counter-propagating Raman beams having polarization configurations of σ+σ+, σ−σ−, or lin-perp-lin, are adapted to drive the atomic clock transition between $|g_1\rangle$ and $|g_2\rangle$. This is accomplished by a two-photon process, where an atom in the state $|g_1\rangle$ is transferred to a virtual excited state that is detuned as Δ, the single-photon detuning, from the state $|e\rangle$ and then to the state $|g_2\rangle$ via stimulated emission by two Raman laser beams. The single-photon Rabi frequency $\Omega_1$ of a Raman laser beam is resonant with a transition $|g_1\rangle$ to $|e\rangle$ with an offset Δ. The single-photon Rabi frequency $\Omega_2$ of a Raman laser beam is resonant with a transition $|g_2\rangle$ to $|e\rangle$ with an additional offset δ, the two-photon detuning, in addition to the offset Δ. The effective two-photon Rabi frequency is $$\Omega_{\mathit{eff},0} = \Omega_1 \Omega_2 / 2\Delta, \quad \text{(Eq. 1)}$$

where $$\Omega_{\mathit{eff}} = \sqrt{\Omega_{\mathit{eff},0}^2 + \delta^2}. \quad \text{(Eq. 2)}$$

Under Raman transitions, the atomic cloud effectively behaves as a two-level system with states $|g_1\rangle$ and $|g_2\rangle$. In some embodiments when the atoms comprise $^{133}$Cs atoms, the atomic clock transition between $|g_1\rangle = |F=3, m_f=0\rangle$ and $|g_2\rangle = |F=4, m_f=0\rangle$ corresponds to two ground states in $|6S_{1/2}\rangle$, and the state $|e\rangle$ corresponds to the excited state in $|6P_{3/2}\rangle$. In some embodiments when the atoms comprise $^{87}$Rb atoms, the atomic clock transition between $|g_1\rangle = |F=1, m_f=0\rangle$ and $|g_2\rangle = |F=2, m_f=0\rangle$ corresponds to two ground states in $|5S_{1/2}\rangle$, and the state $|e\rangle$ is the excited state in $|5P_{3/2}\rangle$.

FIG. 7B illustrates the energy levels of free-space atoms or guided atoms in an EF-ODT for a Bragg transition. In a Bragg transition, two counter-propagating Bragg beams are detuned to a small resonant frequency for transferring a specific number of photon momenta via Bragg diffraction. Under such a Bragg transition, an atom remains in the same ground state $|g_2\rangle$, but gains kinetic energy.

FIG. 7C illustrates the energy levels of free-space atoms or guided atoms in an EF-ODT for an SDK transition. The tightly-focused beam $\Omega_{SDK}$ is detuned at the middle of the frequency difference between two ground states $|g_1\rangle$ and $|g_2\rangle$ of the guided atoms in the EF-ODT. Since one of two ground states experiences a blue-detuned beam and another state of two ground states experiences a red-detuned beam, the dipole force drives SDKs to the two ground states of atoms to move in opposite directions because of the opposite sign of the detuning.

Figures 1, 8A:
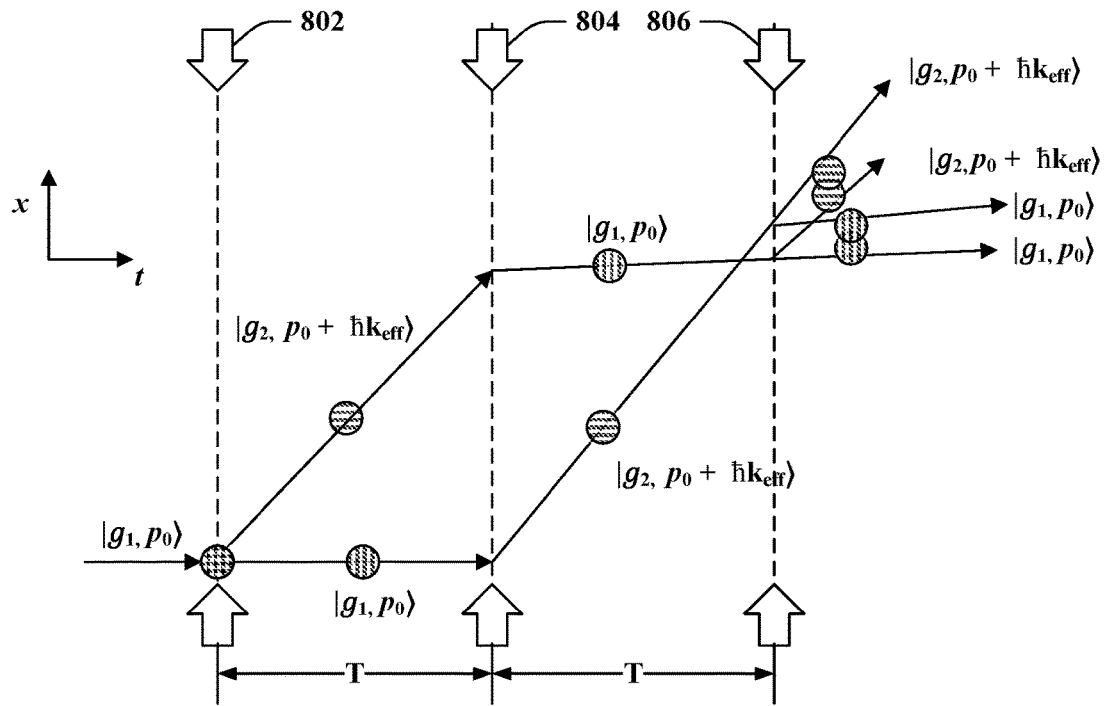

With reference now to FIG. 8A-1 (an exemplary free-space Raman pulse sequence for a free-space atom accelerometer) and FIG. 8B (an exemplary free-space/guided Raman pulse sequence for a guided atom accelerometer), schematics of Raman pulse pairs 802, 804, 806 applied to the population of free-space atoms (see FIG. 8A-1) and guided atoms 620 in the EF-ODT 618 (see FIG. 8B) are illustrated. Analogous to a free-space atom accelerometer, a guided atom accelerometer operates as follows. After trapping and cooling the atoms 620 in the EF-ODT 618, the atoms 620 are guided along a path of the accelerometer waveguide 606. The atoms 620 are subject to inertial forces such as accelerations and rotations in all three dimensions. However, in exemplary embodiments, the EF-ODT 618 tends to resist cross-axis motion of the atoms 620. For example, for the schematic shown in FIG. 8A-1, the sensing axis is defined as the x-axis. The atoms 620 are able to freely move along the x-axis (e.g., aligned with the length of the waveguide 606 extending from the first I/O port 614 to the second I/O port 616), and are constrained by the EF-ODT 618 from moving in the positive or negative y- or z-directions.

After the cold atoms 620 are loaded into the EF-ODT 618 and released to travel along the sensing axis (e.g., by generating a MOT 612, capturing Doppler-cooled atoms, cooling atoms further with sub-Doppler cooling, preparing the initial atomic state with an optical pumping, loading atoms into the EF-ODT 618, and turning off the EF-ODT 618), a sequence of counter-propagating Raman pulse pairs 802-806 from the Raman lasers 120 is applied to the atoms 620. In exemplary embodiments, each of the pulse pairs 802-806 consists of a first Raman beam that propagates from the first I/O port 614 to the second I/O port 616 and a second Raman beam that propagates from the second I/O port 616 to the first I/O port 614. In other embodiments, the pulse pairs 802-806 can be free-space Raman pulses that are emitted by the Raman lasers 120 through a region that includes the EF-ODT 618. In some embodiments, the sequence of Raman pulse pairs comprises three Raman pulse pairs 802-806, which split, redirect, and re-combine an atomic wavepacket of the atoms 620. The Raman pulses 802-806 are coupled into the waveguide 606 of the accelerometer 600. As each of the Raman pulse pairs 802-806 propagates along the waveguide 606, it establishes an evanescent field that interacts with the atoms 620 positioned about the waveguide 606 and trapped by the EF-ODT 618. Thus, Raman pulses that are coupled to the waveguide 606 are said to be "applied" to atoms in the EF-ODT 618.

When the atoms 620 are in the state $|g_1, p_0\rangle$, with $p_0$ being an initial momentum of the atoms, the first Raman pulse pair 802 (π/2-pulse) acts as a beamsplitter creating a superposition between the two atomic states of $|g_1, p_0\rangle$ and $|g_2, p_0+\hbar k_{\mathit{eff}}\rangle$, as illustrated in FIG. 8A-1, by creating the momentum kicked state $|g_2, p_0+\hbar k_{\mathit{eff}}\rangle$ from the $|g_1, p_0\rangle$ state due to absorption recoil along the x axis. The initial momentum $p_0$ may be due to two sources: (1) as the atoms have a finite temperature, they will have finite velocity spreads in 3D space with corresponding momentums, and (2) the atoms 620 may optionally be subjected to a launching beam, i.e., a pushing beam, which can deliver initial momentum to the atoms 620, and the atoms 620 receive an initial momentum primarily in the direction of the launching beam. After the first Raman pulse pair 802 is applied to the atoms 620, two atomic wavepackets in the states $|g_1, p_0\rangle$ and $|g_2, p_0+\hbar k_{eff}\rangle$, respectively, propagate freely along the sensing axis (e.g., a path of the waveguide 606) for a first interrogation time T. The second Raman pulse pair 804 ($\pi$-pulse) is applied to the two atomic wavepackets. The second Raman pulse pair 804 acts as a mirror turning the state $|g_1, p_0\rangle$ to the state $|g_2, p_0+\hbar k_{eff}\rangle$, and the state $|g_2, p_0+\hbar k_{eff}\rangle$ to the state $|g_1, p_0\rangle$. The two atomic wavepackets are then allowed to propagate freely along the sensing axis (e.g., the path of the waveguide 606) for a second interrogation time T. As time progresses, due to atoms in different atomic states having different momenta, the two atomic wavepackets converge, such that after the second interrogation time T has elapsed, the atomic wavepackets along two interferometric arms overlap with each other. The third Raman pulse pair 806 ($\pi/2$-pulse) is applied to the atomic wavepacket in the state $|g_2, p_0+\hbar k_{eff}\rangle$ and the atomic wavepacket in the state $|g_1, p_0\rangle$, recombining the atomic wavepackets to interfere with each other.

After the third Raman pulse 806 is applied (i.e., interfering atomic wavepackets), the atomic states of the atoms 620, i.e., the final atomic wavepacket, are detected using atomic fluorescence. For example, a probe beam (e.g., emitted by the probe laser 122) can be coupled into the waveguide 606. As the probe beam propagates through the waveguide 606, the probe beam establishes an evanescent field about the waveguide 606. The population of atoms 620 will be measured with the evanescent field of an absorption probe beam or phase-shift probe beam, whereby the probability Pg$_2$ of atoms being in the state $|g_2, p_0\rangle$ is measured as the phase of the third Raman pulse is scanned. In other embodiments, the probe beam can be emitted into free space about the waveguide 606 such that the probe beam stimulates fluorescence of the atoms 620 directly, rather than by way of an evanescent field emanating from the waveguide 606. Through this procedure, atom interferometry fringes are measured. The value of acceleration a is encoded in the probability:

$$Pg_2 = \frac{1}{2}(1 - \cos \Delta\phi_{acc}), \quad (Eq. 3)$$

where $$\Delta\phi_{acc} = k_{eff} \cdot a T^2. \quad (Eq. 4)$$

Accordingly, the value of acceleration a is measured by detecting the atomic fringes. The probability Pg$_2$ of atoms 620 being in the state $|g_2\rangle$ can be measured based upon light emitted by the atoms 620 in response to stimulation by the probe beam. In an exemplary embodiment, the sensor system 112 can include an optical sensor that receives light emitted from the atoms 620 in response to stimulation by the probe beam. The sensor system 112 outputs sensor data indicative of one or more parameters of the light (e.g., a spatial intensity distribution of the light as captured in an image of a region about the accelerometer 600). The computing system 114 can be adapted to compute an acceleration of the platform 101 along the sensing axis of the accelerometer 600 (e.g., the x-axis) during the interrogation periods based upon the sensor data.

Figures 2, 8A:
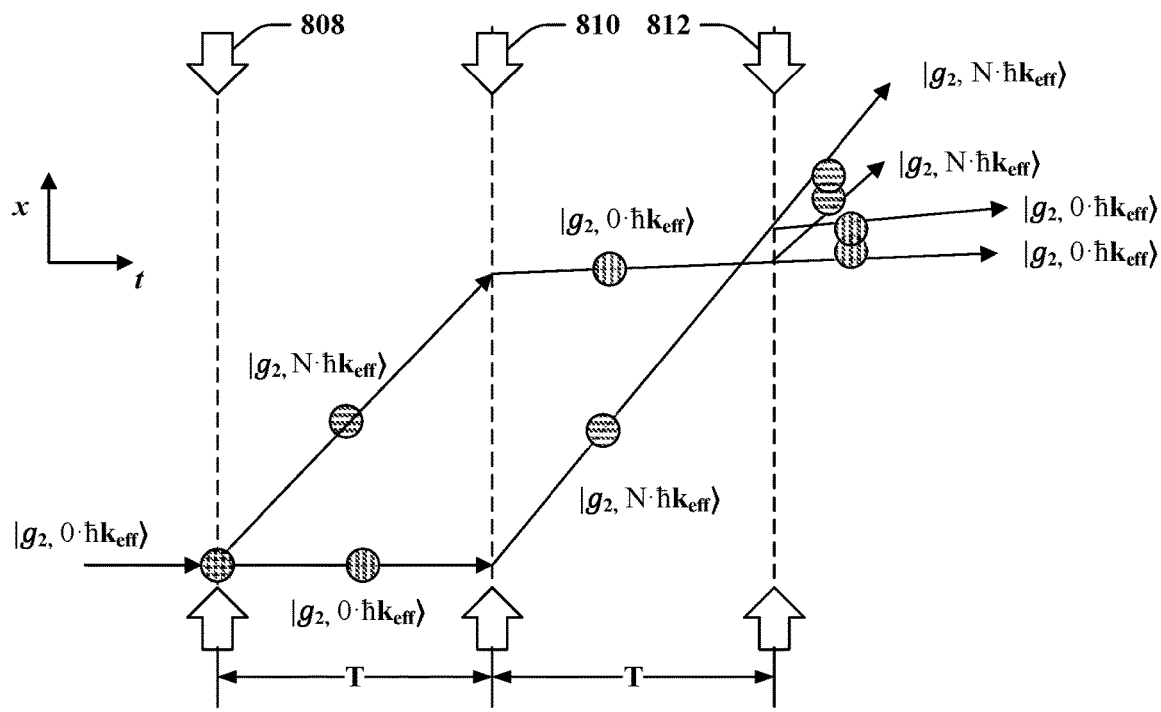

Referring now to FIG. 8A-2 (an exemplary free-space Bragg pulse sequence for a free-space atom accelerometer) and FIG. 8C (an exemplary free-space/guided Bragg pulse sequence for a guided atom accelerometer), schematics of exemplary Bragg pulse pairs 808-812 applied to the population of free-space atoms (see FIG. 8A-2) and guided atoms 620 in the EF-ODT 618 (see FIG. 8C) are illustrated. The Bragg pulse pairs 808-812 function in a substantially similar fashion to the Raman pulses 802-806, except that the Bragg pulses impart an LMT of N·$\hbar k_{eff}$ where N is a number of photon momenta that is determined by detuning and intensity of the Bragg pulses (as discussed above with respect to FIG. 7B). As discussed above with respect to the Raman pulse pairs 802-806, in a guided Bragg pulse configuration, the Bragg pulse pairs 808-812 can be coupled through the waveguide 606 of the accelerometer such that the Bragg pulse pairs 808-812 interact with the atoms 620 by way of an evanescent field. In other embodiments, the Bragg pulse pairs 808-812 can be free-space pulses that are emitted through a region in free space that includes the EF-ODT 618. The free-space Bragg pulse sequence for a free-space atom accelerometer (see FIG. 8A-2) with a Bragg transition (see FIG. 7B) is similar to the free-space Raman pulse sequence for a free-space atom accelerometer (see FIG. 8A-1) with a stimulated Raman transition (see FIG. 7A). The difference is that the Bragg-pulse atom interferometry uses multiple momentum states originated from the same hyperfine ground state.

Figures 3, 8A:
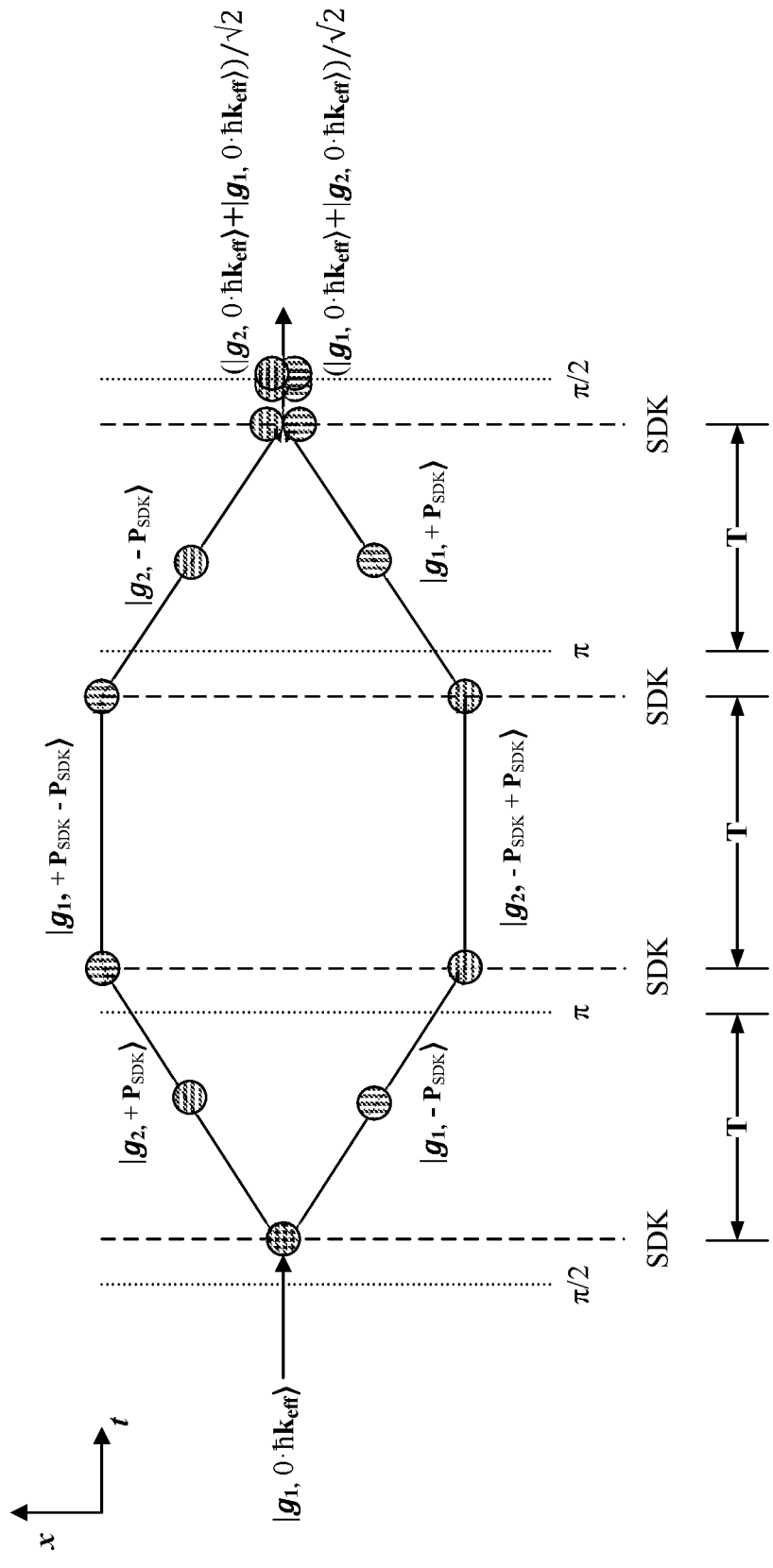

With reference now to FIG. 8A-3 (an exemplary free-space SDK pulse sequence for a free-space atom accelerometer) and FIG. 8D (an exemplary free-space SDK pulse sequence for a guided atom accelerometer), schematics of SDK pulse schemes applied to the population of free-space atoms (see FIG. 8A-3) and guided atoms 620 in the EF-ODT 618 (see FIG. 8D) are illustrated. SDK pulse schemes can perform internal atomic state control with a microwave field and establish the state-dependent kicks with optical fields, such as Raman beams or tightly-focused optical beams. In some embodiments, this SDK pulse scheme can be demonstrated with a tightly-focused optical beam whose dipole force can cause an atomic wavepacket to be split, redirected, and recombined for the purpose of atom interferometry. The optical potential is based on the light shift, $\Omega_{SDK}^2(r)/4\Delta$, of atoms, where $\Delta$ is a detuning from the optical transition of atomic resonance and $\Omega_{SDK}$ is a Rabi frequency of a potential light (see FIG. 7C). The dipole force is originated from the spatial gradient of the potential, $\partial/\partial r(\Omega_{SDK}^2(r)/4\Delta)$, which drives SDKs along the transverse direction, i.e., perpendicular to a direction of the light propagation of a tightly-focused beam. For example, the tightly-focused beam can be emitted along z-axis in FIG. 6 such that the beam intersects and is orthogonal to the surface (xy-plane) of the waveguide 606. In such embodiments, the dipole force drives the atoms 620 in transverse directions, x-axis and y-axis, but the guided atoms in the EF-ODT 618 are affected only with x-axis dipole force along the path of the waveguide 606. The sign of the detuning $\Delta$ also affect the direction of SDKs. The tightly-focused beam is detuned around the middle of the frequency between two hyperfine ground states of the guided atoms in the EF-ODT 618. Since one of two ground states experiences a blue-detuned light ($\Delta > 0$) and another state of two ground states experiences a red-detuned light ($\Delta < 0$), the SDK makes each ground state be kicked in opposite directions along a path of the waveguide. In some embodiments, the sequence of atom interferometry with SDK pulse scheme is as follows, and is depicted in FIG. 8A-3 and FIG. 8D. A first microwave pulse ($\pi/2$) creates a superposition state of two ground states in an atomic wavepacket, a first SDK pulse splits atomic wavepackets in opposite direction according to the internal state, a second microwave pulse ($\pi$) flips the internal state of two split atomic wavepackets, a second SDK pulse redirects the motion of atomic wavepackets, a third SDK pulse redirects atomic wavepackets to an original position, a third microwave pulse ($\pi$) makes the flips the internal state of two atomic wavepackets, a fourth SDK pulse recombines atomic wavepackets according to the internal state, and a fourth microwave pulse ($\pi/2$) performs atom interferometric measurement.

An atom interferometric phase shift, resulting from acceleration of a guided atom accelerometer system or rotation of a guided atom gyroscope system, can be identified based upon (1) the internal-state-dependent atom detection or (2) the spatially-separated momentum-state-dependent atom detection. Raman beams and SDK pulse schemes use the internal-state-dependent atom detection because they use two hyperfine ground states for atom interferometry. Bragg pulses use the spatially-separated momentum-state-dependent atom detection because multiple momentum-states of atomic wavepackets are based on the same hyperfine ground state and are created by an LMT of Bragg pulses for atom interferometry. First, the internal-state-dependent atom detection can be the evanescent-field light of an absorption probe or a phase-shift probe. An absorption probe is close to the atomic resonance, and measures light transmission which decreases according to the atom number due to light absorption by atoms. A phase-shift probe is off-resonant from the atomic resonance and measures the phase shift of light resulting from atoms with an optical interferometric setup. Second, the spatially-separated momentum-state-dependent atom detection uses an imaging system, such as a CCD camera, which can measure the spatially-separated momentum states through an imaging system together with the evanescent-field or free-space light of an absorption or fluorescence probe. For both atom detections, the light is indicative of a probability of an atom being in one of two hyperfine ground states (Raman pulses or SDK pulse scheme) or one of multiple momentum states (Bragg pulses), which probability is in turn indicative of the atom interferometric phase shift. An acceleration of the guided atom accelerometer or a rate of rotation of the guided atom gyroscope system or can be determined from the phase shift.

From the foregoing, it will be understood that a plurality of guided atom accelerometers can be adapted to facilitate measurement of acceleration along each of three orthogonal spatial directions (e.g., x, y, and z directions). For example, the interferometer system 126 can include three accelerometers configured in similar fashion to the guided atom accelerometer 600. Each of the three accelerometers can be positioned such that its waveguide is aligned with a different respective orthogonal axis (e.g., one of the x-, y-, and z-axes). The sensor system 112 can be adapted to measure atomic absorption or atomic fluorescence from atoms trapped about each of the accelerometers. For example, the sensor system 112 can capture an image of each of the accelerometers while probe beams are propagating through the waveguides of the accelerometers. Based upon the images, the computing system 114 can compute accelerations of the platform 101 in each of the x-, y-, and z-directions (e.g., based upon Eqs. 3 and 4 above).

Figure 9:
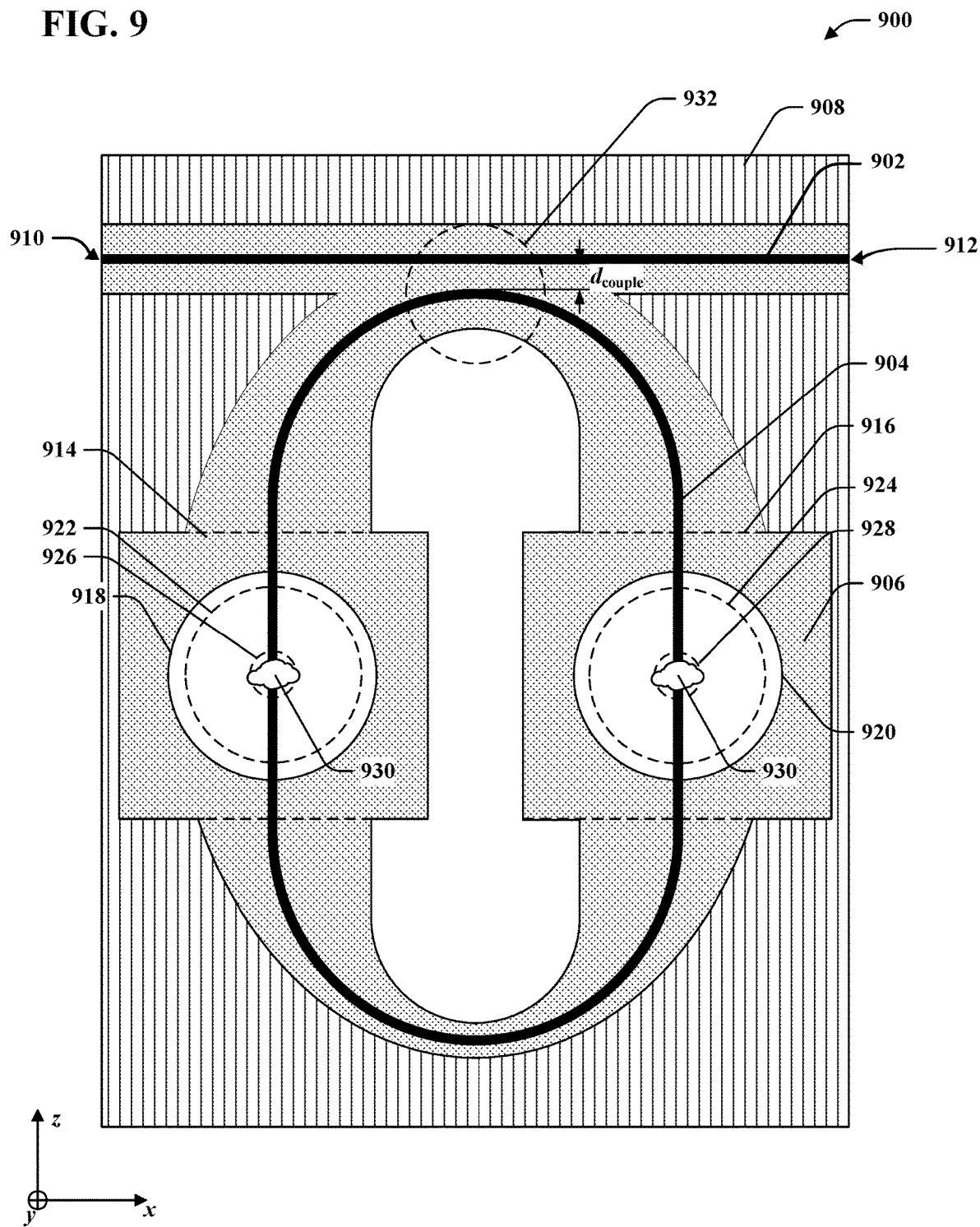
FIG. 9 is a top-down view of an exemplary guided atom interferometer gyroscope.

Referring now to FIG. 9, an exemplary guided atom gyroscope 900 is shown. In exemplary embodiments, the guided atom gyroscope 130 can be or include the gyroscope 900. In order to facilitate understanding, various exemplary operations of the system 100 are described with respect to interaction between components of the system 100 and the gyroscope 900. However, it is to be understood that these operations are not limited to performance with respect to the gyroscope 900, and that the gyroscope 130 can have various other configurations than the gyroscope 900.

The gyroscope 900 comprises a first, or coupling, waveguide 902 and a second, or resonator, waveguide 904. The waveguides 902, 904 are deposited on a membrane 906, which is in turn deposited on a substrate 908. The gyroscope 900 is adapted to facilitate loading of atoms into one or more MOTs positioned proximally to the resonator waveguide 904, trapping of MOT atoms in one or more EF-ODTs established about the resonator waveguide 904, and guiding of atoms along the path of the resonator waveguide 904 for performing atom interferometry.

The substrate 908 can be composed of silicon, fused silica, quartz, or the like. In various embodiments, a material that makes up the substrate 908 can be selected to have high thermal conductivity to facilitate conduction of heat away from the resonator waveguide 904. The material of the substrate 908 and/or the membrane 906 and waveguides 902, 904 can be selected to facilitate manufacture of the gyroscope 900 by conventional semiconductor fabrication processes such as photolithography, selective etching, and the like. In addition to facilitating confinement of light along the waveguides 902, 904 membrane 906 is adapted to provide mechanical support for the waveguides 902, 904, as well as thermal dissipation of heat generated during operation of the waveguides 902, 904 (e.g., by propagation of optical signals through the waveguides 902, 904). Furthermore, the membrane 906 is adapted to facilitate generation of a MOT in one or more loading regions along the resonator waveguide 904.

The coupling waveguide 902 is adapted to be optically coupled to a laser system (e.g., the laser system 102). For example, the coupling waveguide 902 can be adapted to interface with other optical components such as optical fibers, other waveguides, optical couplers, etc., (e.g., that are included as part of the optical control bus 124), at either of two ends 910, 912 of the coupling waveguide 902. As will be described in greater detail below, beams such as those emitted by the trapping lasers 118, the Raman lasers, and/or the probe laser 122 can be coupled into the coupling waveguide 902 in order to operate the ATIP 106 for atom interferometry.

The resonator waveguide 904 is a closed-loop waveguide configured as a ring resonator. As will be described in greater detail below, the resonator waveguide 904 is adapted to function as an interferometer (e.g., as part of the interferometer system 126). The gyroscope 900 is configured such that a MOT can be formed proximally to a surface of the resonator waveguide 904. For example, the gyroscope 900 includes two loading regions 914, 916. The gyroscope 900 can include apertures 918, 920 that extend through the membrane 906 and the substrate 908 in the loading regions 914, 916. The loading regions 914, 916 are regions in which the resonator waveguide 904 extends across a region of empty space defined by the apertures 918, 920, thereby facilitating the migration of atoms into MOTs 922, 924 formed about the resonator waveguide 904 in the loading regions 914, 916.

When the MOTs 922, 924 are established (e.g., by the magnetic field system 104 and the MOT lasers 116) an ensemble of atoms is present about the resonator waveguide 904 within the apertures 918, 920. These atoms can be loaded into EF-ODTs 926, 928 positioned above the waveguide 904 to facilitate atom interferometry.

In exemplary embodiments, red-detuned and blue-detuned trapping beams can be directly coupled into the coupling waveguide 902. The gyroscope 900 can include an evanescent coupling region 932 in which the coupling waveguide 902 is positioned proximally to a portion of the resonator waveguide 904. A distance $d_{couple}$ between the coupling waveguide 902 and the resonator waveguide 904 within the coupling region 932 can be selected based upon design parameters of the system 100 and the gyroscope 900. For example, the distance $d_{couple}$ can be selected based on powers of the detuned trapping beams and/or dimensions of the waveguides 902, 904.

By virtue of evanescent coupling between the waveguides 902, 904 in the coupling region 932, the red-detuned and blue-detuned trapping beams that propagate in the coupling waveguide 902 are caused to propagate in the resonator waveguide 904. As the trapping beams propagate in the resonator waveguide 904, the EF-ODTs 926, 928 are formed about the resonator waveguide 904 in the loading regions 914, 916. Atoms are loaded from the MOTs 922, 924 into the EF-ODTs 926, 928, respectively.

Raman/Bragg beams can be directly coupled to the coupling waveguide 902. By way of example, the Raman lasers 120 and the optical control bus 124 can be configured such that counter-propagating Raman beams are coupled to the coupling waveguide 902. Stated differently, the Raman lasers 120 can output a first Raman beam that propagates from the first end 910 of the coupling waveguide 902 to the second end 912, and can further output a second Raman beam that propagates from the second end 912 of the coupling waveguide 902 to the first end 910. The Raman/Bragg beams couple to the resonator waveguide 904 by way of evanescent coupling in the coupling region 932.

As the Raman/Bragg beams propagate (in opposite directions) around the resonator waveguide 904, the Raman/Bragg beams impart momentum kicks to guided atoms in the EF-ODTs 926, 928. The momentum kicks cause an atomic wavepacket of the atoms to be split, redirected, and then recombined. Motion of a platform on which the gyroscope 900 is included (e.g., the platform 101) can then be detected based upon differences in atomic states of the atoms after these transitions.

In some embodiments, after laser cooling and trapping atoms 930 in one or both of the EF-ODTs 926, 928, the atoms 930 are guided along a path of the resonator waveguide 904. The atoms 930 are then subject to inertial forces such as accelerations and rotations in all three dimensions. The atoms 930 are able to freely move along the path of the resonator waveguide 904, but are confined from moving along transverse directions.

Figures 1, 10A:
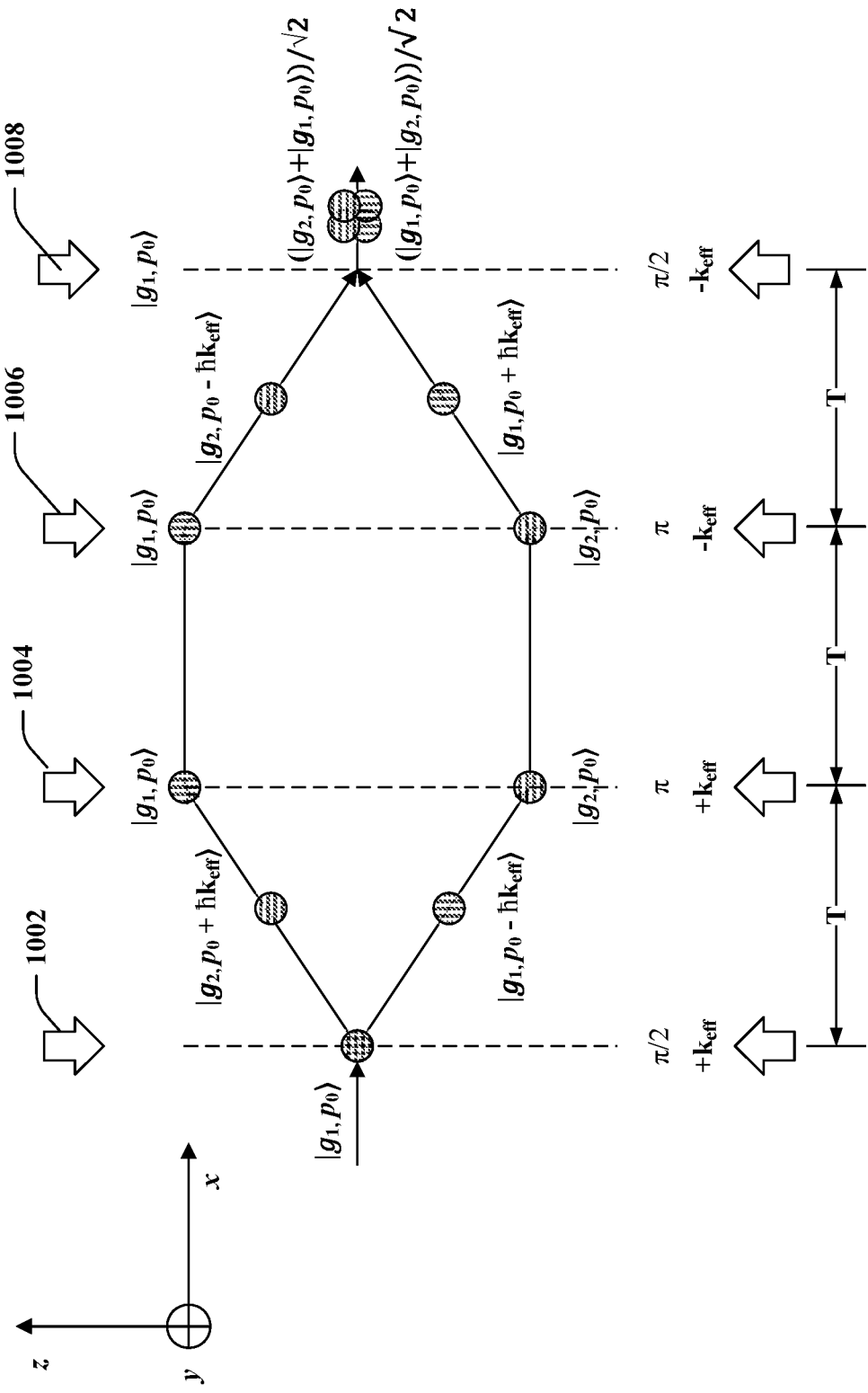
Figures 2, 10A:
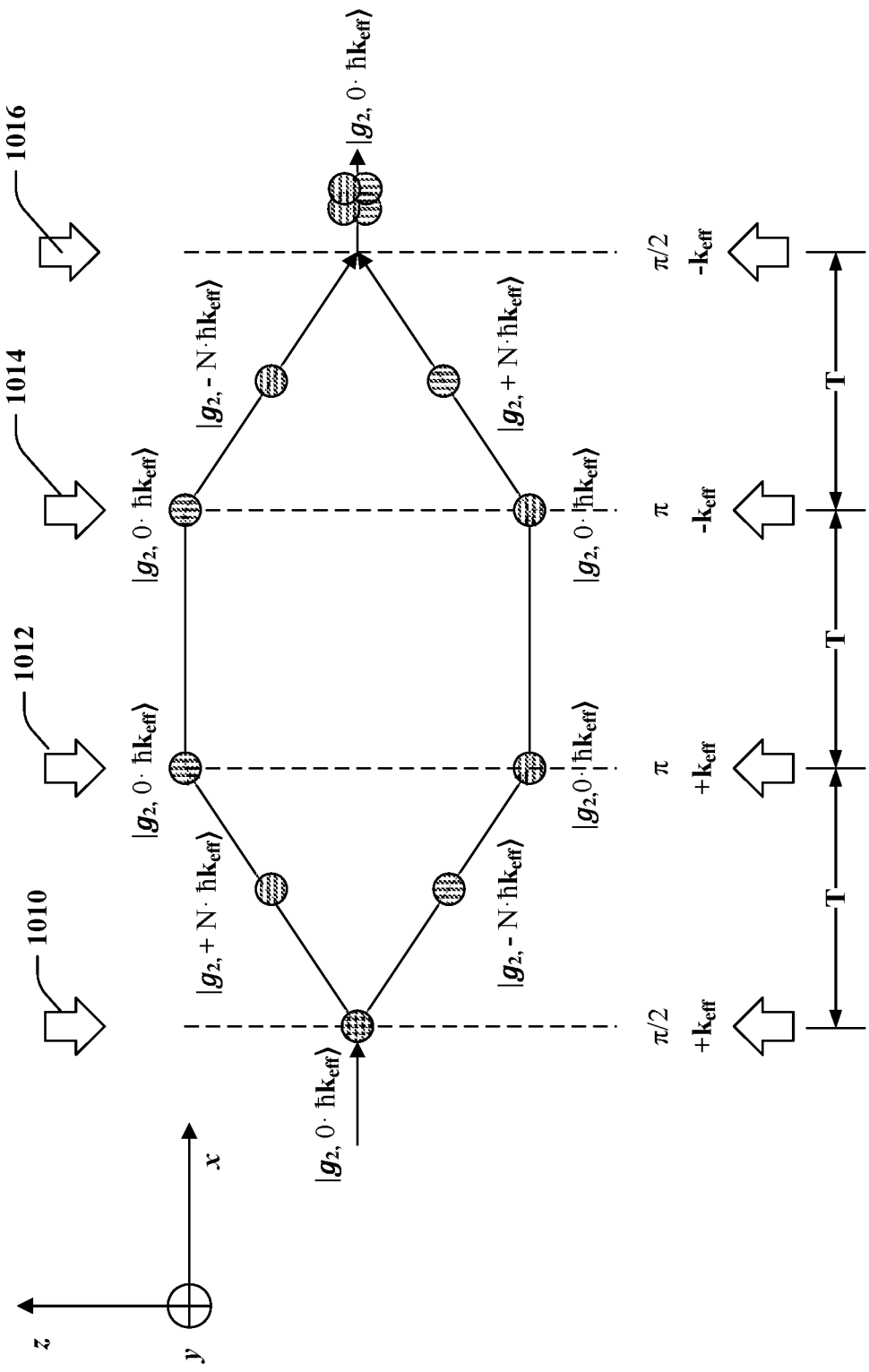
Figures 3, 10A:
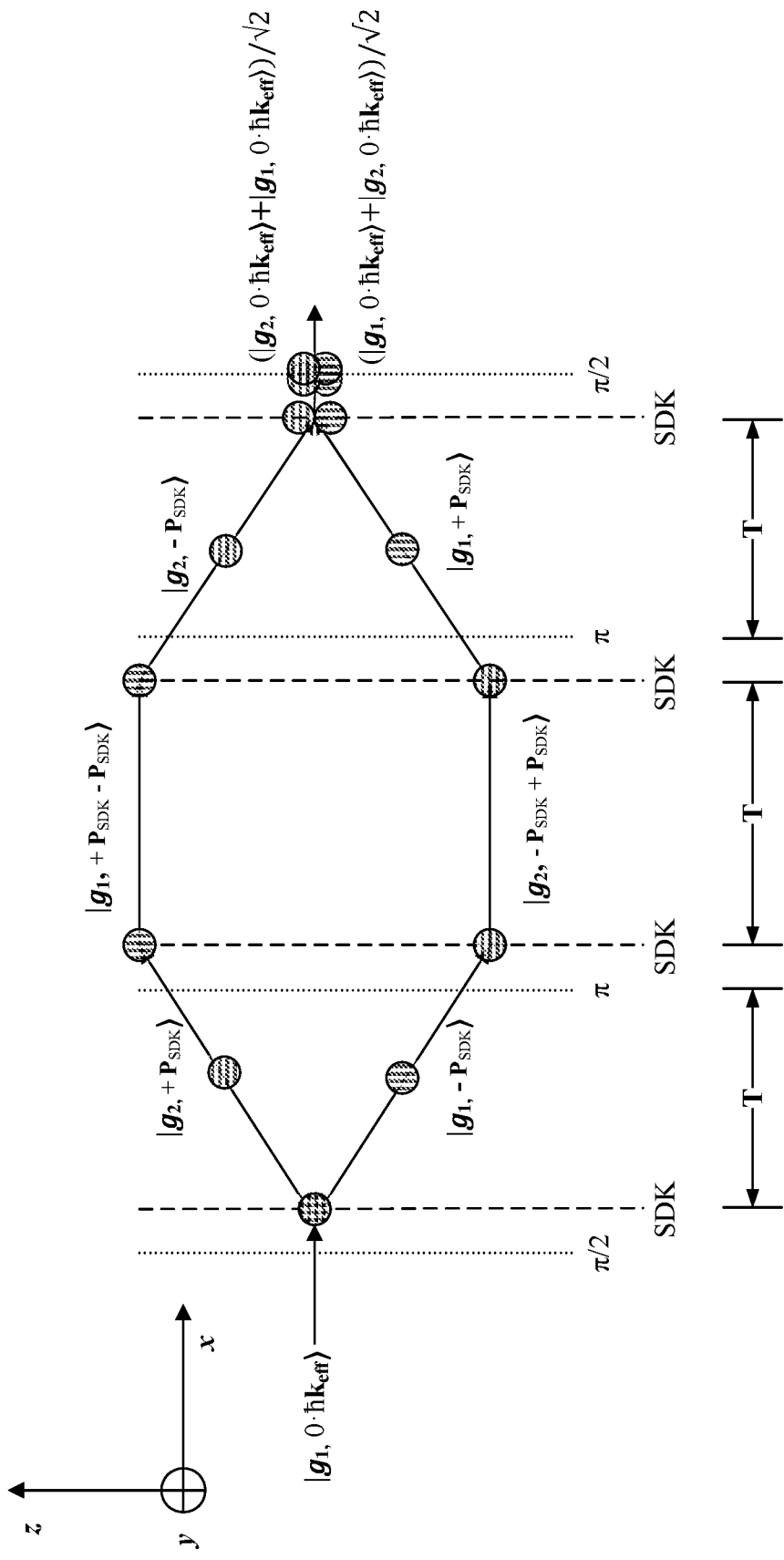

After the atoms 930 are released to move along the resonator waveguide 904, a sequence of Raman pulse pairs from the Raman lasers 120 can be applied to the atoms 930. In some embodiments, and referring now to FIG. 10A-I, an exemplary free-space Raman pulse sequence can be applied to the free-space atoms for a free-space atom gyroscope. The exemplary free-space Raman pulse sequence comprises four Raman pulse pairs 1002-1008 as "$\pi/2\ (+k_{eff})\rightarrow\pi(+k_{eff})\rightarrow\pi\ (-k_{eff})\rightarrow\pi/2\ (-k_{eff})$" that split, redirect, redirect, and recombine an atomic wavepacket of the atoms. Referring now to FIG. 10B, an exemplary free-space Raman pulse sequence can be applied to guided atoms for a guided atom gyroscope using two Raman pulse pairs as "$\pi/2\ (+k_{eff})\rightarrow\pi/2\ (-k_{eff})$." Referring now to FIG. 10C, an exemplary guided Raman pulse sequence can be applied to guided atoms for a guided atom gyroscope using two Raman pulse pairs as "$\pi/2\ (+k_{eff})\rightarrow\pi/2(-k_{eff})$." The Raman pulses can be evanescently coupled into the resonator waveguide 904 from the coupling waveguide 902, whereupon the Raman pulse pairs propagate along the resonator waveguide 904. As each of the Raman pulses propagates along the resonator waveguide 904, it establishes an evanescent field that interacts with the atoms 930 positioned about the waveguide 904. Thus, Raman pulses that are directly coupled to the coupling waveguide 902 are said to be "applied" to the atoms 930 in the EF-ODTs 926, 928 or that are circulating above the resonator waveguide 904. A Sagnac area of the atoms 930 traversing a path of the resonator waveguide 904 can be an area enclosed by the resonator waveguide 904.

With reference to FIG. 10A-1 (an exemplary free-space Raman pulse sequence for a free-space atom gyroscope), a free-space atom gyroscope can employ a sequence of four spatially-separated Raman pulse pairs 1002-1008, such as "$\pi/2(+k_{eff})\rightarrow\pi(+k_{eff})\rightarrow\pi(-k_{eff})\rightarrow\pi/2\ (-k_{eff})$," which split, redirect, redirect, and recombine an atomic wavepacket of the atoms 930, where the direction of $k_{eff}$ is flipped for the third and fourth pulses. In FIG. 10A-1, the trajectory of atomic wavepackets, e.g., free-space atoms, enclose an area in xz-plane, e.g., the Sagnac area, during the sequence of atom interferometry. Atomic wavepackets propagate along the x-axis (e.g., due to their initial momentum) while the sequence of the four Raman pulse pairs 1002-1008 is applied to the atoms along the z-axis direction. In contrast to the sequence of three Raman pulses employed in a free-space atom accelerometer (see FIG. 8A-1), the four Raman pulses employed in the gyroscope are spaced apart not only in time, but also in space (along the x and z axes as illustrated in FIG. 10A-1). While the Raman pulses in the free-space atom accelerometer are parallel to the sensing axis (the x axis as illustrated in FIG. 8A-1), the axis of the Raman pulses in the free-space atom gyroscope (the z axis as illustrated in FIG. 10A-1) is orthogonal to both the sensing axis of rotation (the y axis as illustrated) and the initial momentum axis (the x axis as illustrated).

In some embodiments of a closed-loop gyroscope, the second and third pulses, the π-pulses, can be omitted if the waveguide guides split atomic wavepackets to their original positions. Thus, the closed-loop gyroscope uses the atom interferometry sequence as "$\pi/2\rightarrow T\rightarrow\pi/2$," and the direction of $k_{eff}$ in the second π/2 pulse is flipped compared to the first π/2 pulse.

For example, and with reference now to FIG. 10B (an exemplary free-space Raman pulse sequence for a guided atom gyroscope) and FIG. 10C (an exemplary guided Raman pulse sequence for a guided atom gyroscope), schematics of free-space and guided Raman beam configurations, respectively, in a closed-loop guided atom gyroscope (e.g., the gyroscope 900) are shown. An exemplary free-space Raman pulse sequence 1002-1008 can be applied to free-space atoms for a free-space atom gyroscope (see FIG. 10A-1). An exemplary free-space Raman pulse sequence can be applied to guided atoms in the EF-ODT for a guided atom gyroscope (see FIG. 10B). An exemplary guided Raman pulse sequence can be applied to guided atoms in the EF-ODT for a guided atom gyroscope (see FIG. 10C). In the guided atom configuration shown in FIGS. 10B and 10C, Raman pulses are emitted so that they intersect with a region in which atoms are held in an EF-ODT. The atomic wavepacket of the atoms is split by a first π/2 pulse that imparts momentum kicks±$hk_{eff}$ to guided atoms in the EF-ODT. The atoms then move along a path of the closed-loop waveguide and ultimately return to their initial positions (e.g., prior to the momentum kick from the Raman pulses). Finally, another π/2 Raman pulse pair with a flipped $k_{eff}$ is applied, recombining the atomic wavepacket of the guided atoms in the EF-ODT. With reference to FIG. 10C, the same two-pulse-pair sequence of π/2-π/2 pulses is applied, except that rather than the Raman beams being emitted into the EF-ODT through free space, the Raman beams are coupled into a waveguide (e.g., the coupling waveguide 902) and establish evanescent fields that interact with atoms in EF-ODTs positioned about a closed-loop waveguide (e.g., the resonator waveguide 904). In either configuration, a time between the two π/2 Raman pulse pairs is taken to be an interrogation time T.

With reference now to FIG. 10D (an exemplary free-space Bragg pulse sequence for a guided atom gyroscope) and FIG. 10E (an exemplary guided Bragg pulse sequence for a guided atom gyroscope), schematics of free-space and guided Bragg beam configurations of a closed-loop guided atom gyroscope, respectively, are illustrated. An exemplary free-space Bragg pulse sequence 1010-1016 can be applied to free-space atoms for a free-space atom gyroscope (see FIG. 10A-2). An exemplary free-space Bragg pulse sequence can be applied to guided atoms in the EF-ODT for a guided atom gyroscope (see FIG. 10D). An exemplary guided Bragg pulse sequence can be applied to guided atoms in the EF-ODT for a guided atom gyroscope (see FIG. 10E). The Bragg pulse sequence is similar to the Raman pulse sequence, except that the Bragg pulse pairs create multiple momentum states of atomic wavepackets, based on the same hyperfine ground state, by way of LMT, rather than a superposition between two hyperfine ground states. As shown in FIG. 10A-2, four Bragg pulse pairs 1010-1016, such as "π/2 ($+k_{eff}$)→π($+k_{eff}$)→π($-k_{eff}$)→π/2 ($-k_{eff}$)," is applied to split, redirect, redirect, and recombine the atomic wavepackets in free-space, where the direction of $k_{eff}$ is flipped for the third and fourth pulses. A time between Bragg pulse pairs is taken to be an interrogation time T of the Bragg configuration. In similar fashion to the Raman pulse pairs 1002-1008 (see FIG. 10A-1), the π-pulse pairs 1012, 1014 can be omitted in embodiments wherein the gyroscope 130 is a closed-loop guided atom gyroscope (e.g., the gyroscope 900). Thus, the Bragg beam configurations depicted in FIGS. 10D and 10E show a π/2-π/2 pulse sequence with a flipped $k_{eff}$ for the second π/2 pulse, since the exemplary configurations depicted employ closed-loop guided atom waveguides.

With reference now to FIG. 10A-3 (an exemplary free-space SDK pulse sequence for a free-space atom gyroscope) and FIG. 10F (an exemplary free-space SDK pulse sequence for a guided atom gyroscope), schematics of SDK pulse schemes applied to the population of free-space atoms (see FIG. 10A-3) and guided atoms (see FIG. 10F) are illustrated. An exemplary free-space SDK pulse sequence can be applied to free-space atoms for a free-space atom gyroscope (see FIG. 10A-3). An exemplary free-space SDK pulse sequence can be applied to guided atoms in the EF-ODT for a guided atom gyroscope (see FIG. 10F). SDK pulse schemes can perform internal atomic state control with a microwave field and establish the state-dependent kicks with optical fields, such as Raman beams or tightly-focused optical beams.

In some embodiments, the SDK pulse scheme can be demonstrated with a tightly-focused beam and a microwave field. With reference now to FIG. 10F, a first π/2 microwave pulse is applied to the atoms, e.g., by way of a free-space microwave beam or a near-field microwave field via integrated microwave transmission lines or integrated microwave antenna on the atom trap integrated platforms. This microwave pulse creates a superposition state of two ground states. A first SDK pulse splits atomic wavepackets along the resonator waveguide by applying SDK momentum transfer, $+P_{SDK}$ or $-P_{SDK}$, to atoms, where the SDK momentum transfer results from the gradient of an optical potential. This SDK pulse directs atoms along the waveguide of the gyroscope in opposite directions according to the ground states of the atoms. As described above, the atomic wavepackets travel along the path of the waveguide and ultimately return to their original positions when the waveguide is a closed-loop waveguide. A second SDK pulse with a flipped $k_{eff}$ recombines atomic wavepackets. A second π/2 microwave pulse is then applied to construct atom interference of the wavepackets.

In embodiments wherein the waveguide of the gyroscope is not a closed-loop waveguide, e.g., a Ω-shaped waveguide (the gyroscope 1100 described below with reference to FIG. 11), two additional SDK pulses can be employed to redirect atoms to their original positions. As shown in FIG. 10A-3, a free-space atom gyroscope can use the free-space SDK pulse sequence such as "π/2 (microwave)→SDK→π(microwave)→SDK (x2)→π(microwave)→SDK→π/2 (microwave)" sequence. A time between SDK pulses is taken to be an interrogation time T of the SDK configuration. This is analogous to linear free-space/guided atom accelerometers with SDK pulse sequence (see FIG. 8A-3 and FIG. 8D). The difference is that the straight waveguide section becomes the Ω-shaped waveguide. In some embodiments, the multiple SDK pulses can be prepared to transfer a large momentum to atoms and increase the sensitivity of atom interferometry with an enlarged area of atom interferometry trajectory. In some embodiments, the position, beam-spot shape, and beam-spot number of SDK pulses can be dynamically controlled in time with spatial-light-modulator (SLM) devices. Thus, this function can be used for various advanced guided atom protocols in a guided atom gyroscope.

After a Raman pulse sequence, a Bragg pulse sequence, or SDKs are applied, atomic states of the atoms can be detected by way of the probe laser 122. For instance, in some embodiments, the probe laser 122 can emit a probe beam through the coupling waveguide 902 (e.g., by way of the optical control bus 124), whereupon the probe beam is evanescently coupled into the resonator waveguide 904 by way of the coupling region 932. As the probe beam propagates in the resonator waveguide 904, the probe beam interacts evanescently with the atoms 930 positioned about the resonator waveguide 904. In other embodiments, the probe laser 122 can emit the probe beam through free space to interact with the atoms 930 directly.

As described above, internal-state-dependent atom detection (e.g., for Raman and SDK configurations) can be performed using the evanescent-field light of an absorption probe beam or a phase-shift probe. An absorption probe is close to the atomic resonance, and measures light transmission which decreases according to the atom number due to light absorption by atoms. A phase-shift probe is off-resonant from the atomic resonance and measures the phase shift of light resulting from atoms with an optical interferometric setup. For both atom detections, the light is indicative of a probability of an atom being in one of two hyperfine ground states (Raman pulses or SDK) or one of multiple momentum states (Bragg pulses), which probability is in turn indicative of the atom interferometric phase shift. An acceleration of the guided atom accelerometer or a rate of rotation of the guided atom gyroscope system can be determined from the phase shift. The probability $P_{g_2}$ of atoms being in the state $|g_2\rangle$ can be measured based upon light emitted by the atoms 930 in response to stimulation by the probe beam. In an exemplary embodiment, the sensor system 112 can include an optical sensor that receives light emitted from the atoms 930 in response to stimulation by the probe beam. The sensor system 112 outputs sensor data indicative of one or more parameters of the light (e.g., a spatial intensity distribution of the light as captured in an image of the gyroscope 900). The computing system 114 can be adapted to compute a rate of rotation of the system 100 during the interrogation period based upon the sensor data.

By way of example, and not limitation, in internal-state-dependent atom detection, the value of the rate of rotation is encoded in the probability $Pg_2$ of atoms being in the state $|g_2\rangle$, which is measured as the phase of the third Raman pulse is scanned. The value of angular velocity $\Omega$ is encoded in the probability $$Pg_2 = \frac{1}{2}(1 - \cos \Delta\phi_{rot}), \quad \text{(Eq. 5)}$$

where $$\Delta\phi_{rot} = k_{eff} 2(v \times \Omega) T^2, \quad \text{(Eq. 6)}$$

and where v is an initial velocity of atoms in the atomic cloud. The computing system 114 can determine the probability $Pg_2$ based upon the sensor data output by the sensor system 112. The computing system 114 can then compute the rate of rotation Q based upon detecting atomic fringes in the sensor data. Accordingly, a value of an angular velocity of the platform 101 about the sensing axis of the gyroscope 900, $\Omega$, is measured by detecting atomic fringes.

In some embodiments, such as for a Bragg configuration, light captured by the sensor system 112 can be indicative of a probability of an atom being in one of multiple momentum states, rather than atomic ground states. In such embodiments, the probability associated with the momentum state is also indicative of the rate of rotation (i.e., angular velocity) of the platform 101, which can be computed by the computing system 114. In the Bragg configuration, the probe beam can be emitted to the atoms 930 through free space or by way of evanescent coupling through the coupling waveguide 902.

From the foregoing, it is to be understood that the ATIP 106 can be adapted to include multiple gyroscopes each having a different orientation, in order to facilitate identification of rotations of the system 100 about different axes.

The gyroscope 900 shown in FIG. 9 has two suspended waveguide loading regions 914 and 916. However, it is to be understood that the gyroscope 130 can include substantially any number of suspended waveguide loading regions. In some embodiments, it may be desirable to have fewer loading regions in order to facilitate thermal dissipation and fine MOT control. In other embodiments, it may be desirable to have a greater number of loading regions in order to increase a number of MOTs from which atoms can be loaded into EF-ODTs.

Furthermore, while the gyroscope 900 shown in FIG. 9 includes a closed-looped waveguide 904 for performing atom interferometry, it is to be understood that in other embodiments, the guided atom gyroscope 130 can instead comprise an Q-shaped waveguide. For example, the Ω-shaped waveguide can be a waveguide that has a loop formed therein, but with first and second ends for direct coupling of optical signals into the waveguide (e.g., as opposed to evanescent coupling).

Figure 11:
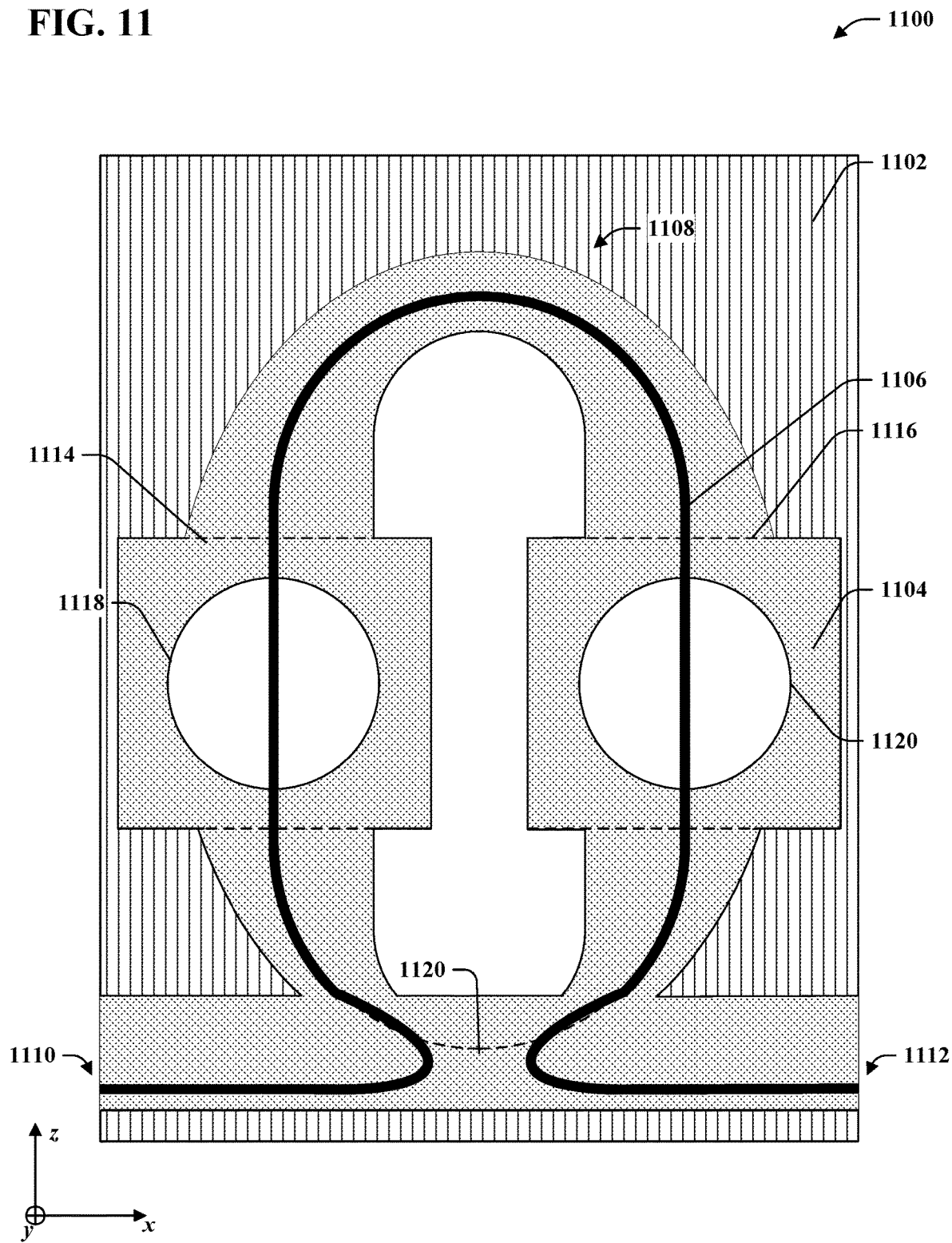
FIG. 11 is a top-down view of another exemplary Q-shaped guided atom interferometer gyroscope.

By way of example, and referring now to FIG. 11, another exemplary Ω-shaped guided atom gyroscope 1100 is illustrated. The gyroscope 1100 includes a substrate 1102, a membrane 1104 deposited on the substrate 1102, and an Ω-shaped waveguide 1106 deposited on the membrane 1104. The Ω-shaped waveguide 1106 has a looped portion 1108, and two I/O ports 1110, 1112. The gyroscope 1100 includes loading regions 1114, 1116 in which the membrane 1104 and the waveguide 1106 are suspended over openings 1118, 1120 in the substrate 1102. The loading regions 1114, 1116 can be positioned within the looped portion 1108 of the Ω-shaped waveguide 1106. In the gyroscope 1100, the trapping, Raman, Bragg, and probe beams can be coupled directly into the Ω-shaped waveguide 1106 by way of the I/O ports 1110, 1112. A Sagnac area of the gyroscope 1100 can be the area of a region 1120 defined by a path of the looped portion 1108 of the waveguide 1106.

Still further, it is to be understood that Raman beams and a probe beam can be configured as free-space beams. Stated differently, rather than emitting the Raman, Bragg, or probe beams through the optical control bus 124 to cause the beams to propagate through waveguides included in the accelerometer 128 and the gyroscope 130, the laser system 102 can be adapted to emit the Raman, Bragg, or probe beams through the free-space vacuum present in the vacuum chamber 108. The laser system 102 can be adapted to emit the Raman, Bragg, and probe beams so that the beams intersect with a region in which atoms are trapped by the evanescent fields established by the trapping beams propagating in the accelerometer 128 and gyroscope 130.

As referenced above, the guided cold atom inertial sensor system 100 can be adapted to employ Bragg pulses or SDKs to impart momentum kicks to atoms trapped about the accelerometer 128 or gyroscope 130, instead of using Raman beams emitted by the Raman lasers 120. Thus, whereas the laser system 102 is depicted as including Raman lasers 120, the Raman lasers 120 can be replaced by Bragg lasers, or a combination of a microwave emitter and an SDK focused laser system.

Figure 12:
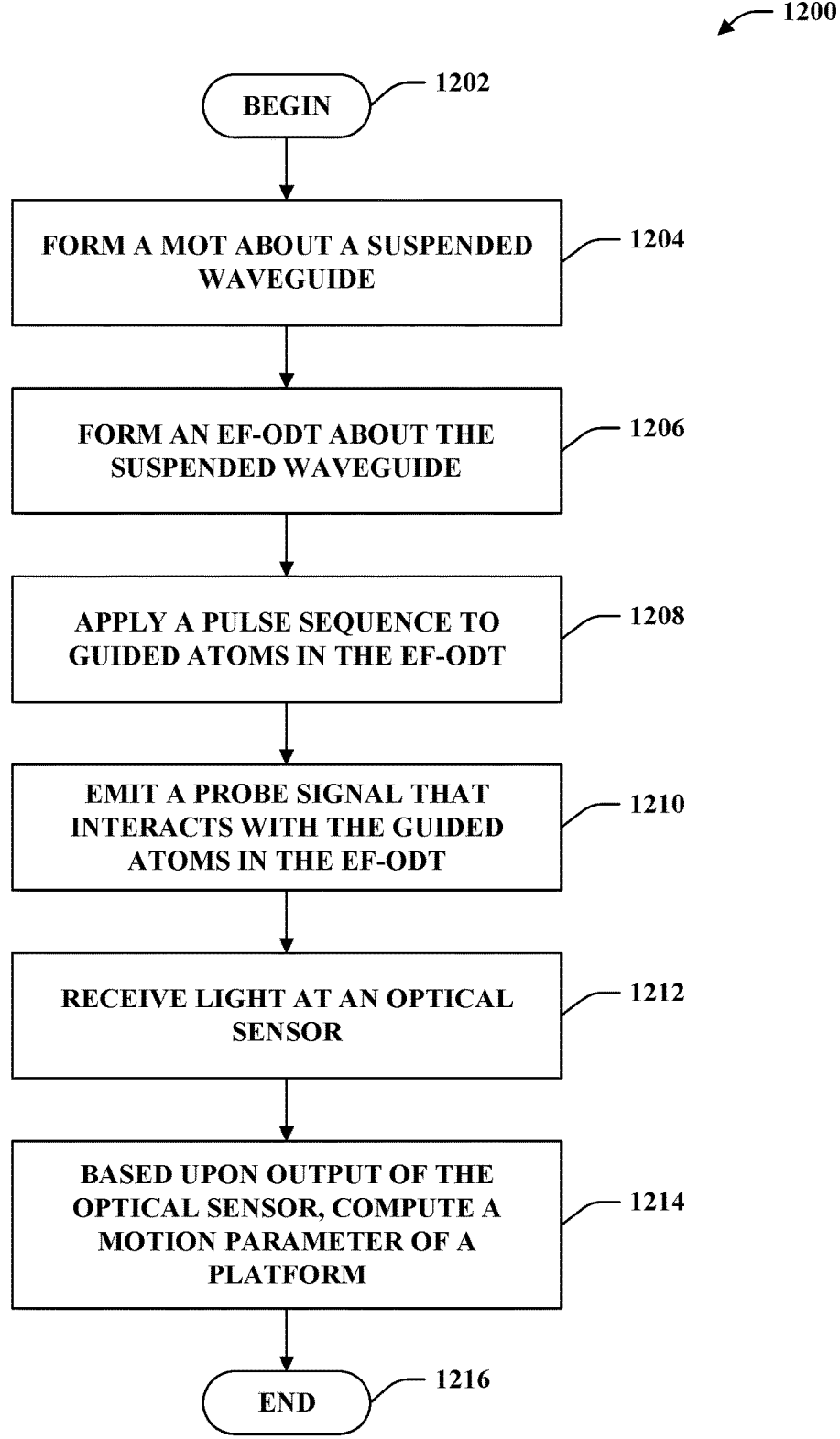
FIG. 12 is a flow diagram for operating a guided atom accelerometer or guided atom gyroscope.
Figure 13:
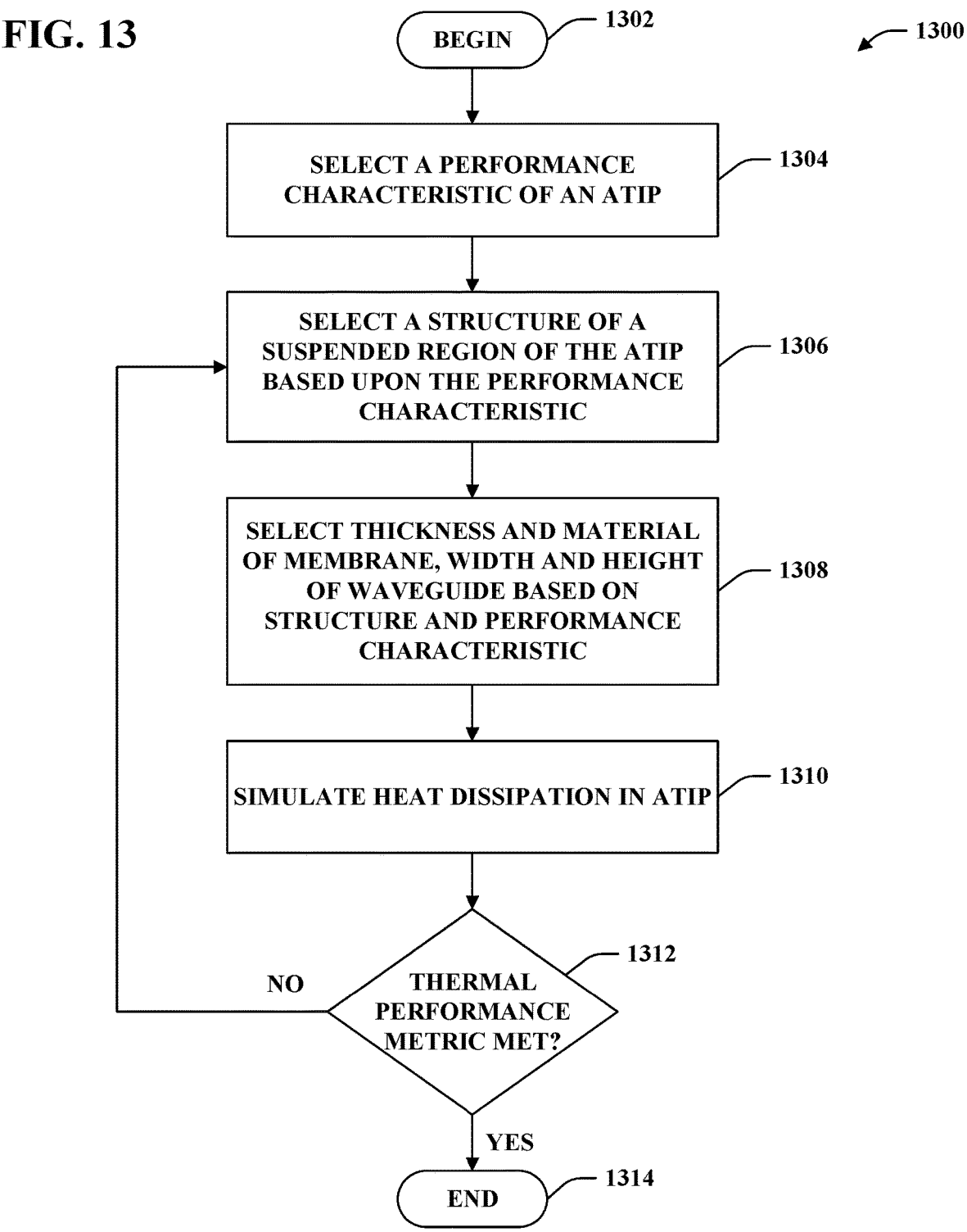
FIG. 13 is a flow diagram that illustrates an exemplary methodology for designing an ATIP.

FIGS. 12-13 illustrate exemplary methodologies relating to operating a matterwave gyroscope and designing a suspended waveguide system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 12, an exemplary methodology 1200 that facilitates operation of a guided atom gyroscope or accelerometer is illustrated. The methodology 1200 begins at 1202, and at 1204, a MOT is formed about a suspended membrane waveguide. The suspended membrane waveguide is part of an interferometric path along which atoms will be guided for atom interferometry (e.g., the waveguide 606 within the loading 608 or the waveguide 904 within the loading regions 914, 916). The MOT can be formed such that the MOT intersects with the suspended waveguide. The MOT is formed by establishing a magnetic field gradient in a region that includes the suspended membrane waveguide and emitting a plurality of cooling beams to a common intersection within the region. Formation of the MOT causes capture and cool down of an ensemble of atoms about the center of the MOT (e.g., an intersection region of the cooling beams). At 1206, an EF-ODT is formed about the suspended membrane waveguide. The EF-ODT can be formed by emitting red-detuned and blue-detuned beams through the suspended membrane waveguide while the MOT is active. Once atoms are loaded into the EF-ODT, the MOT can be disengaged, and the atoms can remain trapped in the EF-ODT.

At 1208, a pulse sequence is applied to guided atoms in the EF-ODT. The EF-ODT can be adapted to allow the atoms to move along the interferometric path of the gyroscope/accelerometer. The pulse sequence can be, for example, a $\pi/2$-$\pi$-$\pi/2$ Raman pulse sequence that is adapted to split, redirect, and recombine an atomic wavepacket in the EF-ODT. Thus, the Raman pulse sequence affects motion of the atoms along the interferometric path of the matterwave gyroscope. In other embodiments, the pulse sequence can be a Bragg pulse sequence, or a microwave/SDK focused beam pulse sequence.

At 1210, the atomic population of the guided atoms in the EF-ODT can be measured by emitting an optical probe beam, e.g., an absorption probe beam or a phase-shift probe beam, such that the optical probe beam interacts with the guided atoms in the EF-ODT. In an exemplary embodiment, the probe beam can be coupled to the suspended waveguide such that the probe beam interacts with the atoms by way of an evanescent field emanating from the waveguide. In other embodiments, the probe beam can be a free space signal that is emitted directly into an ensemble of atoms positioned above the waveguide.

At 1212, light is received at an optical sensor. In some embodiments, when free-space or evanescent-field light of an absorption probe (or a phase-shift probe) interacts with atoms, the optical sensor can measure the atomic population of the guided atoms in the EF-ODT based on the total transmission of the absorption probe (or the total phase shift of the probe), respectively. In some embodiments, the spatially-separated momentum-state-dependent atom detection can be applied for Bragg-pulse atom interferometry based on the multiple momentum states with the same hyperfine ground state. In this case, an imaging system that includes the optical sensor can distinguish the atomic population of the spatially-separated momentum states using an absorption probe beam or a fluorescence probe beam. The imaging system can be an arrayed optical sensor system, such as a charge-coupled device (CCD) camera which can measure the spatial-dependent atomic signal. The optical sensor can be or include any of various light-sensitive devices such as a charge-coupled device (CCD), photodiode, phototransistor, etc.

At 1214, a motion parameter of a platform on which the matterwave gyroscope is mounted can be determined based upon an output of the optical sensor. The output of the sensor is indicative of light received at the sensor. The light emitted by the atoms in response to the probe beam is indicative of a probability of atoms in the ensemble having one of two hyperfine ground states (for Raman and SDK configurations) or one of multiple momentum states (for Bragg configurations). The probability is in turn indicative of an atom interferometric phase shift associated with motion of atoms along the path of the waveguide of the gyroscope/accelerometer during the pulse sequence. A rotation of the platform about an axis or an acceleration of the platform along the axis can be determined based upon the phase shift. The methodology 1200 then ends at 1216.

Referring now to FIG. 13, an exemplary methodology 1300 that facilitates design of an ATIP is illustrated. The methodology 1300 begins at 1302, and at 1304, a performance characteristic is selected. The performance characteristic can be, for example, a number of atoms desirably trapped in the MOT, a number of atoms desirably trapped in the EF-ODT, a trap depth and/or shape of the EF-ODT, a combination thereof, etc. At 1306, a structure of a suspended region is selected based upon the performance characteristic, wherein a suspended region of an ATIP refers to a portion of the ATIP extending across an opening in a substrate. The structure of the suspended region can include, for example, width and length of a membrane and/or waveguide across the opening of the substrate, and/or a size of supporting needle structures disposed beneath the membrane and waveguide.

At 1308, a thickness and material of the membrane, as well as width and height of the waveguide deposited on the membrane are selected based upon the selected performance characteristic. By way of example, and not limitation, the thickness and material of the membrane can be selected to maximize transmittance of the membrane with respect to cooling/repump beams used to form a MOT in the vicinity of the ATIP. The wavelength of the cooling/repump beams is determined by alkali atoms that are intended to be trapped within the MOT. The thickness and index of refraction of the membrane determines the transmittance of the membrane with respect to the cooling/repump beams. In another exemplary embodiment, the width and height of the waveguide, as well as the thickness of the membrane, can be selected at 1308 to optimize the trap depth of an EF-ODT formed by red-detuned and blue-detuned trapping beams propagating in the waveguide, given the structure of the suspended region selected at 1306. In still another embodiment, the width and height of the waveguide and the thickness of the membrane can be selected at 1308 to yield a specified shape of the EF-ODT.

At 1310, heat dissipation of the ATIP is determined by thermal performance simulations. In these simulations, performance of the ATIP is modeled assuming that the ATIP is disposed in a vacuum, and that red-detuned and blue-detuned trapping lasers are propagating through the waveguide of the ATIP. At 1312, if the thermal performance simulations at 1310 indicate that the ATIP meets a specified thermal performance metric, the methodology 1300 completes at 1314. Otherwise, the methodology 1300 returns to 1306, whereupon steps 1306 and 1308 are repeated and parameters of the ATIP design are modified until both the performance characteristic selected at 1304 and the thermal performance metric at 1312 are met. In exemplary embodiments, the thermal performance metric can specify, for example, a maximum allowable temperature of the waveguide of the ATIP (e.g., a temperature at which the waveguide is expected to fail mechanically).

Figure 14:
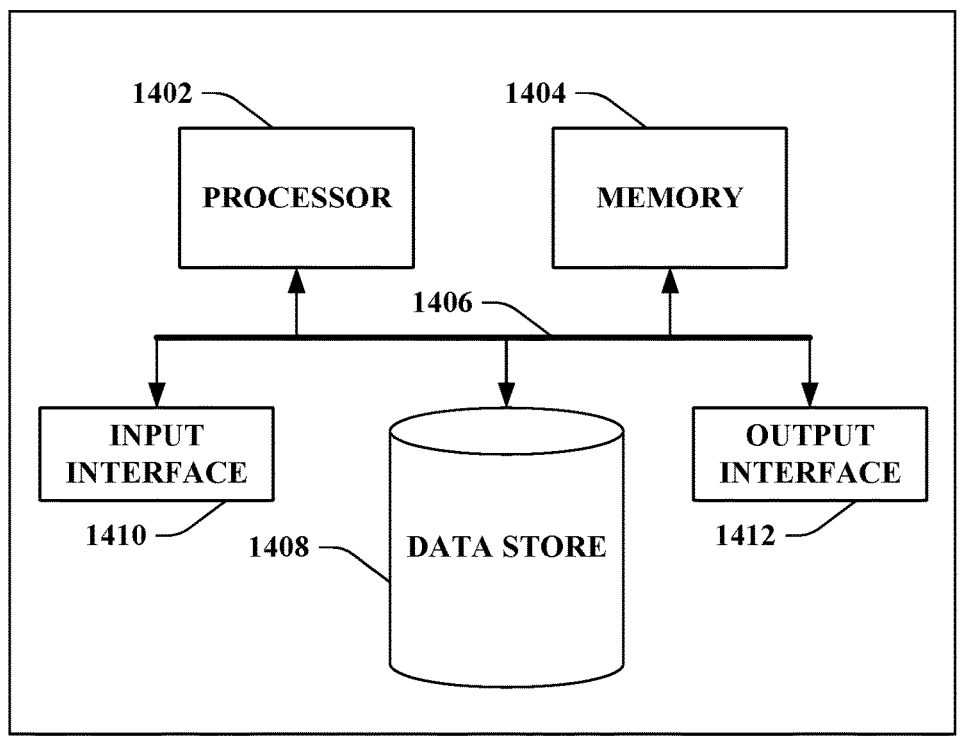
FIG. 14 is an exemplary computing system.

Referring now to FIG. 14, a high-level illustration of an exemplary computing device 1400 that can be used in accordance with the systems and methodologies disclosed herein is illustrated. For instance, the computing device 1400 may be used in a system that controls the operation of lasers or a magnetic field system used in a guided cold atom inertial sensor system (e.g., as part of the control system 110 of the guided cold atom inertial sensor system 100). The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store control feedback data, sensor readout data, etc.

The computing device 1400 additionally includes a data store 1408 that is accessible by the processor 1402 by way of the system bus 1406. The data store 1408 may include executable instructions, control feedback data, sensor data, etc. The computing device 1400 also includes an input interface 1410 that allows external devices to communicate with the computing device 1400. For instance, the input interface 1410 may be used to receive instructions from an external computer device, from a user, etc. The computing device 1400 also includes an output interface 1412 that interfaces the computing device 1400 with one or more external devices. For example, the computing device 1400 may display text, images, etc., by way of the output interface 1412.

It is contemplated that the external devices that communicate with the computing device 1400 via the input interface 1410 and the output interface 1412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1400 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The following provides a few potential applications for one or more embodiments of the present invention, typically through the integration of photonics and/or electronics on the substrate used to form the ATIP. For example, optical resonators based upon photonic crystals, Bragg reflectors, and ring cavities may be employed for quantum optics or cavity quantum electro-dynamic processes, such as may be used in the field of quantum information science. As another example, Mach-Zehnder interferometric waveguides may be employed for light amplitude modulation using, for example, electro-optic phase shifters.

Added functionality can also come from heterogeneously integrated (HI) photonics, for example, silicon photonics with III-V materials (for lasing or light amplification) and nonlinear materials (for light modulation and nonlinear process such as frequency doubling). For example, these HI photonics can integrate both III-V lasing (InP) and silicon photonic modulation (1560 nm), which can start from a III-V laser and couple the light to silicon photonic modulator that can provide optical frequency and optical amplitude modulation through the use of PN junctions, typically related to free carrier depletion. HI photonics can also provide optical detection through the use of photodiodes, avalanche photodiodes, or photoconductors. Optical phase shifting can be implemented using the thermo-optic or electro-optic effect devices. These HI photonics will readily work in the commonly used telecommunications C band of wavelengths (1530 nm to 1565 nm). A further advantage of silicon-based photonics is that they are readily mass produced using vary mature silicon fabrication technology. III-V-based photonics provide greater flexibility, especially with respect to operating wavelength (ultraviolet (UV) through infrared (IR) depending upon the material), but employ less mature fabrication technologies. III-V-based photonics, with material grown, for example, by metalorganic chemical vapor deposition (MOCVD), can include optical sources (such as lasers or light emitting diodes (LEDs)), optical amplifiers, and optical modulators, which may employ quantum well-based structures. In yet other cases, nonlinear photonics may be implemented, for example, using piezoelectric material, such as a thin-film lithium niobate waveguide by itself or as a hybrid structure when bonded with silicon nitride, thereby permitting optical frequency summing, optical frequency differencing, and optical frequency doubling, etc.

Optical switching functionality may be incorporated using piezoelectric material, for example, aluminum nitride (AlN) on a silicon nitride waveguide, by mechanically changing evanescent field coupling between adjacent waveguides. Piezoelectric material also permits optical modulation using the acousto-optic effect. Polymer waveguides printed, for example, with 3D direct laser writing, may be used for device-to-device or chip-to-chip interconnects further expanding optical functionality.

Electrical and electromagnetic functionality may also be integrated into the ATIP substrate. For example, microwave or radio frequency (RF) transmission lines and antennas may be used for controlling a single qubit (trapped atom) or a collection of atoms. This individual qubit control is necessary for scalable quantum computation platforms. Direct current (DC) voltage electrodes can be used for electric field control, for example, in a Rydberg entanglement for neutral atoms. Current driving lines, for example, as found in an atom chip configuration, may implement for magnetic field control of surface magnetic traps or a MOT. In addition, the guided atoms with membrane integrated photonics can be used for quantum nodes in quantum networks.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An inertial sensor system, comprising:
a waveguide;
a magnetic field system adapted to establish a magnetic field gradient about the waveguide; and
a laser system adapted to emit:
a plurality of cooling beams such that the cooling beams intersect within a region in which the magnetic field gradient is formed, thereby forming a magneto-optical trap (MOT);
a red-detuned trapping beam such that red-detuned light propagates in the waveguide, the red-detuned trapping beam being red-detuned with respect to a resonant optical transition of an atom trapped in the MOT;
a blue-detuned trapping beam such that blue-detuned light propagates in the waveguide, the blue-detuned trapping beam being blue-detuned with respect to the resonant optical transition of the atom trapped in the MOT, wherein propagation of the red-detuned light and the blue-detuned light causes formation of an evanescent field optical dipole trap (EF-ODT) about the waveguide; and
a sequence of Raman pulses or a sequence of Bragg pulses, such that the sequence of Raman/Bragg pulses propagates through the waveguide wherein the sequence of Raman/Bragg pulses is adapted to impart momentum kicks to guided atoms in the EF-ODT, wherein motion of the inertial sensor system can be determined based upon motion of the guided atoms in the EF-ODT.

2. The inertial sensor system of claim 1,
wherein the laser system is further adapted to emit a probe beam such that the probe beam interacts with the guided atoms in the EF-ODT; and
wherein interaction of the probe beam with the guided atoms in the EF-ODT is indicative of a probability associated with a state of the guided atoms in the EF-ODT, the probability based upon the motion of the guided atoms in the EF-ODT.

3. The inertial sensor system of claim 2, further comprising an optical sensor, the optical sensor adapted to receive light from a region that includes the guided atoms in the EF-ODT and to output sensor data that is indicative of the interaction of the probe beam with the guided atoms in the EF-ODT.

4. The inertial sensor system of claim 2, wherein the probe beam propagates through the waveguide and interacts with the guided atoms in the EF-ODT by way of an evanescent field.

5. The inertial sensor system of claim 2, wherein the probe beam is emitted through a region of free space that includes the guided atoms in the EF-ODT.

6. The inertial sensor system of claim 2, wherein the probe beam is configured such that absorption of the probe beam by the guided atoms in the EF-ODT is indicative of the probability.

7. The inertial sensor system of claim 2,
wherein the probe beam is adapted to cause the guided atoms in the EF-ODT to fluoresce; and
wherein fluorescence of the guided atoms in the EF-ODT is indicative of the probability.

8. The inertial sensor system of claim 1, wherein the sequence of pulses is a sequence of Bragg pulses.

9. The inertial sensor system of claim 1, wherein the sequence of pulses is a sequence of Raman pulses.

10. The inertial sensor system of claim 1, further comprising:
a substrate having an opening formed therein; and
a membrane deposited on the substrate and extending over at least a portion of the opening, wherein the waveguide is deposited on the membrane such that the waveguide is suspended over the opening in the substrate by the membrane.

11. The inertial sensor system of claim 1, further comprising a vacuum chamber, wherein the waveguide is positioned within the vacuum chamber.

12. The inertial sensor system of claim 1, wherein the waveguide is a substantially linear waveguide adapted to function as an accelerometer, a sensing axis of the accelerometer being aligned with the substantially linear waveguide.

13. The inertial sensor system of claim 1, wherein the waveguide is a curved waveguide adapted to function as a gyroscope.

14. The inertial sensor system of claim 13,
wherein the waveguide is a first waveguide, the first waveguide being a closed-loop waveguide;
the inertial sensor system further comprising a second waveguide, the second waveguide positioned proximally to the first waveguide such that optical signals propagating in the second waveguide evanescently couple to the first waveguide; and
wherein the red-detuned and blue-detuned trapping beams are emitted through the second waveguide such that the red-detuned and blue-detuned trapping beams evanescently couple into the first waveguide.

15. The inertial sensor system of claim 13,
wherein the waveguide has a first input/output (I/O) port and a second I/O port; and
wherein the trapping beams and the Raman/Bragg pulses are coupled into the waveguide by way of at least one of the first I/O port or the second I/O port.

16. The inertial sensor system of claim 1,
wherein the sequence of Raman/Bragg pulses comprises a Raman/Bragg pulse pair, the Raman/Bragg pulse pair comprising a first pulse and a second pulse; and
wherein the first pulse and the second pulse are counter-propagating.

17. A method, comprising:
forming a magneto-optical trap (MOT) about a suspended waveguide;
forming an evanescent field optical dipole trap (EF-ODT) about the suspended waveguide by causing red-detuned and blue-detuned trapping beams to propagate in the suspended waveguide;
applying a sequence of pulses to guided atoms in the EF-ODT, wherein the sequence of pulses is adapted to impart momentum kicks to the guided atoms in the EF-ODT;
emitting an optical probe signal such that the optical probe signal interacts with the guided atoms in the EF-ODT, wherein interaction of the optical probe signal with the guided atoms in the EF-ODT is indicative of motion of a platform that includes the suspended waveguide;
receiving light from the guided atoms in the EF-ODT at an optical sensor, wherein the light is indicative of interaction of the optical probe signal with the guided atoms in the EF-ODT; and
based upon an output of the optical sensor, computing a motion parameter of the platform that includes the suspended waveguide.

18. The method of claim 17, wherein the sequence of pulses comprises at least one microwave pulse that is adapted to change ground states of guided atoms in the EF-ODT, and at least one optical pulse that is adapted to impart a state-dependent kick (SDK) to guided atoms in the EF-ODT.

19. An inertial sensor system, comprising:
a substrate having an opening formed therein;
a membrane that extends across at least a portion of the opening formed in the substrate;
a waveguide that is deposited on the membrane such that the waveguide is suspended over the opening in the substrate;
a magnetic field system adapted to establish a magnetic field gradient about the waveguide; and
a laser system adapted to emit:
    a plurality of cooling beams such that the cooling beams intersect within a region in which the magnetic field gradient is formed, thereby forming a magneto-optical trap (MOT);
    a red-detuned trapping beam such that red-detuned light propagates in the waveguide, the red-detuned trapping beam being red-detuned with respect to a resonant optical transition of an atom trapped in the MOT;
    a blue-detuned trapping beam such that blue-detuned light propagates in the waveguide, the blue-detuned trapping beam being blue-detuned with respect to the resonant optical transition of the atom trapped in the MOT, wherein propagation of the red-detuned light and the blue-detuned light causes formation of an evanescent field optical dipole trap (EF-ODT) about the waveguide; and
    a sequence of pulses that are adapted to impart momentum kicks to guided atoms in the EF-ODT, wherein motion of the inertial sensor system can be determined based upon motion of the guided atoms in the EF-ODT.

20. The inertial sensor system of claim 19, wherein the sequence of pulses are pulses of a focused laser beam that are adapted to impart state-dependent kicks (SDKs) to the guided atoms in the EF-ODT.

* * * * *